United States Patent
Liu et al.

(10) Patent No.: US 12,456,427 B2
(45) Date of Patent: Oct. 28, 2025

(54) ARRAY SUBSTRATE AND DISPLAY APPARATUS

(71) Applicants: Chengdu BOE Optoelectronics Technology Co., Ltd., Sichuan (CN); BOE Technology Group Co., Ltd., Beijing (CN)

(72) Inventors: Changchang Liu, Beijing (CN); Yipeng Chen, Beijing (CN); Mingkun Yang, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/694,497

(22) PCT Filed: May 9, 2023

(86) PCT No.: PCT/CN2023/092971
§ 371 (c)(1),
(2) Date: Mar. 22, 2024

(87) PCT Pub. No.: WO2024/229689
PCT Pub. Date: Nov. 14, 2024

(65) Prior Publication Data
US 2025/0246137 A1    Jul. 31, 2025

(51) Int. Cl.
*G09G 3/3233*    (2016.01)

(52) U.S. Cl.
CPC ..... *G09G 3/3233* (2013.01); *G09G 2300/0408* (2013.01); *G09G 2300/0426* (2013.01); *G09G 2310/08* (2013.01); *G09G 2320/0233* (2013.01)

(58) Field of Classification Search
None
See application file for complete search history.

(56) References Cited

U.S. PATENT DOCUMENTS

2020/0143740 A1* 5/2020 Tsuboi ................. G09G 3/3233

* cited by examiner

*Primary Examiner* — Aneeta Yodichkas
(74) *Attorney, Agent, or Firm* — Intellectual Valley Law, P.C.

(57) ABSTRACT

An array substrate includes a plurality of pixel driving circuits and a plurality of gate lines. A respective pixel driving circuit includes a driving transistor, a data write transistor, a first reset transistor, a first capacitor having a first capacitor electrode and a second capacitor electrode, a second capacitor having a third capacitor electrode and a fourth capacitor electrode, and a first node connecting line. A respective gate line is configured to provide gate scanning signal to the data write transistor in the respective pixel driving circuit. A gate electrode of the driving transistor is connected to the third capacitor electrode. The first node connecting line connects a second electrode of the first reset transistor with the third capacitor electrode. An orthographic projection of the respective gate line on a base substrate is substantially non-overlapping with an orthographic projection of the first node connecting line on the base substrate.

20 Claims, 49 Drawing Sheets

ARRAY SUBSTRATE AND DISPLAY APPARATUS

CROSS-REFERENCE TO RELATED APPLICATION

This application is a national stage application under 35 U.S.C. § 371 of International Application No. PCT/CN2023/092971, filed May 9, 2023, the contents of which are incorporated by reference in the entirety.

TECHNICAL FIELD

The present invention relates to display technology, more particularly, to an array substrate and a display apparatus.

BACKGROUND

Organic Light Emitting Diode (OLED) display is one of the hotspots in the field of flat panel display research today. Unlike Thin Film Transistor-Liquid Crystal Display (TFT-LCD), which uses a stable voltage to control brightness, OLED is driven by a driving current required to be kept constant to control illumination. The OLED display panel includes a plurality of pixel units configured with pixel-driving circuits arranged in multiple rows and columns. Each pixel-driving circuit includes a driving transistor having a gate terminal connected to one gate line per row and a drain terminal connected to one data line per column. When the row in which the pixel unit is gated is turned on, the switching transistor connected to the driving transistor is turned on, and the data voltage is applied from the data line to the driving transistor via the switching transistor, so that the driving transistor outputs a current corresponding to the data voltage to an OLED device. The OLED device is driven to emit light of a corresponding brightness.

SUMMARY

In one aspect, the present disclosure provides an array substrate, comprising a plurality of pixel driving circuits and a plurality of gate lines; wherein a respective pixel driving circuit of the plurality of pixel driving circuits comprises a driving transistor, a data write transistor, a first reset transistor, a first capacitor having a first capacitor electrode and a second capacitor electrode, a second capacitor having a third capacitor electrode and a fourth capacitor electrode, and a first node connecting line; a respective gate line of the plurality of gate lines is configured to provide gate scanning signal to the data write transistor in the respective pixel driving circuit; a gate electrode of the driving transistor is connected to the third capacitor electrode; the first node connecting line connects a second electrode of the first reset transistor with the third capacitor electrode; and an orthographic projection of the respective gate line on a base substrate is substantially non-overlapping with an orthographic projection of the first node connecting line on the base substrate.

Optionally, the orthographic projection of the respective gate line on the base substrate and the orthographic projection of the first node connecting line on the base substrate are spaced apart by an orthographic projection of the second capacitor electrode of the first capacitor on the base substrate.

Optionally, the orthographic projection of the second capacitor electrode of the first capacitor on the base substrate is substantially non-overlapping with the orthographic projection of the respective gate line on the base substrate, and is substantially non-overlapping with the orthographic projection of the first node connecting line on the base substrate.

Optionally, the orthographic projection of the respective gate line on the base substrate and an orthographic projection of the third capacitor electrode of the second capacitor on the base substrate are spaced apart by the orthographic projection of the second capacitor electrode of the first capacitor on the base substrate.

Optionally, the orthographic projection of the second capacitor electrode of the first capacitor on the base substrate is substantially non-overlapping with the orthographic projection of the respective gate line on the base substrate, and is substantially non-overlapping with the orthographic projection of the third capacitor electrode of the second capacitor on the base substrate.

Optionally, an orthographic projection of the respective gate line on a base substrate is substantially non-overlapping with an orthographic projection of an active layer and the second electrode of the first reset transistor on the base substrate.

Optionally, the second electrode of the first reset transistor crosses over the second capacitor electrode.

Optionally, the array substrate comprises a plurality of second capacitor electrode lines extending along a direction substantially parallel to a second direction; wherein a respective second capacitor electrode line of the plurality of second capacitor electrode lines comprises second capacitor electrodes of pixel driving circuits in a same row connected together; wherein the respective pixel driving circuit further comprises a light emitting control transistor and a third reset transistor; wherein a connecting line in the respective second capacitor electrode line connecting two adjacent second capacitor electrodes of two adjacent pixel driving circuits in the same row spaces apart a second electrode of the light emitting control transistor from a second electrode of the third reset transistor, and spaces apart the second electrode of the light emitting control transistor from a first electrode of the driving transistor.

Optionally, the respective pixel driving circuit further comprises a second node connecting line connected to the second electrode of the light emitting control transistor through a third via, the first electrode of the driving transistor through a fourth via, and the second electrode of the third reset transistor through a fifth via; the second electrode of the light emitting control transistor and the first electrode of the driving transistor are in a first semiconductor material layer; the respective second capacitor electrode line is in a first gate metal layer on a side of the first semiconductor material layer away from the base substrate; the second electrode of the third reset transistor is in a second semiconductor material layer on a side of the first gate metal layer away from the base substrate; and the second node connecting line is in a first signal line layer on a side of the second semiconductor material layer away from the base substrate.

Optionally, the second node connecting line crosses over the respective second capacitor electrode line.

Optionally, the array substrate further comprises a plurality of voltage supply lines; wherein the respective pixel driving circuit further comprises a light emitting control transistor and a voltage supply connecting line; a respective voltage supply line of the plurality of voltage supply lines is connected to the voltage supply connecting line through an eighth via; the voltage supply connecting line is connected to first electrodes of two adjacent light emitting control transistors of two adjacent pixel driving circuits in the same row through a ninth via; the first electrodes of two adjacent light emitting control transistors of two adjacent pixel driving circuits in the same row are parts of a unitary structure; and the voltage supply connecting line is connected to second capacitor electrodes of first capacitors of two adjacent pixel driving circuits in the same row, respectively through different vias.

Optionally, the voltage supply connecting line comprises a main line portion extending along a direction substantially parallel to a second direction; a first extension, a second extension, and a third extension extending away from the main line portion; the first extension, the second extension, the third extension extend along a direction substantially parallel to a first direction, respectively; the respective voltage supply line of the plurality of voltage supply lines is connected to the first extension through the eighth via; the first extension is connected to the first electrodes of the two adjacent light emitting control transistors of the two adjacent pixel driving circuits in the same row through the ninth via; the second extension is connected to a second capacitor electrode of a first capacitor of a first adjacent pixel driving circuit; and the third extension is connected to a second capacitor electrode of a first capacitor of a second adjacent pixel driving circuit.

Optionally, the voltage supply connecting line has a substantially mirror symmetry with respect to a plane substantially parallel to the first direction and substantially perpendicular to a light emitting surface of the array substrate.

Optionally, the respective pixel driving circuit further comprises a compensating transistor; wherein an orthographic projection of the voltage supply connecting line on the base substrate at least partially surrounds an orthographic projection of two adjacent compensating transistors of two adjacent pixel driving circuits in the same row on the base substrate; and the main line portion crosses over active layers of two adjacent data write transistors of two adjacent pixel driving circuits in the same row.

Optionally, the respective pixel driving circuit further comprises a compensating transistor; wherein at least a part of an orthographic projection of the second extension on the base substrate spaces apart an orthographic projection of at least an active layer of a first reset transistor in a first adjacent pixel driving circuit on the base substrate and an orthographic projection of at least an active layer of a compensating transistor in the first adjacent pixel driving circuit on the base substrate; and at least a part of an orthographic projection of the third extension on the base substrate spaces apart an orthographic projection of at least an active layer of a first reset transistor in a second adjacent pixel driving circuit on the base substrate and an orthographic projection of at least an active layer of a compensating transistor in the second adjacent pixel driving circuit on the base substrate.

Optionally, the array substrate further comprises a plurality of first reset signal lines and a plurality of data lines; wherein at least a part of an orthographic projection of a respective first reset signal line of the plurality of first reset signal lines on the base substrate spaces apart an orthographic projection of at least a part of a first respective data line of the plurality of data lines configured to provide data signals to a first adjacent pixel driving circuit on the base substrate and an orthographic projection of at least a part of a second respective data line of the plurality of data lines configured to provide data signals to a second adjacent pixel driving circuit on the base substrate.

Optionally, the array substrate further comprises a plurality of first reset signal lines; wherein a respective first reset signal line of the plurality of first reset signal lines comprises a plurality of loops arranged along a direction substantially parallel to first direction; and a respective loop of the plurality of loops is connected to first electrodes of two adjacent first reset transistors of two adjacent pixel driving circuits in a same row.

Optionally, the array substrate further comprises an interconnected voltage supply network; wherein the interconnected voltage supply network comprises a plurality of voltage supply lines, a plurality of second capacitor electrode lines, and a plurality of voltage supply connecting lines; the plurality of voltage supply lines extend along a direction substantially parallel to a first direction; the plurality of second capacitor electrode lines extend along a direction substantially parallel to a second direction; a respective second capacitor electrode line of the plurality of second capacitor electrode lines comprises second capacitor electrodes of pixel driving circuits in a same row; and a respective voltage supply connecting line of the plurality of voltage supply connecting lines connects a respective voltage supply line of the plurality of voltage supply lines with a respective second capacitor electrode line of the plurality of second capacitor electrode lines.

Optionally, the respective pixel driving circuit further comprises a compensating transistor and a third node connecting line; wherein the third node connecting line is connected to second electrodes of the compensating transistor and the data write transistor through a sixth via, and is connected to the first capacitor electrode of the first capacitor and the fourth capacitor electrode of the second capacitor through a seventh via; an orthographic projection of the third node connecting line on the base substrate at least partially overlaps with an orthographic projection of an active layer of the compensating transistor on the base substrate; and the third node connecting line extends along a direction substantially parallel to a direction along which the active layer of the compensating transistor extends.

In another aspect, the present disclosure provides a display apparatus, comprising the array substrate described herein, and one or more integrated circuits connected to the array substrate.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an array substrate and a display apparatus that substantially obviate one or more of the problems due to limitations and disadvantages of the related art. In one aspect, the present disclosure provides an array substrate. In some embodiments, the array substrate includes a plurality of pixel driving circuits and a plurality of gate lines. Optionally, a respective pixel driving circuit of the plurality of pixel driving circuits comprises a driving transistor, a data write transistor, a first reset transistor, a first capacitor having a first capacitor electrode and a second capacitor electrode, a second capacitor having a third capacitor electrode and a fourth capacitor electrode, and a first node connecting line. Optionally, a respective gate line of the plurality of gate lines is configured to provide gate scanning signal to the data write transistor in the respective pixel driving circuit. Optionally, a gate electrode of the driving transistor is connected to the third capacitor electrode. Optionally, the first node connecting line connects a second electrode of the first reset transistor with the third capacitor electrode. Optionally, an orthographic projection of the respective gate line on a base substrate is substantially non-overlapping with an orthographic projection of the first node connecting line on the base substrate.

Various appropriate pixel driving circuits may be used in the present array substrate. Examples of appropriate driving circuits include 3T1C, 2T1C, 4T1C, 4T2C, 5T2C, 6T1C, 7T1C, 7T2C, 8T1C, and 8T2C. In some embodiments, the respective one of the plurality of pixel driving circuits is an 7T2C driving circuit. In some embodiments, the respective one of the plurality of pixel driving circuits is a 8T2C driving circuit. Various appropriate light emitting elements may be used in the present array substrate. Examples of appropriate light emitting elements include organic light emitting diodes, quantum dots light emitting diodes, and micro light emitting diodes. Optionally, the light emitting element is micro light emitting diode. Optionally, the light emitting element is an organic light emitting diode including an organic light emitting layer.

Figure 1:
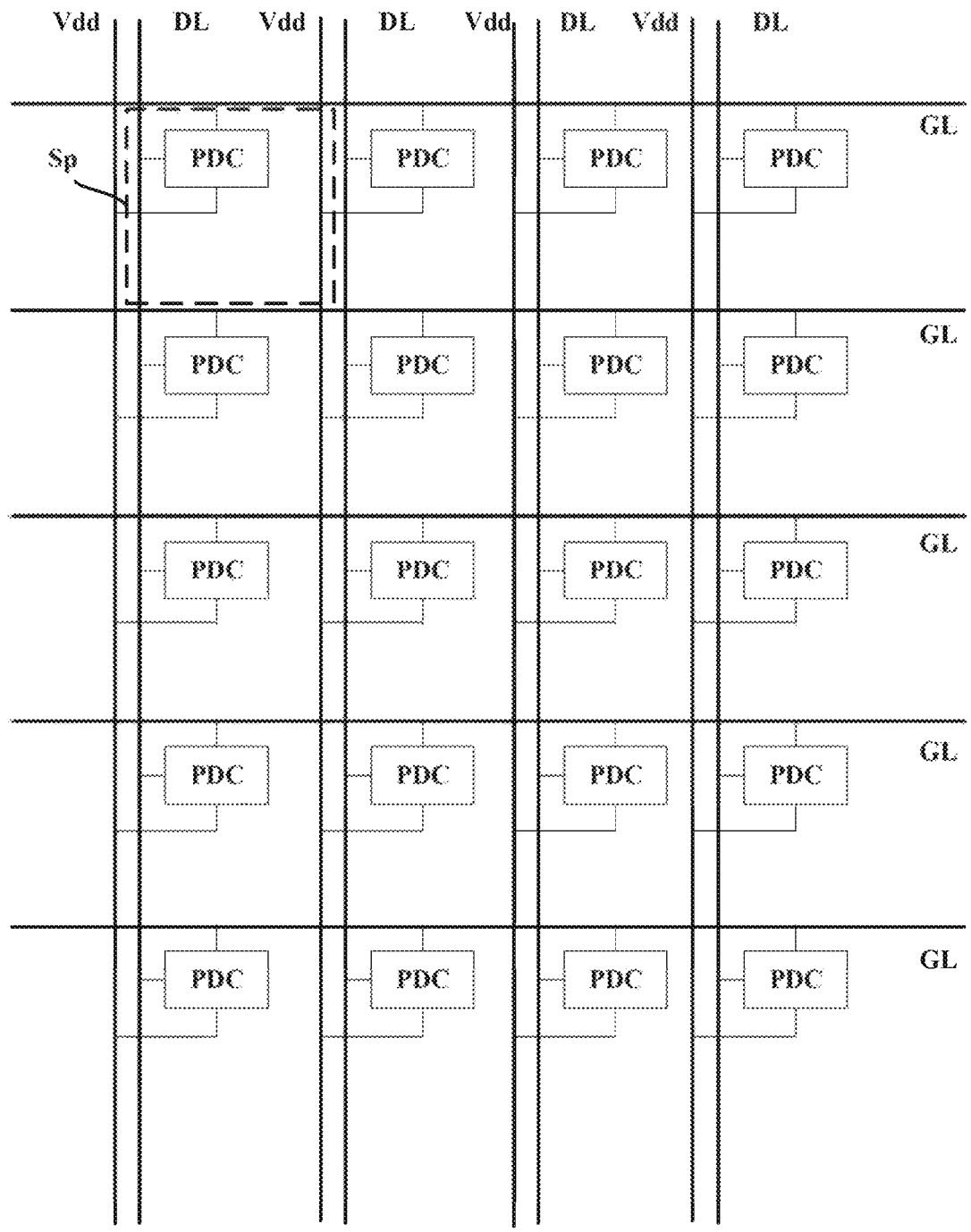
FIG. 1 is a plan view of a display substrate in some embodiments according to the present disclosure.

FIG. 1 is a plan view of an array substrate in some embodiments according to the present disclosure. Referring to FIG. 1, the array substrate includes an array of subpixels Sp. Each subpixel includes an electronic component, e.g., a light emitting element. In one example, the light emitting element is driven by a respective pixel driving circuit PDC. The array substrate includes a plurality of gate lines GL, a plurality of data lines DL, a plurality of voltage supply line Vdd. Light emission in a respective subpixel Sp is driven by a respective pixel driving circuit PDC. In one example, a high voltage signal (e.g., a VDD signal) is input, through a respective voltage supply line of the plurality of voltage supply line Vdd, to the respective pixel driving circuit PDC connected to an anode of the light emitting element; a low voltage signal (e.g., a VSS signal) is input, through a low voltage supply line, to a cathode of the light emitting element. A voltage difference between the high voltage signal (e.g., the VDD signal) and the low voltage signal (e.g., the VSS signal) is a driving voltage ΔV that drives light emission in the light emitting element.

Figure 2A:
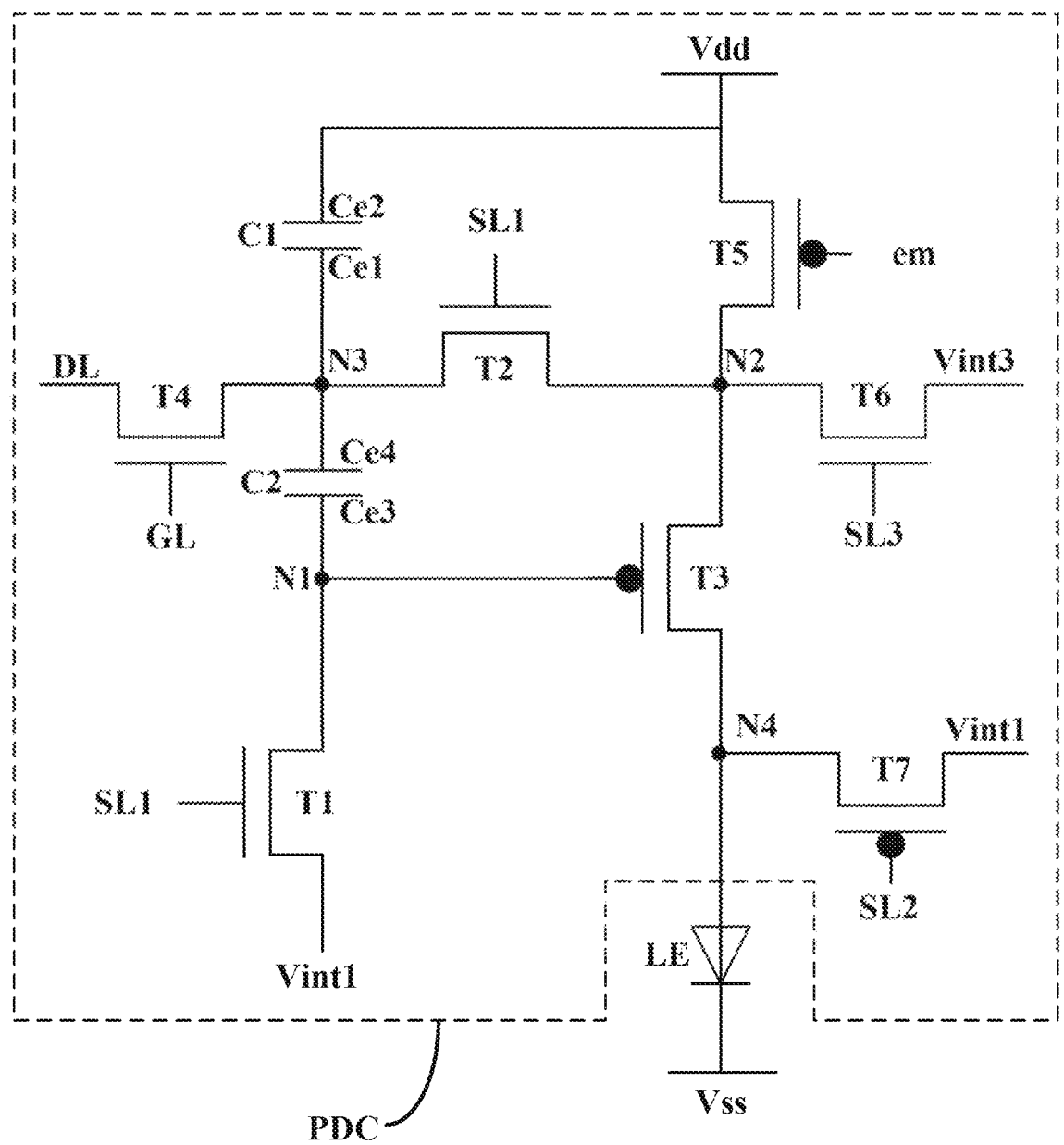
FIG. 2A is a circuit diagram illustrating the structure of a pixel driving circuit in some embodiments according to the present disclosure.

FIG. 2A is a circuit diagram illustrating the structure of a pixel driving circuit in some embodiments according to the present disclosure. Referring to FIG. 2A, the pixel driving circuit includes a driving transistor T3, a first capacitor C1 having a first capacitor electrode Ce1 and a second capacitor electrode Ce2; a second capacitor C2 having a third capacitor electrode Ce3 and a fourth capacitor electrode Ce4; a data write transistor T4 having a gate electrode connected to a respective gate line of a plurality of gate lines GL, a first electrode connected to a respective data line of a plurality of data lines DL, and a second electrode connected to the first capacitor electrode Ce1 and the fourth capacitor electrode Ce4. A gate electrode of the driving transistor T3 is connected to the third capacitor electrode Ce3.

In some embodiments, the pixel driving circuit further includes a compensating transistor T2 having a gate electrode connected to a respective first control signal line of a plurality of first control signal lines SL1; a first electrode connected to a first electrode of the driving transistor T3; and a second electrode connected to the first capacitor electrode Ce1, the fourth capacitor electrode Ce4, and the second electrode of the data write transistor T4.

In some embodiments, the first capacitor electrode Ce1 of the first capacitor C1 is connected to the second electrode of the data write transistor T4, the second electrode of the compensating transistor T2, and the fourth capacitor electrode Ce4. The second capacitor electrode Ce2 of the first capacitor C1 is connected to a respective voltage supply line of a plurality of voltage supply lines Vdd (e.g., a high voltage signal line).

In some embodiments, the fourth capacitor electrode Ce4 of the second capacitor C2 is connected to the second electrode of the data write transistor T4, the second electrode of the compensating transistor T2, and the first capacitor electrode Ce1. The third capacitor electrode Ce3 of the second capacitor C2 is connected to the gate electrode of the driving transistor T3.

In some embodiments, the pixel driving circuit further includes a light emitting control transistor T5 having a gate electrode connected to a respective light emitting control signal line of a plurality of light emitting signal lines em, a first electrode connected to the respective voltage supply line of the plurality of voltage supply lines Vdd, and a second electrode connected to the first electrode of the driving transistor T3 and the first electrode of the compensating transistor T2.

In some embodiments, the pixel driving circuit further includes at least one reset transistor. In some embodiments, the pixel driving circuit further includes a first reset transistor T1 having a gate electrode connected to the respective first control signal line of the plurality of first control signal lines SL1, a first electrode connected to a respective first reset signal line of a plurality of first reset signal lines Vint1, and a second electrode connected to the gate electrode of the driving transistor T3 and the third capacitor electrode Ce3 of the second capacitor C2.

In some embodiments, the pixel driving circuit further includes a second reset transistor T7 having a gate electrode connected to a respective second control signal line of a plurality of second control signal lines SL2, a first electrode connected to the respective first reset signal line of the plurality of first reset signal lines Vint1, and a second electrode connected to the second electrode of the driving transistor T3 and an anode of a light emitting element LE.

In some embodiments, the pixel driving circuit further includes a third reset transistor T6 having a gate electrode connected to a respective third control signal line of a plurality of third control signal lines SL3; a first electrode connected to a third reset signal line Vint3; and a second electrode connected to the first electrode of the driving transistor T3, the second electrode of the light emitting control transistor T5, and the second electrode of the compensating transistor T2.

The pixel driving circuit further include a first node N1, a second node N2, a third node N3, and a fourth node N4. The first node N1 is connected to the gate electrode of the driving transistor T3, the third capacitor electrode Ce3, and the second electrode of the first reset transistor T1. The second node N2 is connected to the first electrode of the driving transistor T3, the second electrode of the light emitting control transistor T5, the first electrode of the compensating transistor T2, and the second electrode of the third reset transistor T6. The third node N3 is connected to the second electrode of the data write transistor T4, the second electrode of the compensating transistor T2, the first capacitor electrode Ce1, and the fourth capacitor electrode Ce4. The fourth node N4 is connected to the second electrode of the driving transistor T3, the second electrode of the second reset transistor T7, and the anode of the light emitting element LE.

As used herein, a first electrode or a second electrode refers to one of a first terminal and a second terminal of a transistor, the first terminal and the second terminal being connected to an active layer of the transistor. A direction of a current flowing through the transistor may be configured to be from a first electrode to a second electrode, or from a second electrode to a first electrode. Accordingly, depending on the direction of the current flowing through the transistor, in one example, the first electrode is configured to receive an input signal and the second electrode is configured to output an output signal; in another example, the second electrode is configured to receive an input signal and the first electrode is configured to output an output signal.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. Referring to FIG. 2A, the data write transistor T4, the compensating transistor T2, the first reset transistor T1, and the third reset transistor T6 are n-type transistors such as metal oxide transistors, and the driving transistor T3, the light emitting control transistor T5, and the second reset transistor T7 are p-type transistors such as polysilicon transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

Figure 2B:
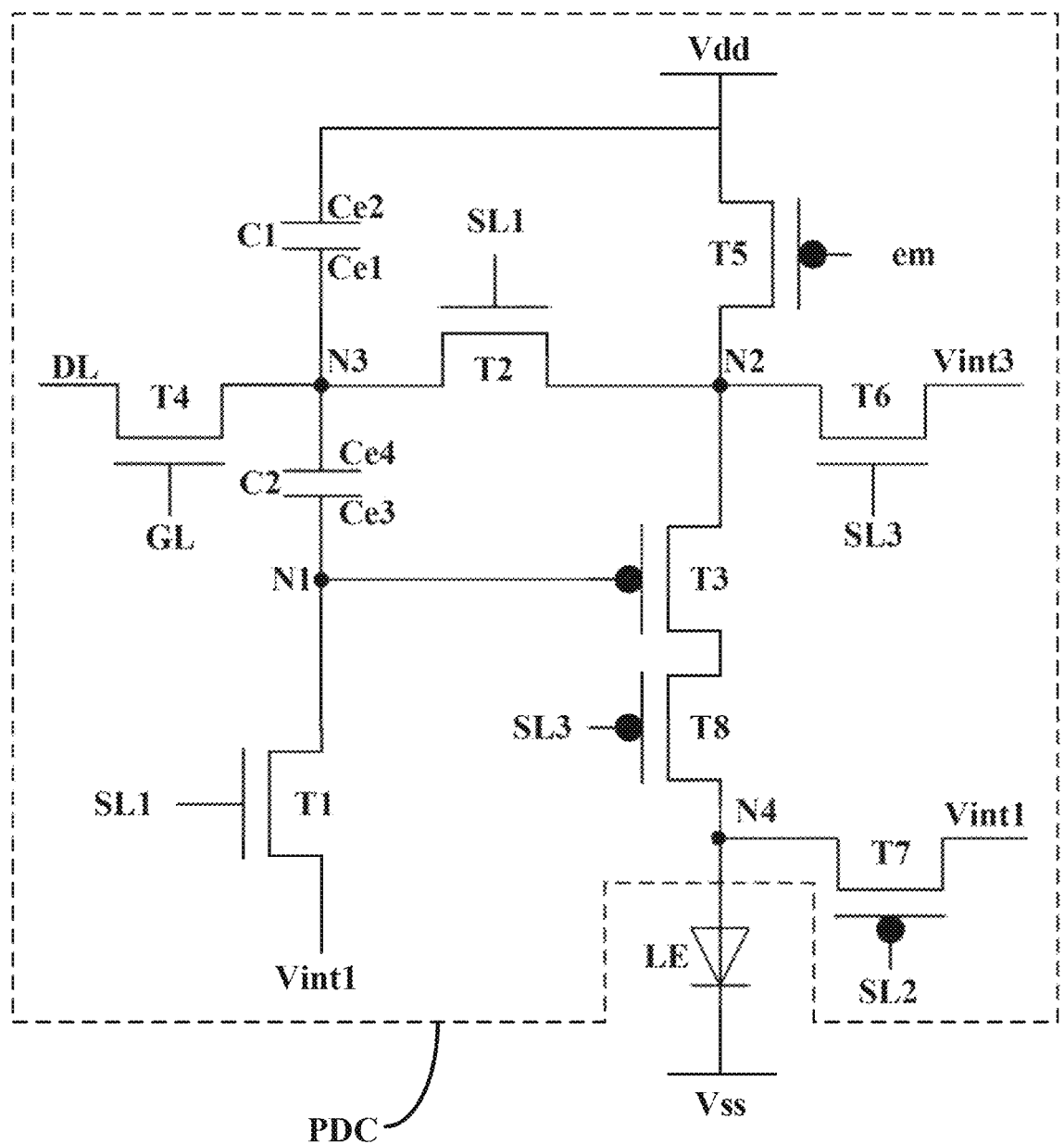
FIG. 2B is a circuit diagram illustrating the structure of a pixel driving circuit in some embodiments according to the present disclosure.

FIG. 2B is a circuit diagram illustrating the structure of a pixel driving circuit in some embodiments according to the present disclosure. Referring to FIG. 2B, the pixel driving circuit includes a driving transistor T3, a first capacitor C1 having a first capacitor electrode Ce1 and a second capacitor electrode Ce2; a second capacitor C2 having a third capacitor electrode Ce3 and a fourth capacitor electrode Ce4; a data write transistor T4 having a gate electrode connected to a respective gate line of a plurality of gate lines GL, a first electrode connected to a respective data line of a plurality of data lines DL, and a second electrode connected to the first capacitor electrode Ce1 and the fourth capacitor electrode Ce4. A gate electrode of the driving transistor T3 is connected to the third capacitor electrode Ce3.

In some embodiments, the pixel driving circuit further includes a compensating transistor T2 having a gate electrode connected to a respective first control signal line of a plurality of first control signal lines SL1; a first electrode connected to a first electrode of the driving transistor T3; and a second electrode connected to the first capacitor electrode Ce1, the fourth capacitor electrode Ce4, and the second electrode of the data write transistor T4.

In some embodiments, the first capacitor electrode Ce1 of the first capacitor C1 is connected to the second electrode of the data write transistor T4, the second electrode of the compensating transistor T2, and the fourth capacitor electrode Ce4. The second capacitor electrode Ce2 of the first capacitor C1 is connected to a respective voltage supply line of a plurality of voltage supply lines Vdd (e.g., a high voltage signal line).

In some embodiments, the fourth capacitor electrode Ce4 of the second capacitor C2 is connected to the second electrode of the data write transistor T4, the second electrode of the compensating transistor T2, and the first capacitor electrode Ce1. The third capacitor electrode Ce3 of the second capacitor C2 is connected to the gate electrode of the driving transistor T3.

In some embodiments, the pixel driving circuit further includes a light emitting control transistor T5 having a gate electrode connected to a respective light emitting control signal line of a plurality of light emitting signal lines em, a first electrode connected to the respective voltage supply line of the plurality of voltage supply lines Vdd, and a second electrode connected to the first electrode of the driving transistor T3 and the first electrode of the compensating transistor T2.

In some embodiments, the pixel driving circuit further includes at least one reset transistor. In some embodiments, the pixel driving circuit further includes a first reset transistor T1 having a gate electrode connected to the respective first control signal line of the plurality of first control signal lines SL1, a first electrode connected to a respective first reset signal line of a plurality of first reset signal lines Vint1, and a second electrode connected to the gate electrode of the driving transistor T3 and the third capacitor electrode Ce3 of the second capacitor C2.

In some embodiments, the pixel driving circuit further includes a control transistor T8 having a gate electrode connected to a respective third control signal line of a plurality of third control signal lines SL3, a first electrode connected to the second electrode of the driving transistor T3, and a second electrode connected to an anode of a light emitting element LE.

The inventors of the present disclosure discover the issue of leakage through the driving transistor T3 in the pixel driving circuit depicted in FIG. 2A. In one example, the reset signal provided by the respective third reset signal line Vint3 has a voltage level of 6V, and the reset signal provided by the respective first reset signal line Vint1 has a voltage level of −3V. The reset signal provided by the respective third reset signal line Vint3 may flow through the driving transistor T3 and the second reset transistor T7. The inventors of the present disclosure discover that, by having the control transistor T8, the leakage through the driving transistor T3 and the second reset transistor T7 can be prevented or avoided.

In some embodiments, the pixel driving circuit further includes a second reset transistor T7 having a gate electrode connected to a respective second control signal line of a plurality of second control signal lines SL2, a first electrode connected to the respective first reset signal line of the plurality of first reset signal lines Vint1, and a second electrode connected to the second electrode of the control transistor T8 and the anode of a light emitting element LE.

In some embodiments, the pixel driving circuit further includes a third reset transistor T6 having a gate electrode connected to the respective third control signal line of the plurality of third control signal lines SL3; a first electrode connected to a third reset signal line Vint3; and a second electrode connected to the first electrode of the driving transistor T3, the second electrode of the light emitting control transistor T5, and the second electrode of the compensating transistor T2.

The pixel driving circuit further include a first node N1, a second node N2, a third node N3, and a fourth node N4. The first node N1 is connected to the gate electrode of the driving transistor T3, the third capacitor electrode Ce3, and the second electrode of the first reset transistor T1. The second node N2 is connected to the first electrode of the driving transistor T3, the second electrode of the light emitting control transistor T5, the first electrode of the compensating transistor T2, and the second electrode of the third reset transistor T6. The third node N3 is connected to the second electrode of the data write transistor T4, the second electrode of the compensating transistor T2, the first capacitor electrode Ce1, and the fourth capacitor electrode Ce4. The fourth node N4 is connected to the second electrode of the control transistor T8, the second electrode of the second reset transistor T7, and the anode of the light emitting element LE.

The present disclosure may be implemented in pixel driving circuit having transistors of various types, including a pixel driving circuit having p-type transistors, a pixel driving circuit having n-type transistors, and a pixel driving circuit having one or more p-type transistors and one or more n-type transistors. Referring to FIG. 21, the data write transistor T4, the compensating transistor 12, the first reset transistor T1, and the third reset transistor T6 are n-type transistors such as metal oxide transistors, and the driving transistor T3, the light emitting control transistor T5, the second reset transistor T7, and the control transistor T8 are p-type transistors such as polysilicon transistors. For a p-type transistor, an effective control signal (e.g., a turn-on control signal) is a low voltage signal, and an ineffective control signal (e.g., a turn-off control signal) is a high voltage signal. For an n-type transistor, an effective control signal (e.g., a turn-on control signal) is a high voltage signal, and an ineffective control signal (e.g., a turn-off control signal) is a low voltage signal.

Figure 3:
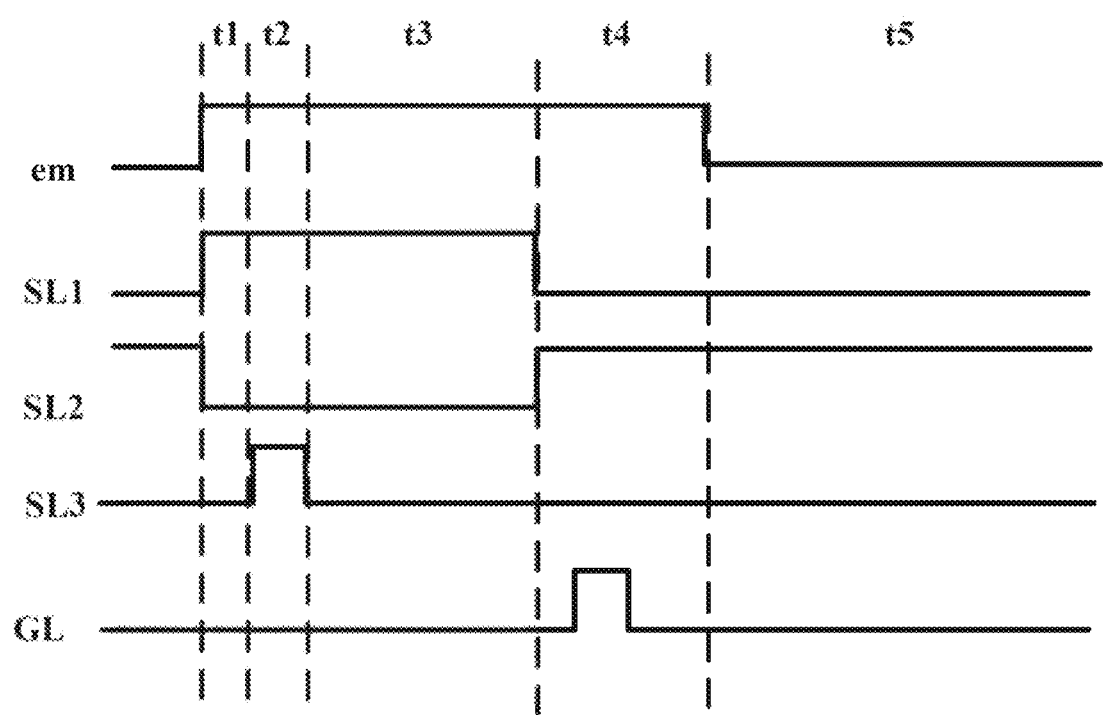
FIG. 3 is a timing diagram illustrating the operation of a pixel driving circuit in some embodiments according to the present disclosure.

FIG. 3 is a timing diagram illustrating the operation of a pixel driving circuit in some embodiments according to the present disclosure. Referring to FIG. 2A, FIG. 2B, and FIG. 3, during one frame of image, the operation of the pixel driving circuit includes a first phase t1, a second phase t2, a third phase t3, a fourth phase t4, and a fifth phase t5.

Figure 4A:
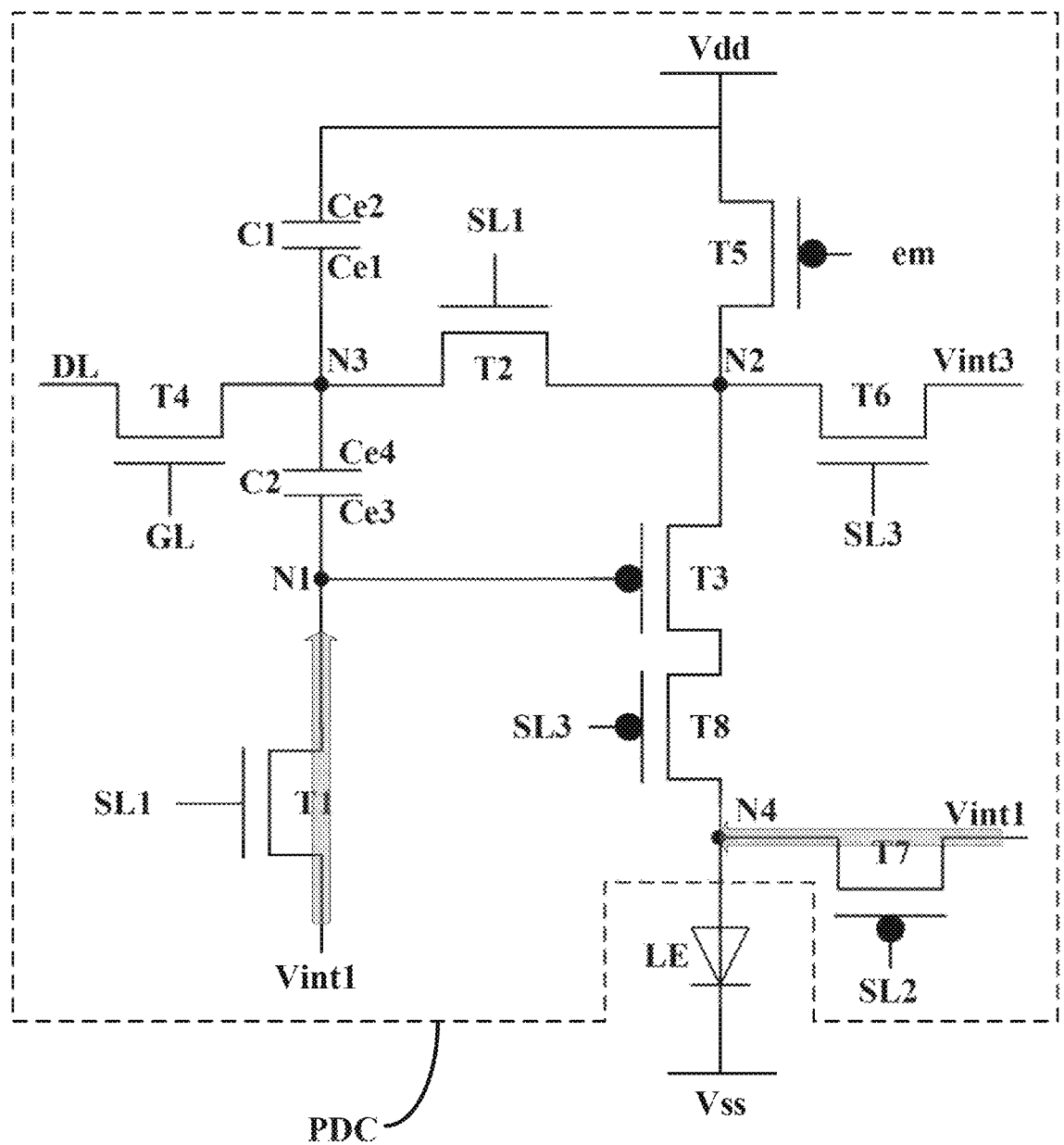
FIG. 4A illustrates a current pathway in a phase t1 of a frame of image in a pixel driving circuit in some embodiments according to the present disclosure.

In the first phase t1, a turning-on control signal is provided through the respective first control signal line of the plurality of first control signal lines SL1 to the gate electrode of the first reset transistor T1 to turn on the first reset transistor T1, allowing a reset signal from the first reset signal line Vint1 to pass from a first electrode of the first reset transistor T1 to a second electrode of the first reset transistor T1, and in turn to the third capacitor electrode Ce3 and the gate electrode of the driving transistor T3. The node N1 (the gate electrode of the driving transistor T3) is reset. The turning-on control signal is also provided through the respective first control signal line of the plurality of first control signal lines SL1 to the gate electrode of the compensating transistor T2 to turn on the compensating transistor T2. A turning-on control signal is provided through the respective second control signal line of the plurality of second control signal lines SL2 to the gate electrode of the second reset transistor T7 to turn on the second reset transistor T7, allowing a reset signal from the respective first reset signal line of the plurality of first reset signal lines Vint1 to pass from a first electrode of the second reset transistor T7 to a second electrode of the second reset transistor T7, and in turn to the anode of the light emitting element LE. The node N4 (the anode of the light emitting element LE) is reset. A turning-off light emitting control signal is provided through the respective light emitting control signal line of the plurality of light emitting control signal lines em to the gate electrode of the light emitting control transistor T5 to turn off the light emitting control transistor T5. A turning-off control signal is provided through the respective third control signal line of the plurality of third control signal lines SL3 to the gate electrode of the third reset transistor T6 to turn off the third reset transistor T6. A turning-off gate signal is provided through the respective gate line of the plurality of gate lines GL to the gate electrode of the data write transistor T4 to turn off the data write transistor T4. FIG. 4A illustrates a current pathway in a phase t1 of a frame of image in a pixel driving circuit in some embodiments according to the present disclosure. The shaded arrows in FIG. 4A indicates a current flow in the phase t1.

Figure 4B:
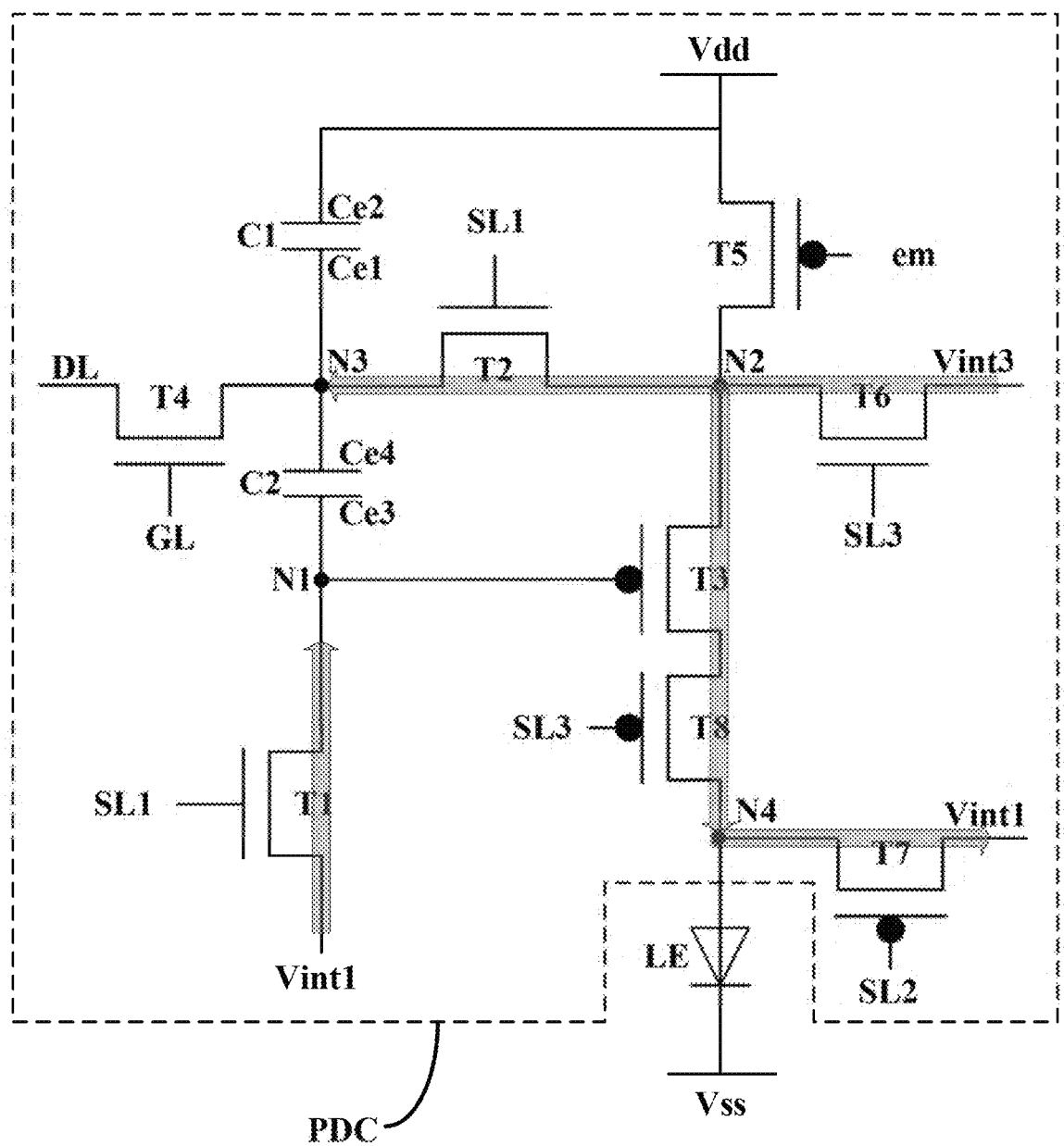
FIG. 4B illustrates a current pathway in a phase t2 of a frame of image in a pixel driving circuit in some embodiments according to the present disclosure.

In the second phase t2, a turning-on control signal is provided through the respective first control signal line of the plurality of first control signal lines SL1 to the gate electrode of the first reset transistor T1 to turn on the first reset transistor T1, and also provided through the respective first control signal line of the plurality of first control signal lines SL1 to the gate electrode of the compensating transistor T2 to turn on the compensating transistor T2. A turning-on control signal is provided through the respective second control signal line of the plurality of second control signal lines SL2 to the gate electrode of the second reset transistor T7 to turn on the second reset transistor T7. A turning-on control signal is provided through the respective third control signal line of the plurality of third control signal lines SL3 to the gate electrode of the third reset transistor T6 to turn on the third reset transistor T6, allowing a reset signal from the respective third reset signal line of the plurality of third reset signal lines Vint3 to pass from a first electrode of the third reset transistor T6 to a second electrode of the third reset transistor T6, and in turn to the first electrode of the driving transistor T3, the second electrode of the light emitting control transistor T5, and the second electrode of the compensating transistor T2. The node N2 (the first electrode of the driving transistor T3) is charged with a voltage of the respective third reset signal line of the plurality of third reset signal lines Vint3. In some embodiments, the voltage of the respective third reset signal line of the plurality of third reset signal lines Vint3 has a high voltage level (e.g., 6V), to ensure Vgs<Vth, thereby ensuring the driving transistor T3 remains in a turning-on state. FIG. 4B illustrates a current pathway in a phase t2 of a frame of image in a pixel driving circuit in some embodiments according to the present disclosure. The shaded arrows in FIG. 4B indicates a current flow in the phase 2.

Figure 4C:
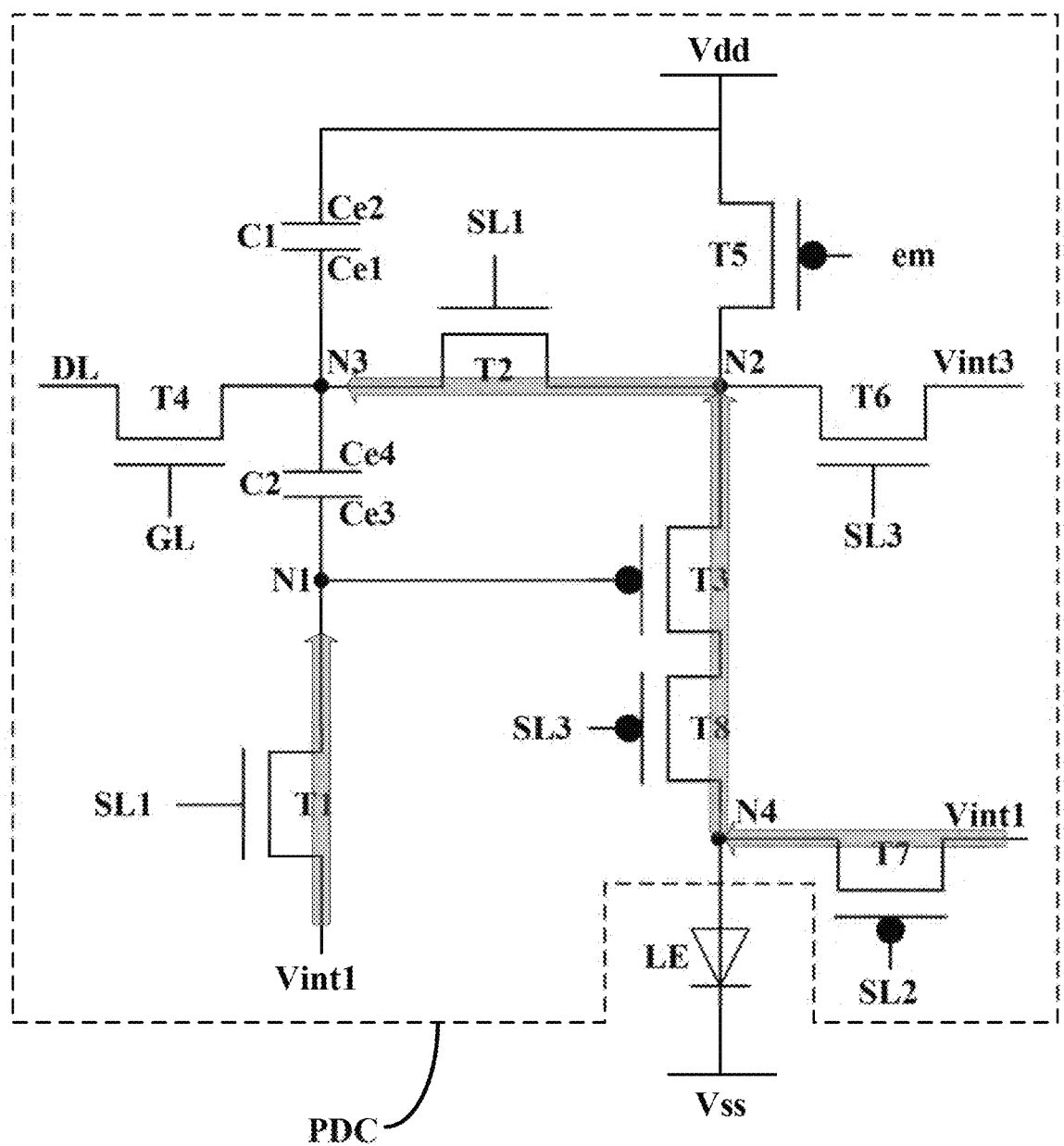
FIG. 4C illustrates a current pathway in a phase t3 of a frame of image in a pixel driving circuit in some embodiments according to the present disclosure.

In the third phase 3 (Vth compensating phase), a turning-off control signal is provided through the respective third control signal line of the plurality of third control signal lines SL3 to the gate electrode of the third reset transistor T6 to turn off the third reset transistor T6. In the third phase t3, the first reset transistor T1, the compensating transistor T2, the driving transistor T3, the second reset transistor T7, and the control transistor T8 remain turning on. A first reset signal is provided through the respective first reset signal line of the plurality of first reset signal lines Vint1, the first reset signal passes through the second reset transistor T7 and the driving transistor T3, charging the node N2 (the first electrode of the driving transistor T3). When the node N2 is charged to a point when Vgs=Vth, the driving transistor T3 is turned off. Vgs=VN1−VN2, wherein VN1 is a voltage level at the node N1, and VN2 is a voltage level at the node N2. In the third phase 3, VN1=a voltage level of the first reset signal provided by the first reset signal line Vint1. Thus, VN2=VN1−Vgs=VN1−Vth, i.e., VN2=Vint1−Vth. Because the compensating transistor T2 is turning on in the third phase 13, VN3=VN2=VN1−Vth, wherein VN3 is a voltage level at the node N3. FIG. 4C illustrates a current pathway in a phase 13 of a frame of image in a pixel driving circuit in some embodiments according to the present disclosure. The shaded arrows in FIG. 4C indicates a current flow in the phase 3.

Figure 4D:
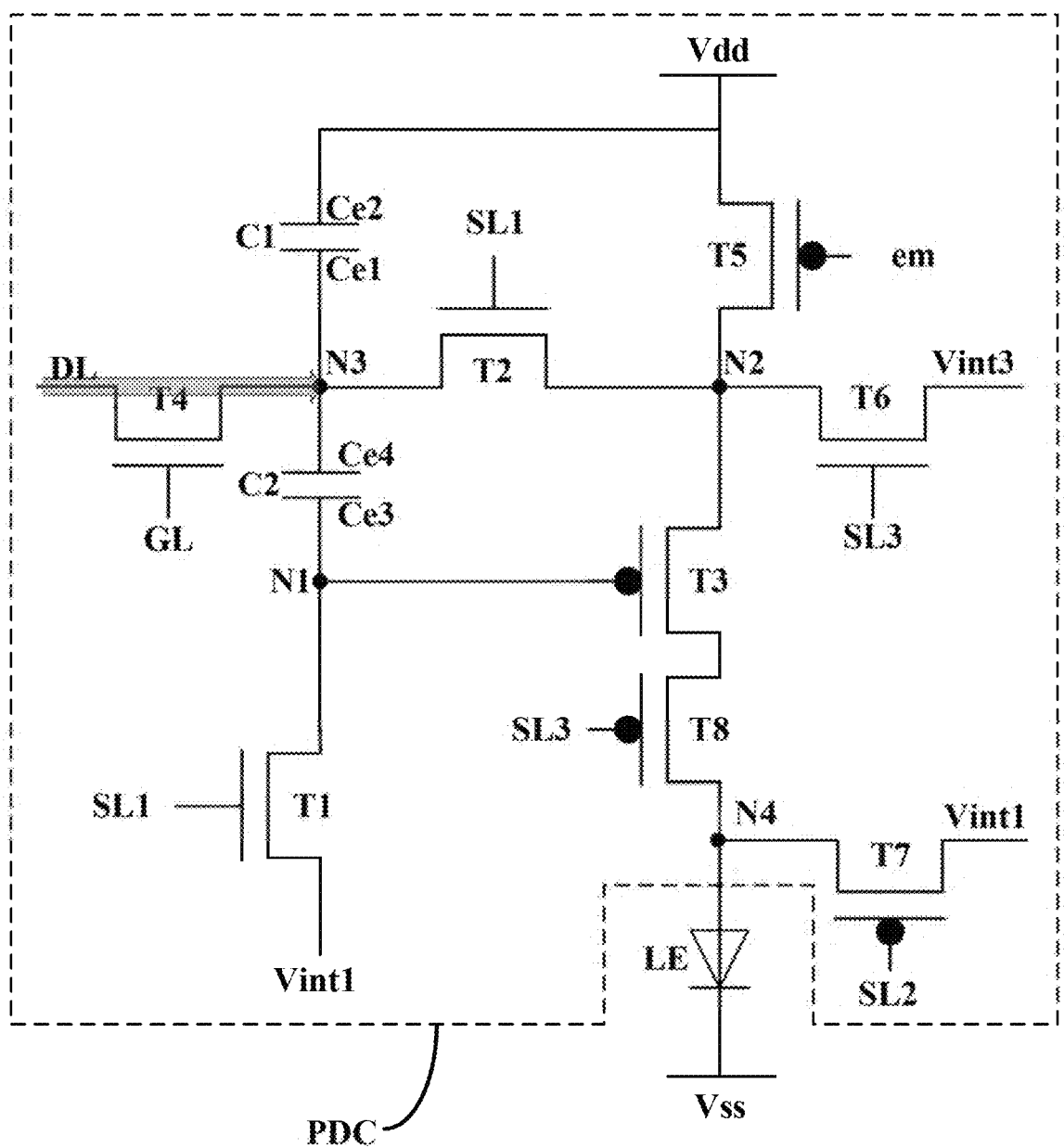
FIG. 4D illustrates a current pathway in a phase t4 of a frame of image in a pixel driving circuit in some embodiments according to the present disclosure.

In the phase t4 (data write phase), a turning-off control signal is provided through the respective first control signal line of the plurality of first control signal lines SL1 to the gate electrode of the first reset transistor T1 to turn off the first reset transistor T1, and also provided through the respective first control signal line of the plurality of first control signal lines SL1 to the gate electrode of the compensating transistor T2 to turn off the compensating transistor T2. A turning-off control signal is provided through the respective second control signal line of the plurality of second control signal lines SL2 to the gate electrode of the second reset transistor T7 to turn off the second reset transistor T7. A turning-on gate signal is provided through the respective gate line of the plurality of gate lines GL to the gate electrode of the data write transistor T4 to turn on the data write transistor T4, allowing a data signal provided through the data line DL to pass from a first electrode of the data write transistor T4 to a second electrode of the data write transistor T4, and in turn to the node N3. In the phase t3, VN1=a voltage level of the first reset signal provided by the first reset signal line Vint1 (denoted as Vre1). In the phase t4, a voltage level at the node N3 changes from (Vre1−Vth) to a voltage level of the data signal Vdata. The change is ΔVN3=Vdata−Vre1+Vth. The second capacitor C2 induces a voltage coupling at the node N1 by ΔVN3. Due to the voltage coupling, VN1 changes to (Vre1+ΔVN3)= (Vre1+Vdata−Vre1+Vth)=(Vdata+Vth), wherein the Vdata is the voltage level of the data voltage signal, and the Vth is the voltage level of the threshold voltage Th of the PN junction of the driving transistor T3. FIG. 4D illustrates a current pathway in a phase 14 of a frame of image in a pixel driving circuit in some embodiments according to the present disclosure. The shaded arrows in FIG. 4D indicates a current flow in the phase t4.

Figure 4E:
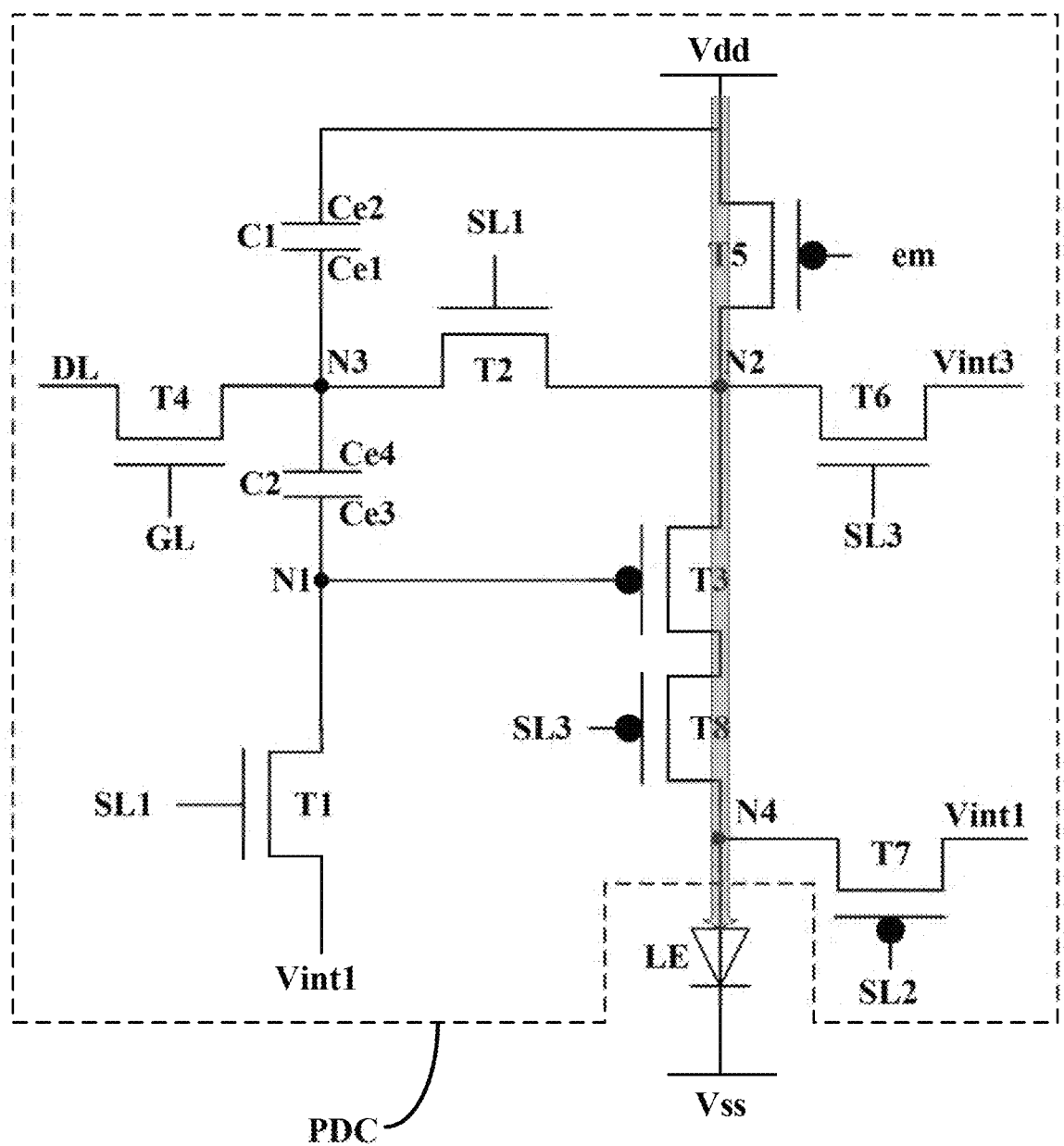
FIG. 4E illustrates a current pathway in a phase t5 of a frame of image in a pixel driving circuit in some embodiments according to the present disclosure.

In the phase t5 (light emission phase), a turning-on light emitting control signal is provided through the respective light emitting control signal line of the plurality of light emitting control signal lines em to the gate electrode of the light emitting control transistor T5 to turn on the light emitting control transistor T5, allowing a voltage supply voltage signal provided through the respective voltage supply line of the plurality of voltage supply lines Vdd to pass from a first electrode of the light emitting control transistor T5 to a second electrode of the light emitting control transistor T5, in turn pass from a first electrode of the driving transistor T3 to a second electrode of the driving transistor T3, in turn pass from a first electrode of the control transistor T8 to a second electrode of the control transistor T8, and to the anode of the light emitting element LE. The light emitting element is configured to emit light. FIG. 4E illustrates a current pathway in a phase t5 of a frame of image in a pixel driving circuit in some embodiments according to the present disclosure. The shaded arrows in FIG. 4E indicates a current flow in the phase t5.

Figure 5A:
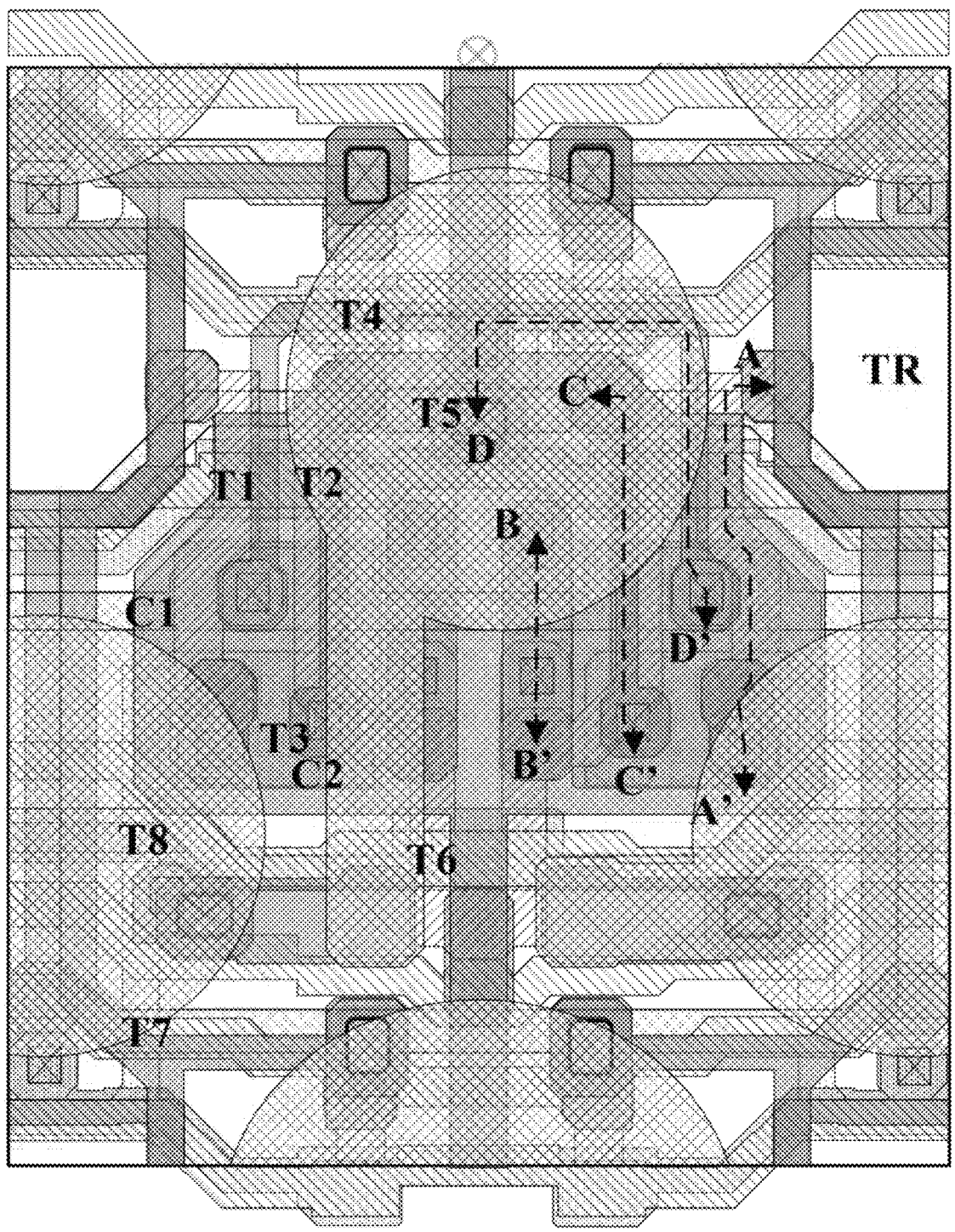
FIG. 5A is a diagram illustrating the structure of pixel driving circuits in an array substrate in some embodiments according to the present disclosure.
Figure 5B:
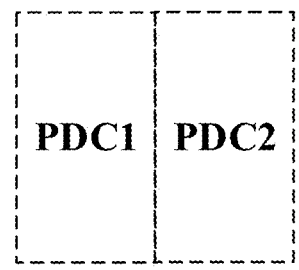
FIG. 5B is a schematic diagram illustrating an arrangement of pixel driving circuits in the array substrate depicted in FIG. 5A.

FIG. 5A is a diagram illustrating the structure of pixel driving circuits in an array substrate in some embodiments according to the present disclosure. FIG. 5B is a schematic diagram illustrating an arrangement of pixel driving circuits in the array substrate depicted in FIG. 5A. FIG. 5A and FIG. 5B depicts a portion of the array substrate having two adjacent pixel driving circuits, including PDC1 and PDC2.

Figure 5C:
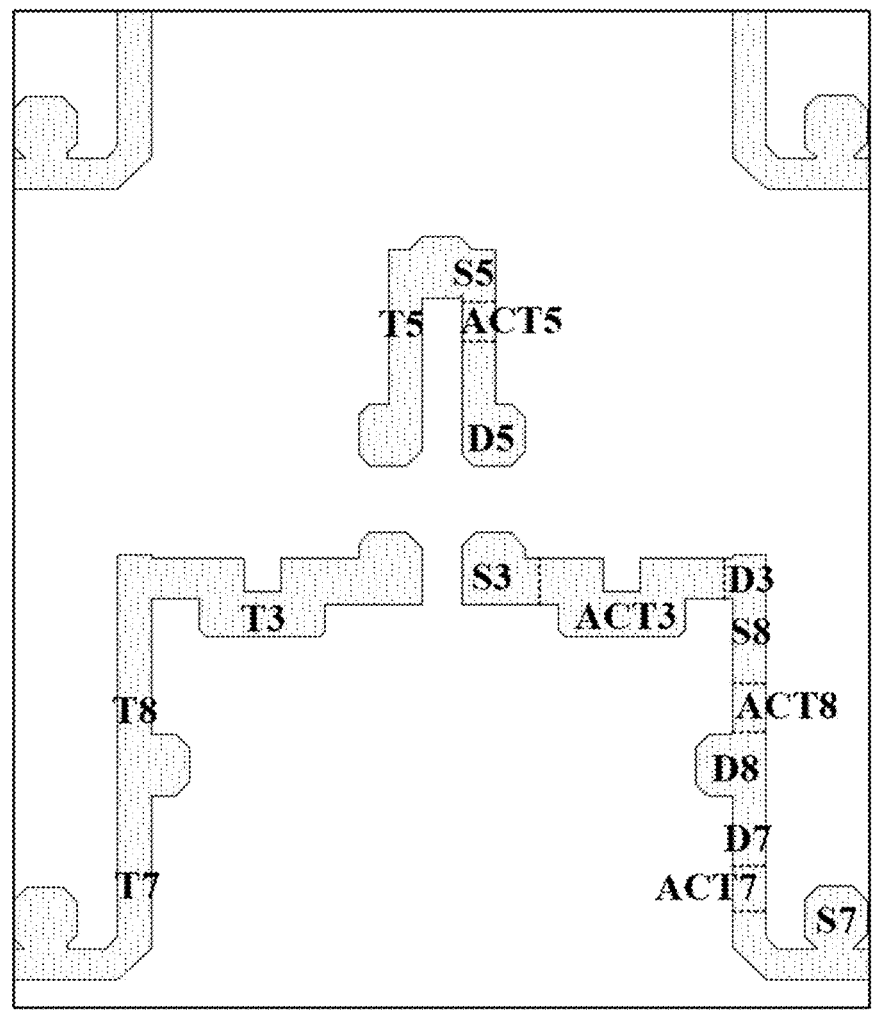
FIG. 5C is a diagram illustrating the structure of a first semiconductor material layer in the array substrate depicted in FIG. 5A.
Figure 5D:
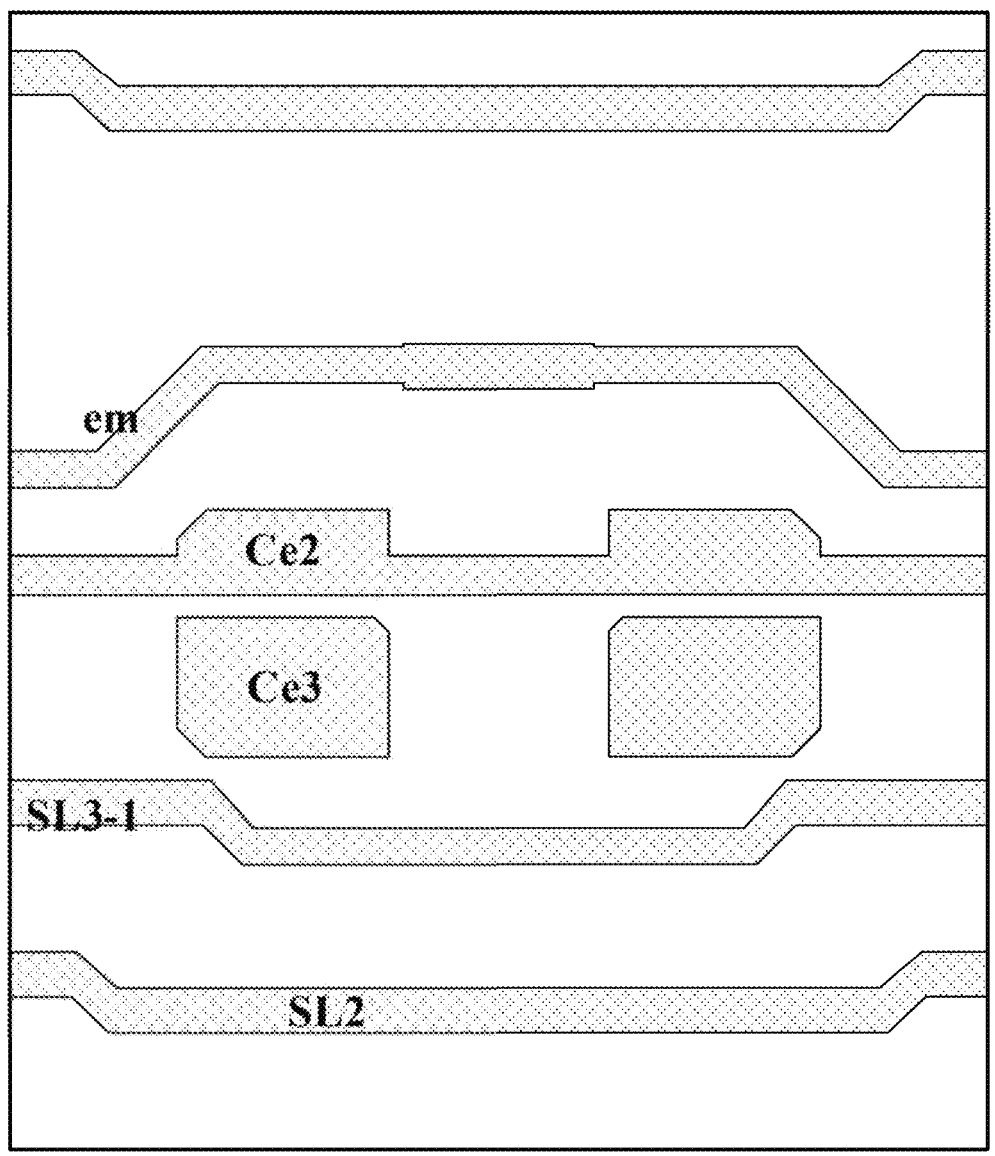
FIG. 5D is a diagram illustrating the structure of a first gate metal layer in the array substrate depicted in FIG. 5A.
Figure 5E:
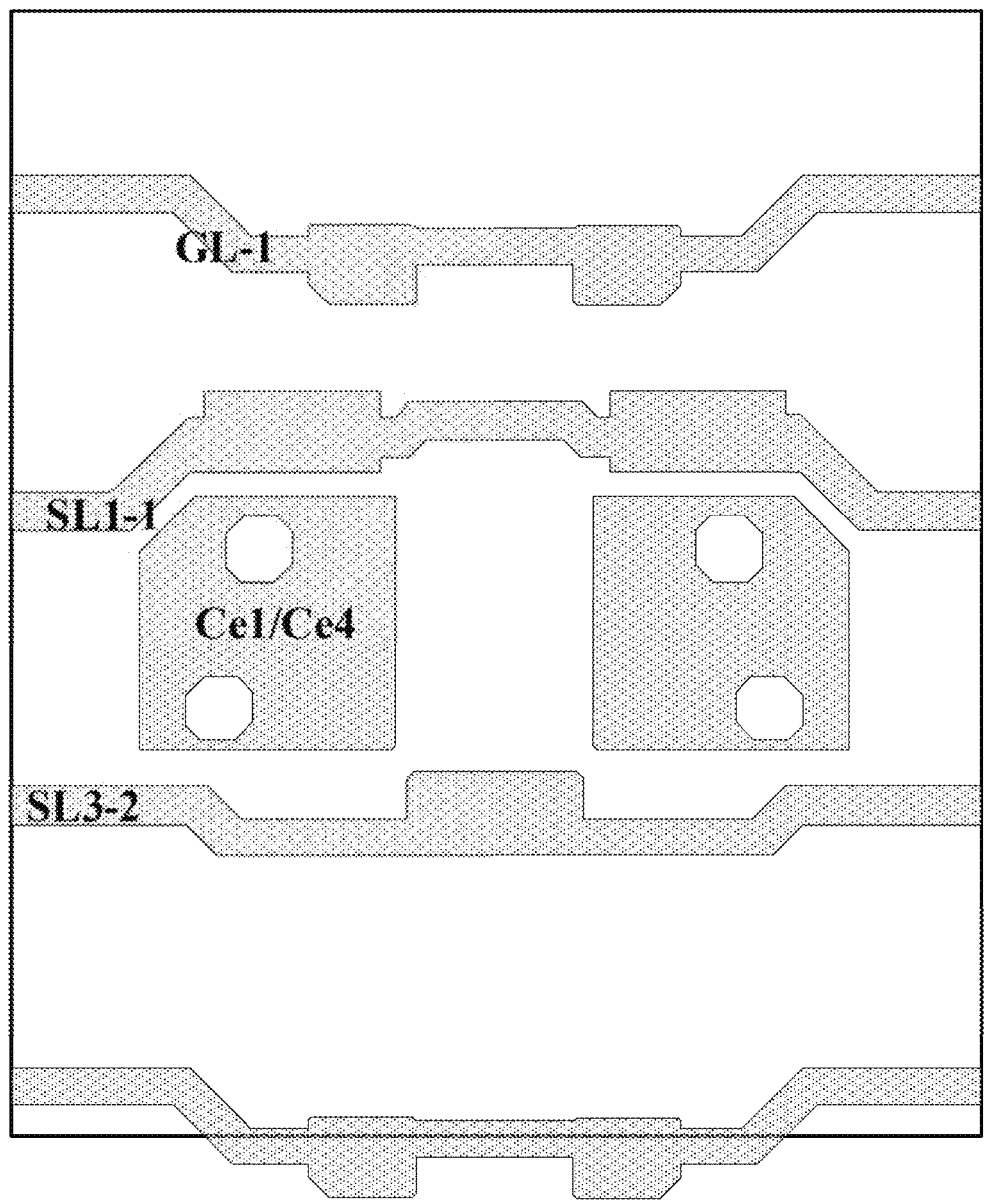
FIG. 5E is a diagram illustrating the structure of a second gate metal layer in the array substrate depicted in FIG. 5A.
Figure 5F:
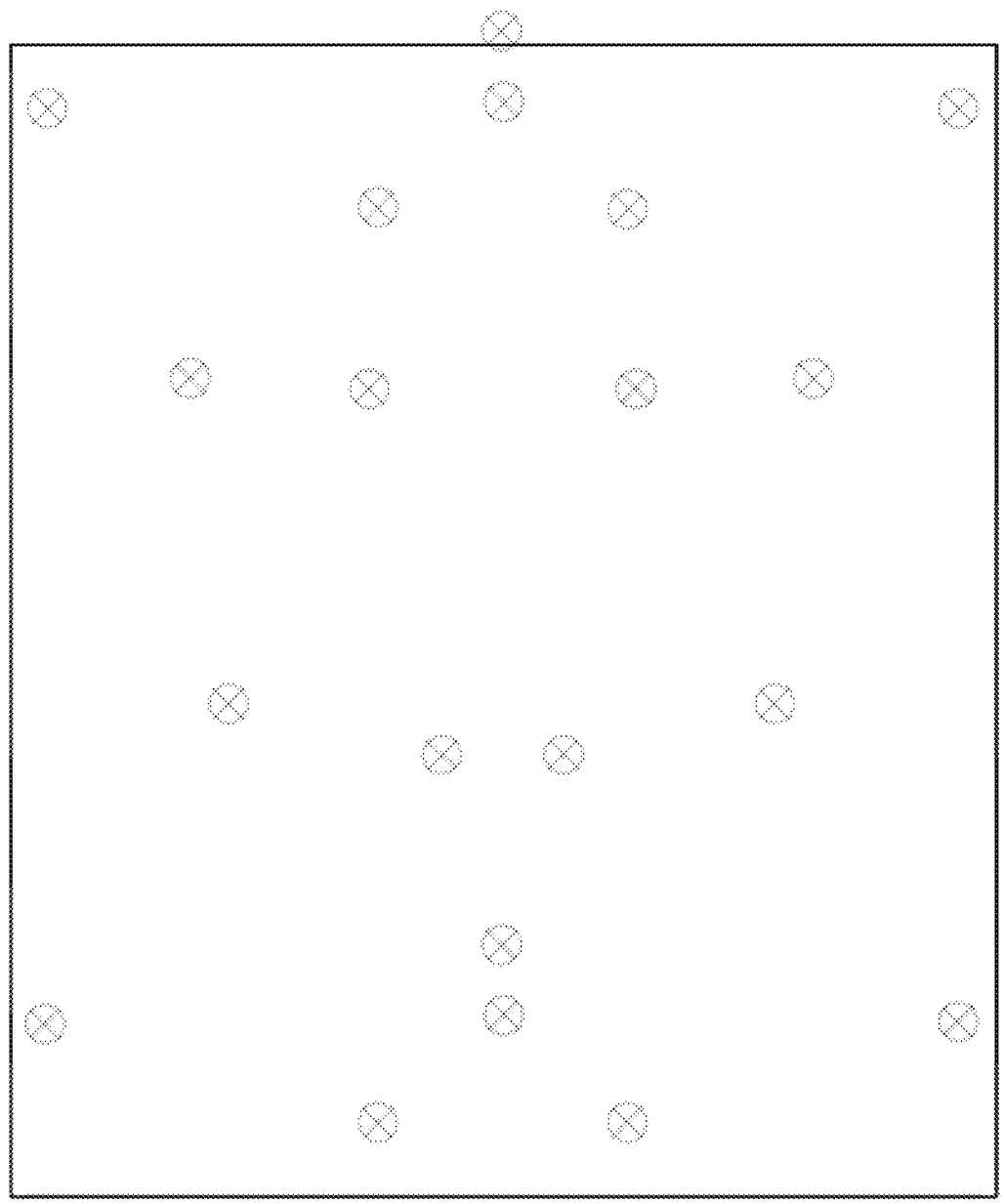
FIG. 5F is a diagram illustrating vias extending through a first inter-layer dielectric layer in the array substrate depicted in FIG. 5A.
Figure 5G:
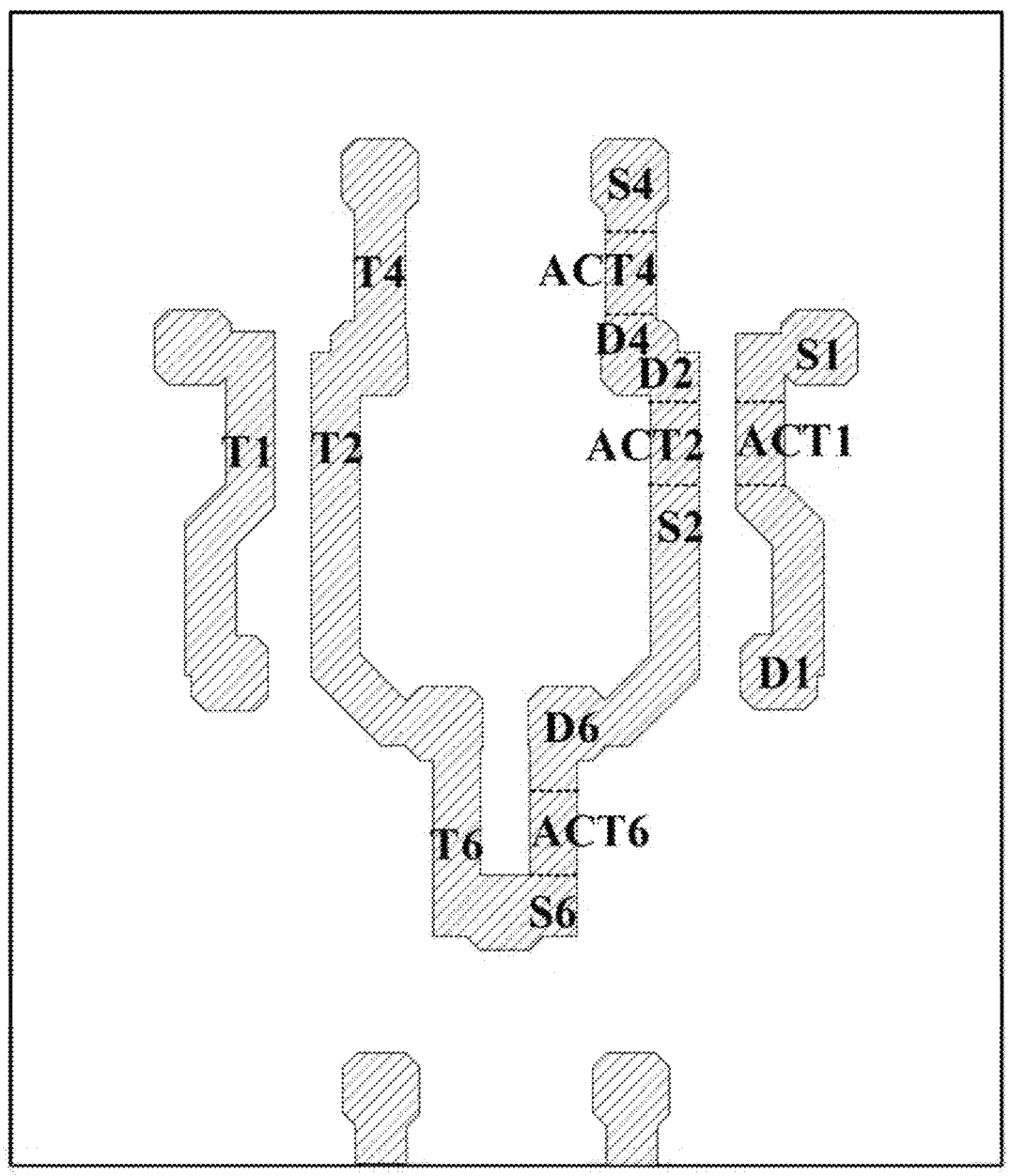
FIG. 5G is a diagram illustrating the structure of a second semiconductor material layer in the array substrate depicted in FIG. 5A.
Figure 5H:
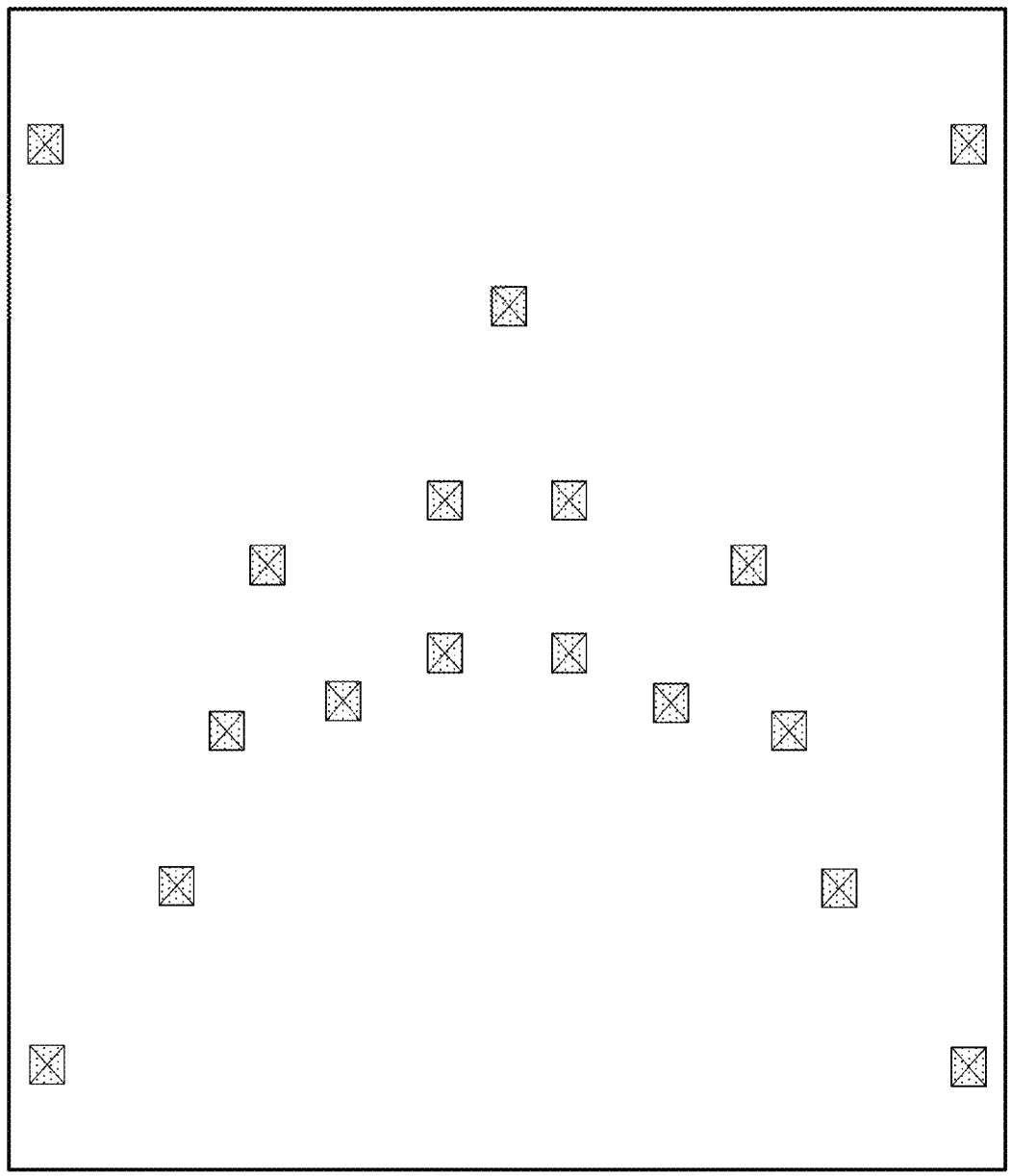
FIG. 5H is a diagram illustrating vias extending through a second inter-layer dielectric layer in the array substrate depicted in FIG. 5A.
Figure 5I:
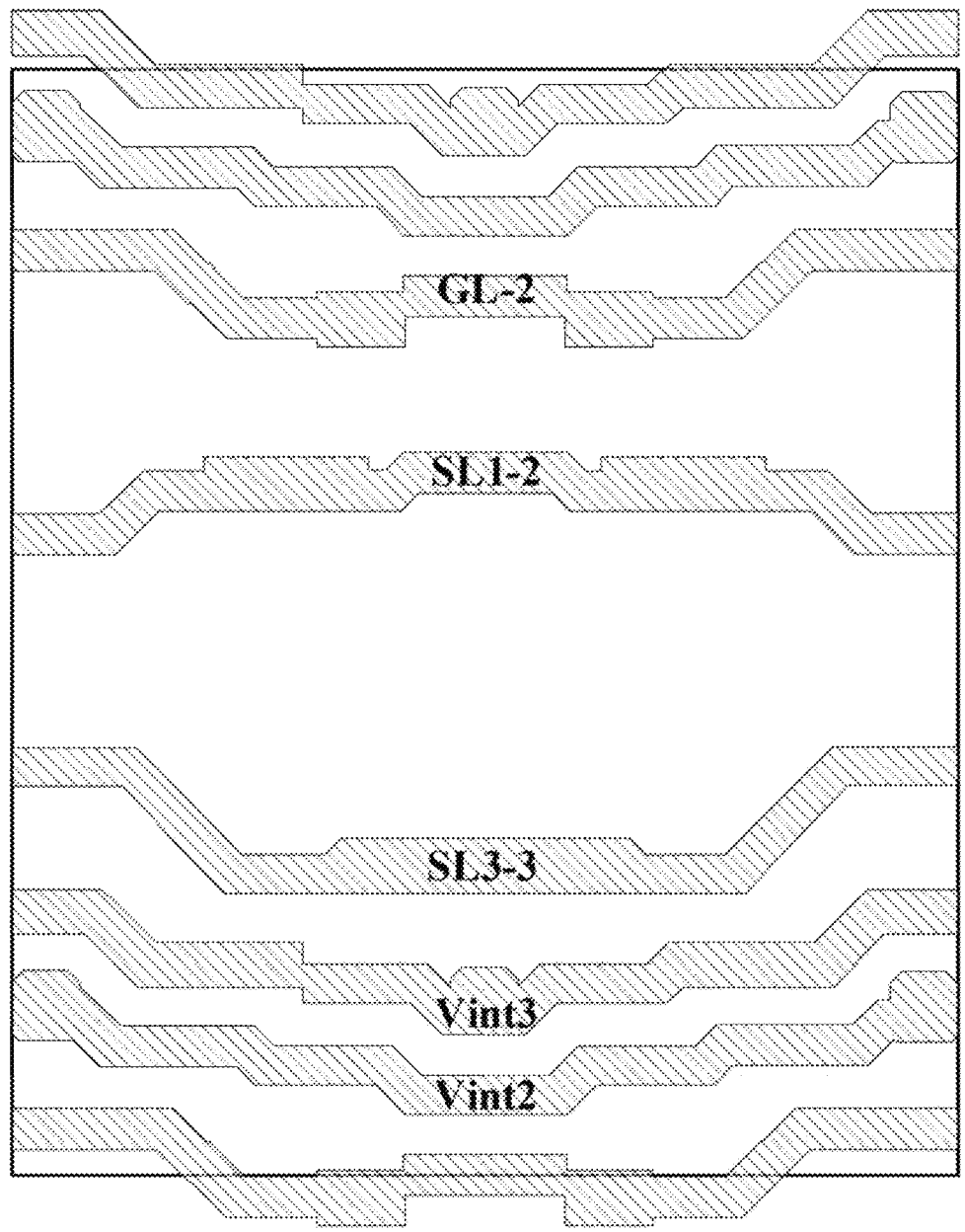
FIG. 5I is a diagram illustrating the structure of a third gate metal layer in the array substrate depicted in FIG. 5A.
Figure 5J:
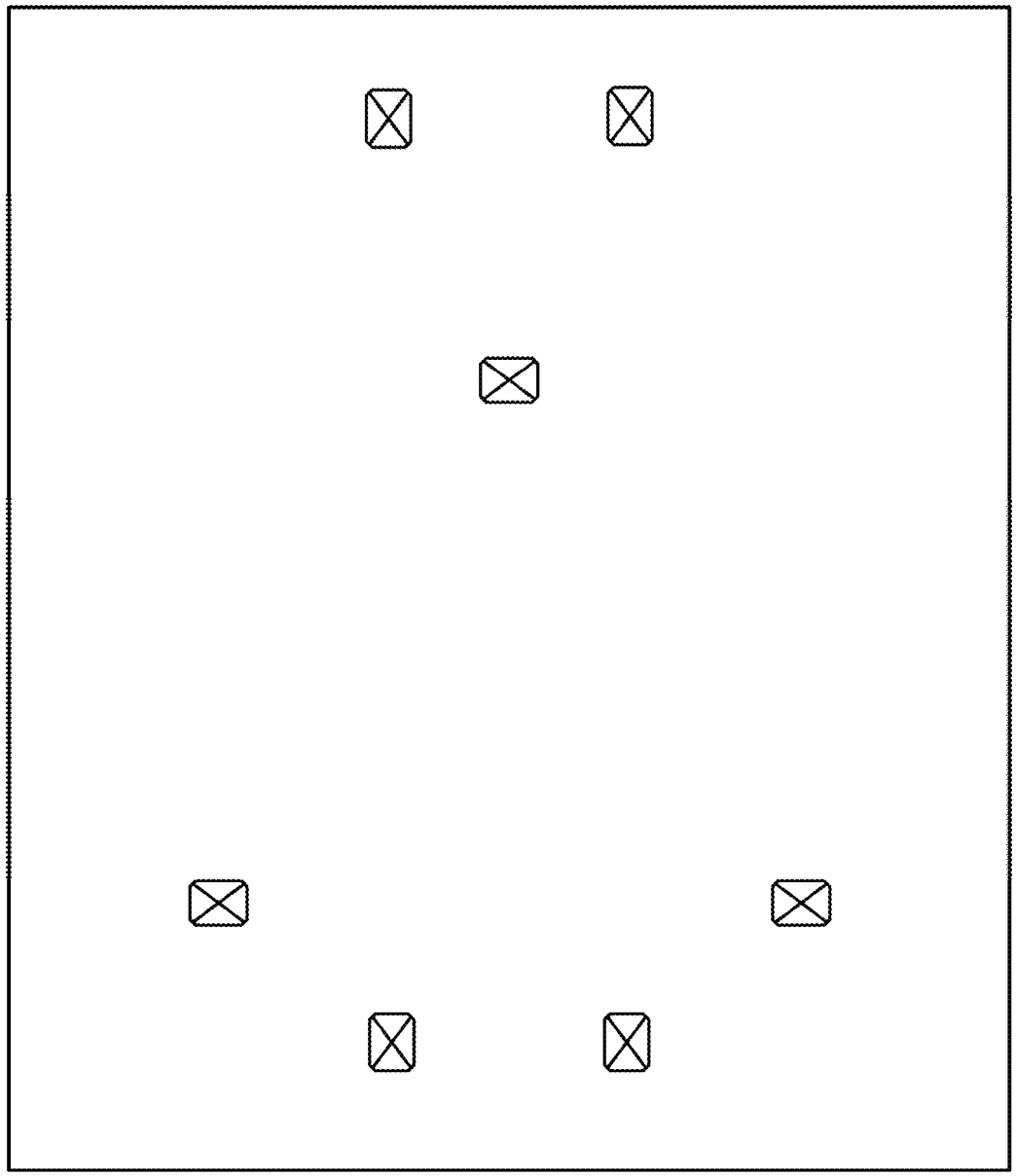
FIG. 5J is a diagram illustrating vias extending through a passivation layer in the array substrate depicted in FIG. 5A.
Figure 5K:
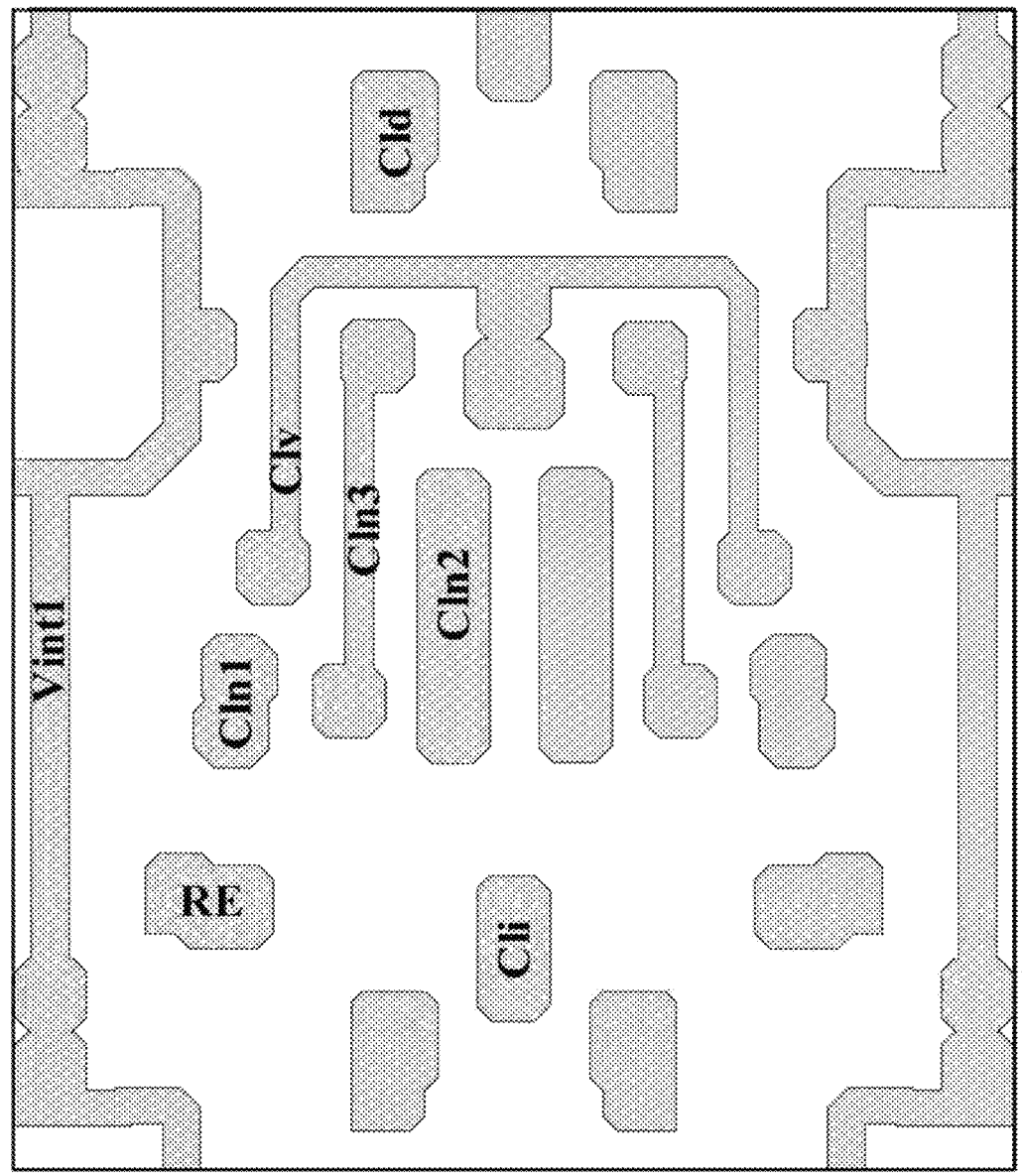
FIG. 5K is a diagram illustrating the structure of a first signal line layer in the array substrate depicted in FIG. 5A.
Figure 5L:
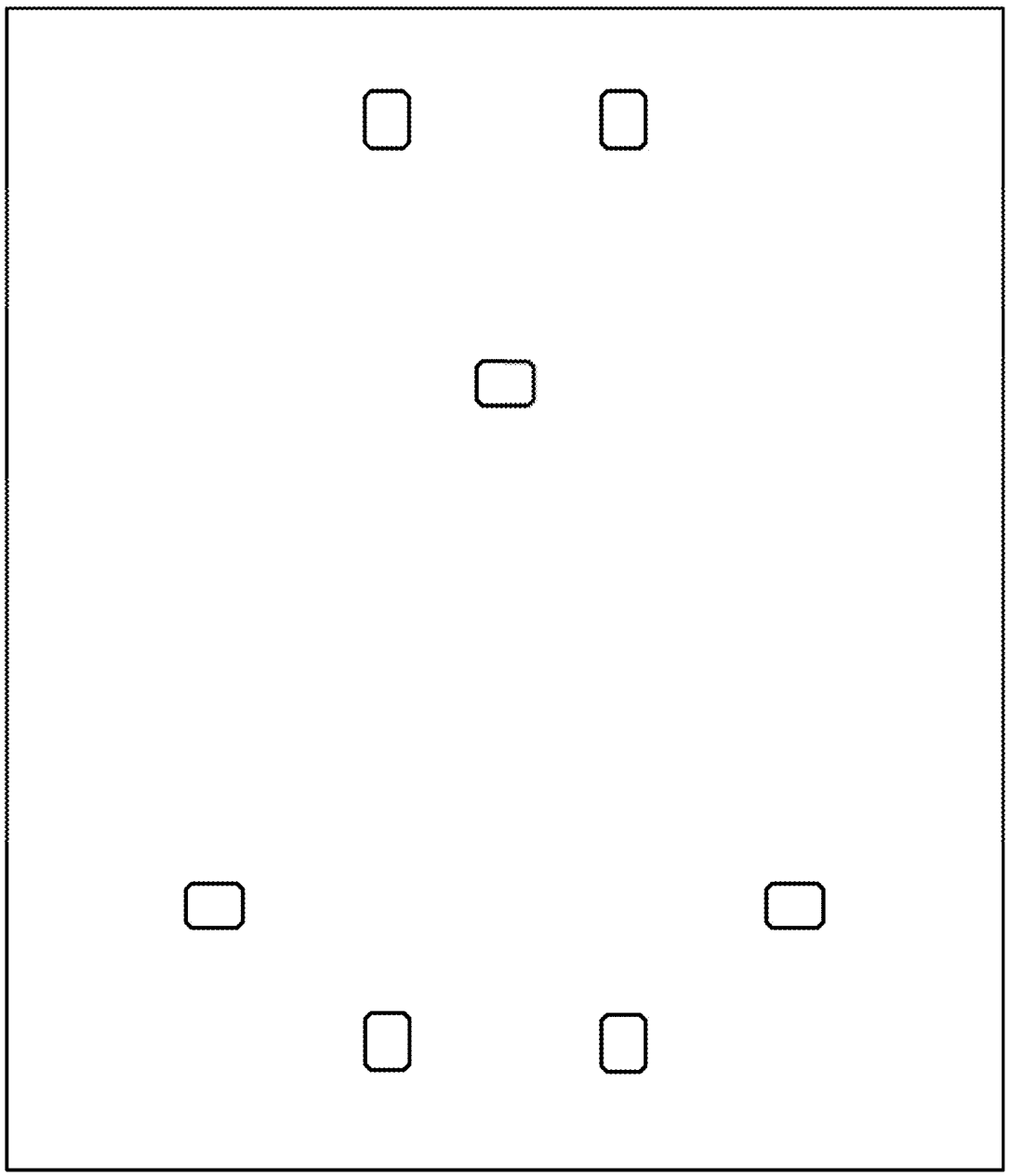
FIG. 5L is a diagram illustrating vias extending through a first planarization layer in the array substrate depicted in FIG. 5A.
Figure 5M:
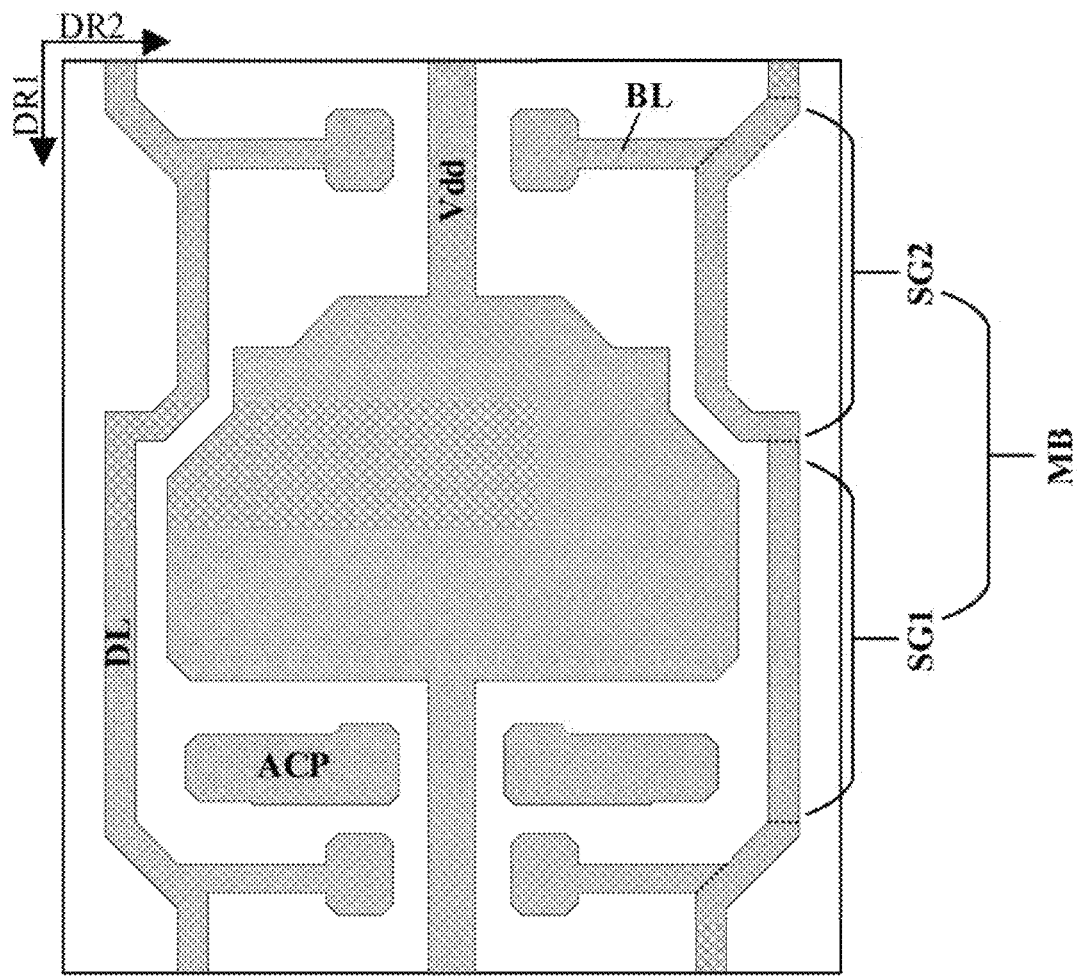
FIG. 5M is a diagram illustrating the structure of a second signal line layer in the array substrate depicted in FIG. 5A.
Figure 5N:
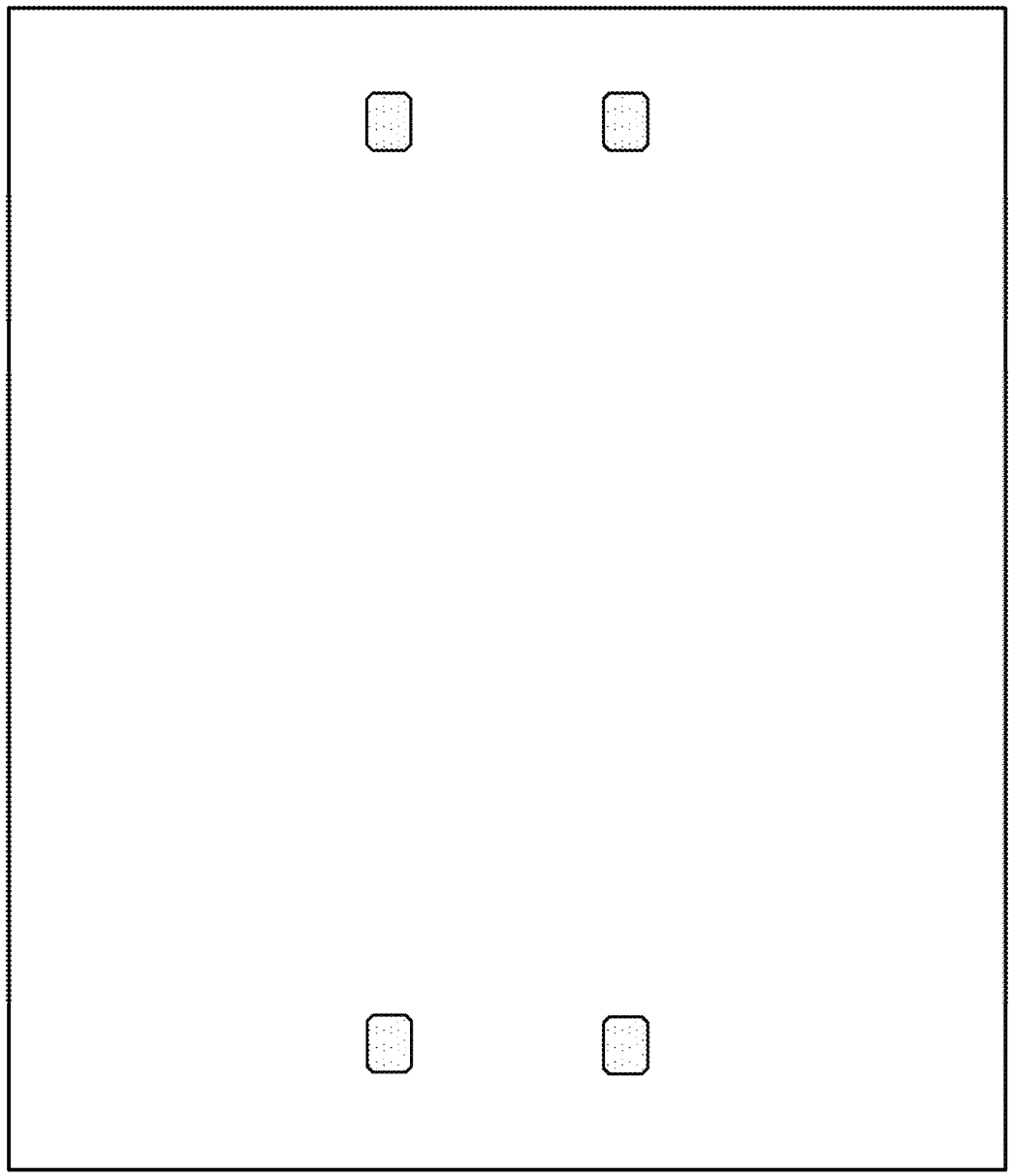
FIG. 5N is a diagram illustrating vias extending through a second planarization layer in the array substrate depicted in FIG. 5A.
Figure 5O:
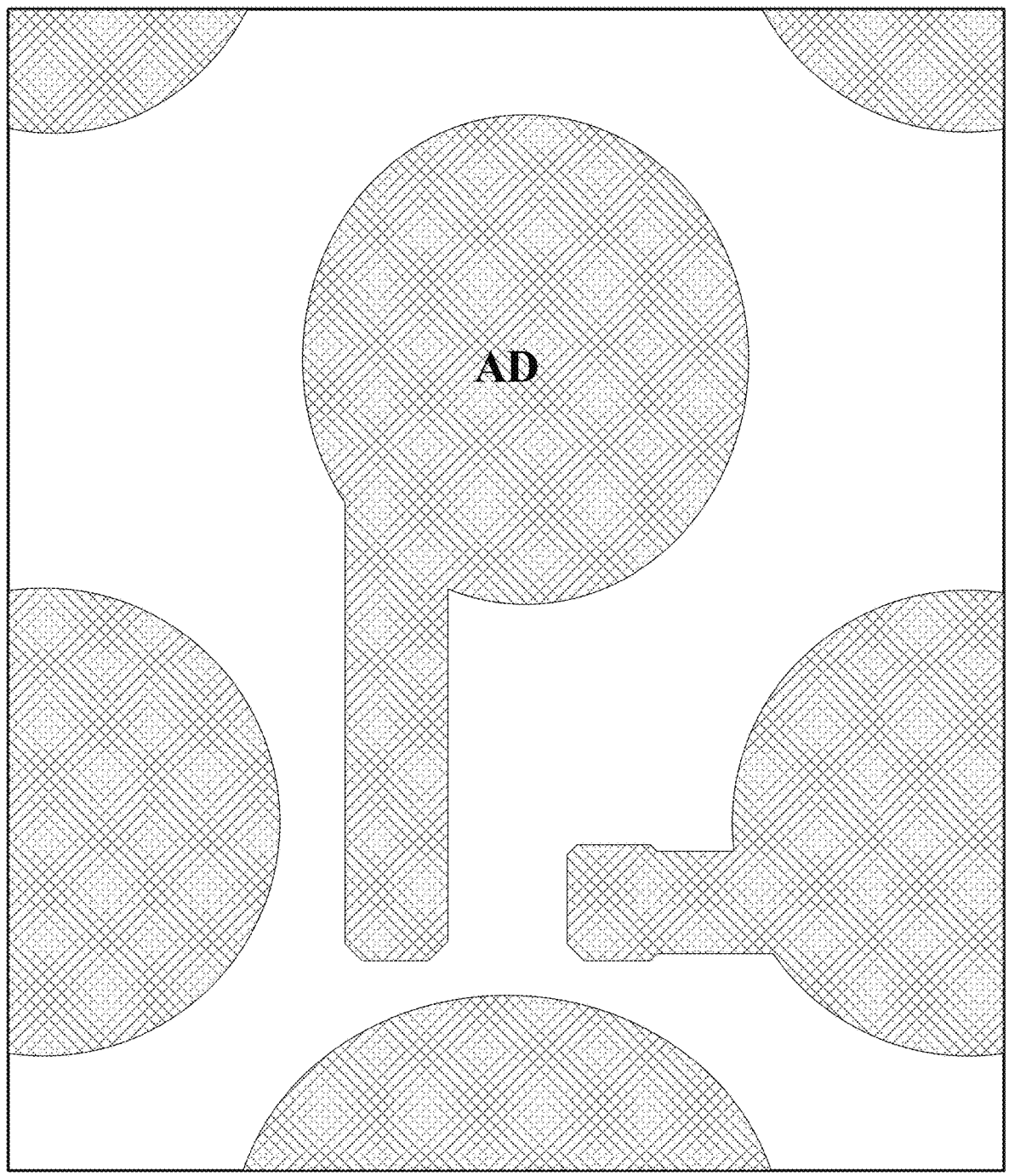
FIG. 5O is a diagram illustrating the structure of an anode layer in the array substrate depicted in FIG. 5A.
Figure 6A:
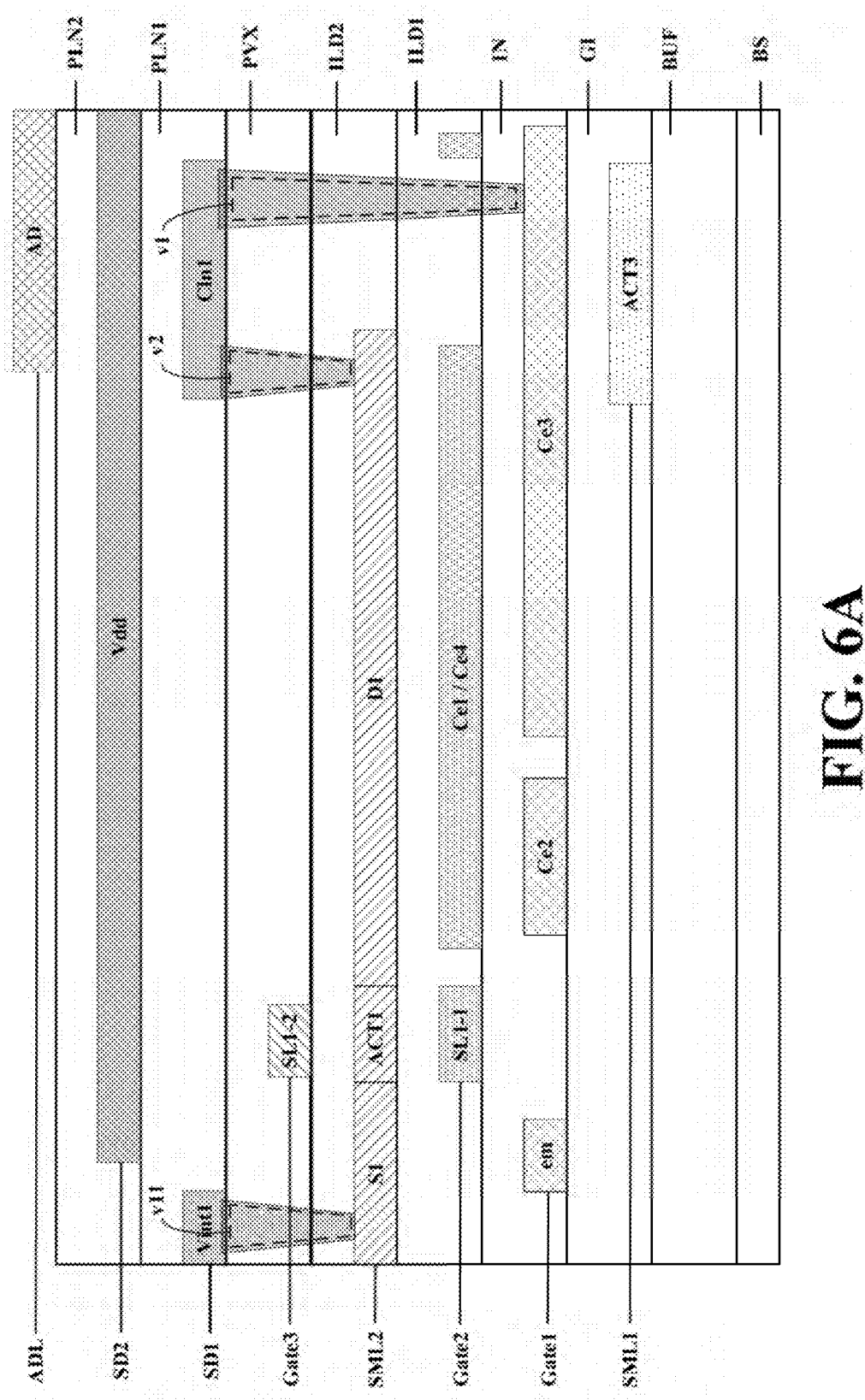
FIG. 6A is a cross-sectional view along an A-A' line in FIG. 5A.
Figure 6B:
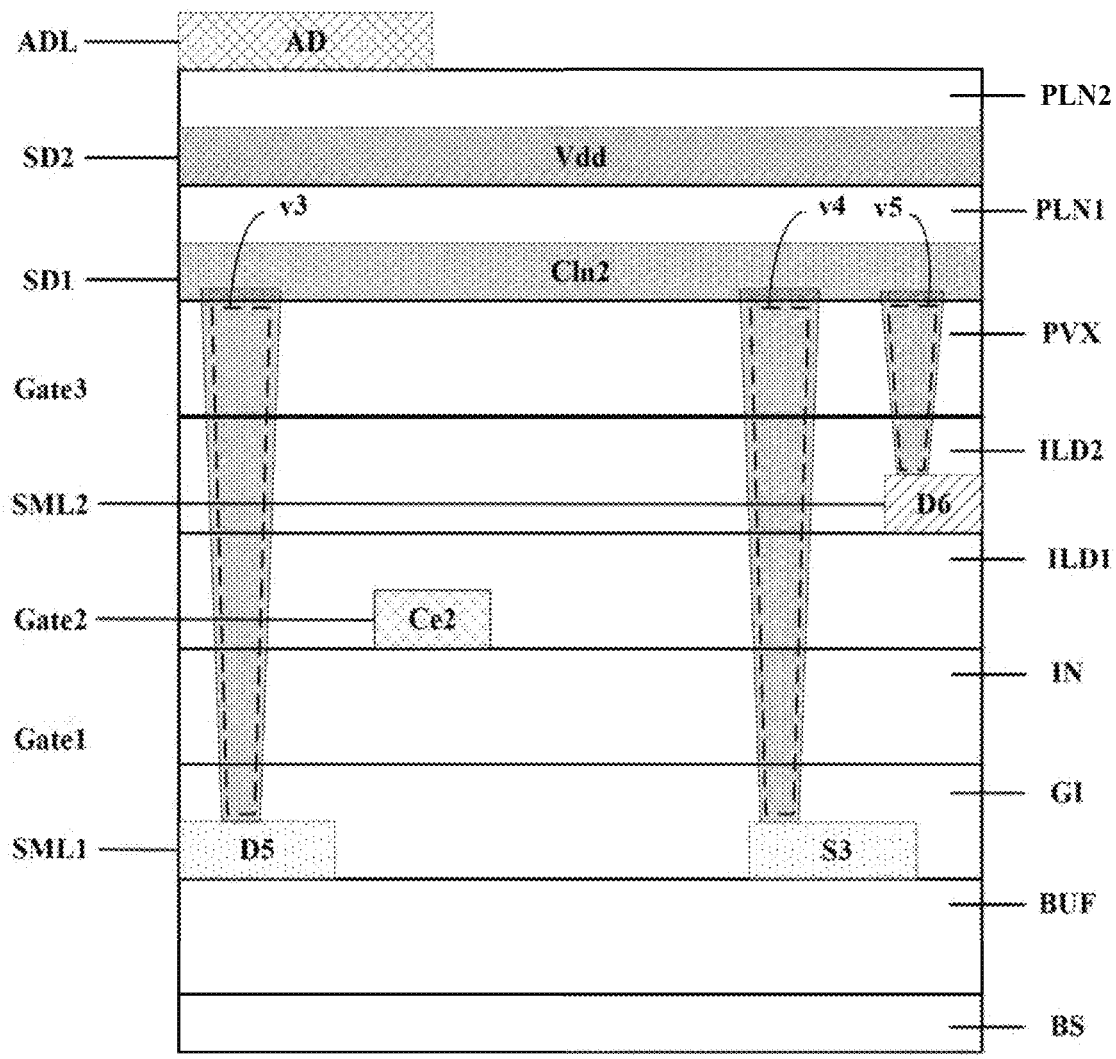
FIG. 6B is a cross-sectional view along a B-B' line in FIG. 5A.
Figure 6C:
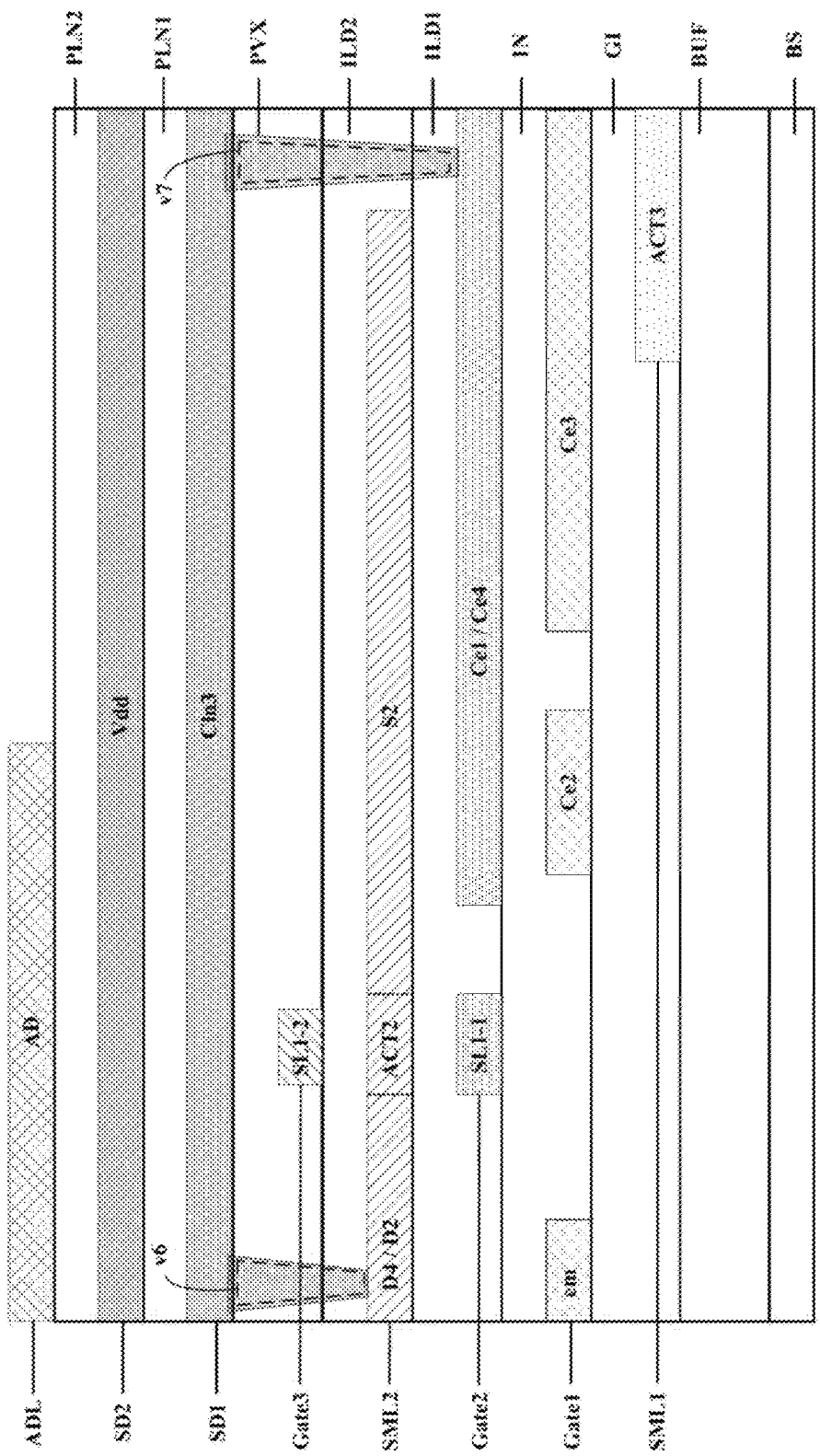
FIG. 6C is a cross-sectional view along a C-C' line in FIG. 5A.
Figure 6D:
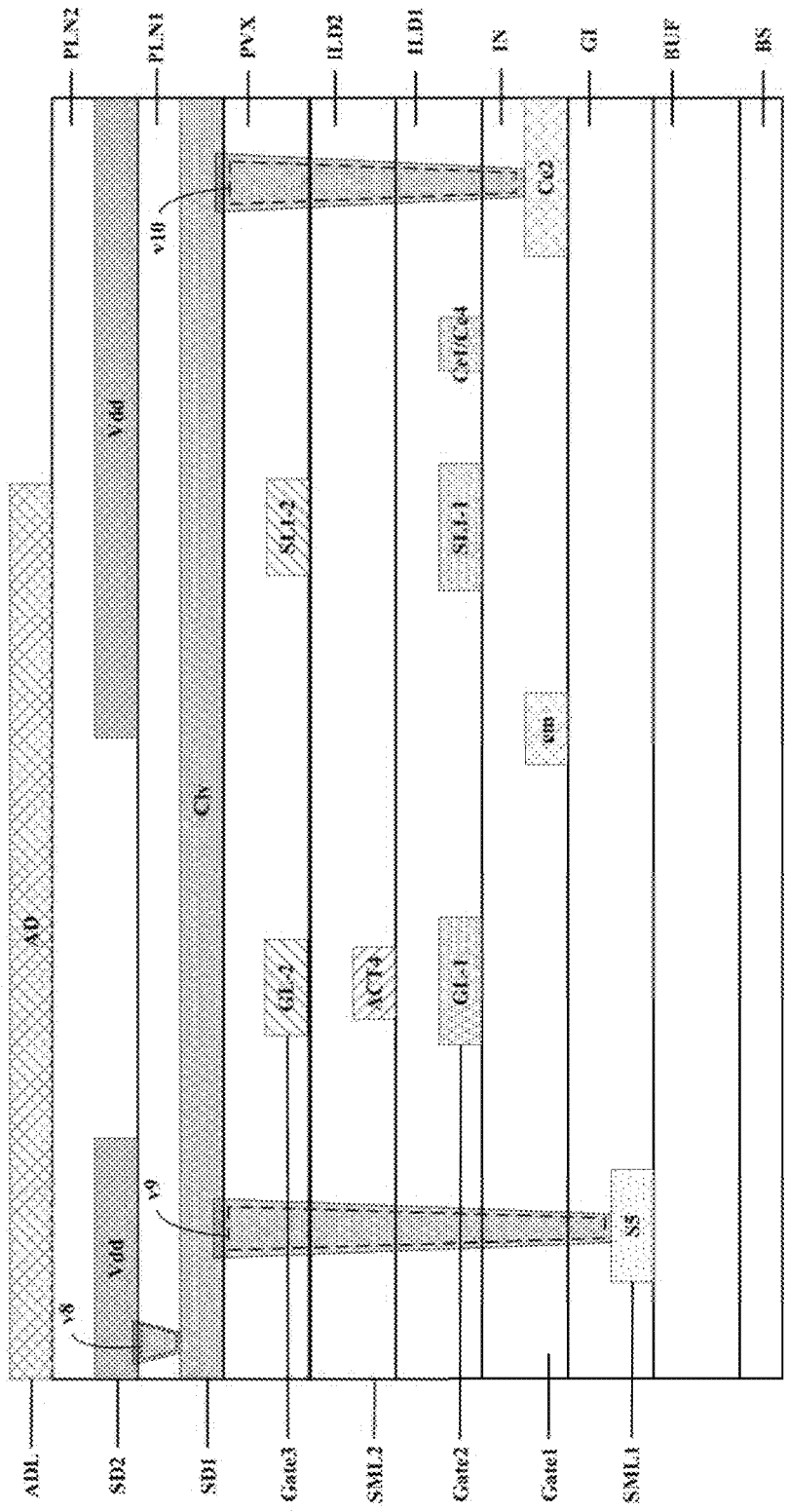
FIG. 6D is a cross-sectional view along a D-D' line in FIG. 5A.

FIG. 5C is a diagram illustrating the structure of a first semiconductor material layer in the array substrate depicted in FIG. 5A. FIG. 5D is a diagram illustrating the structure of a first gate metal layer in the array substrate depicted in FIG. 5A. FIG. 5E is a diagram illustrating the structure of a second gate metal layer in the array substrate depicted in FIG. 5A. FIG. 5F is a diagram illustrating vias extending through a first inter-layer dielectric layer in the array substrate depicted in FIG. 5A. FIG. 5G is a diagram illustrating the structure of a second semiconductor material layer in the array substrate depicted in FIG. 5A. FIG. 5H is a diagram illustrating vias extending through a second inter-layer dielectric layer in the array substrate depicted in FIG. 5A. FIG. 5I is a diagram illustrating the structure of a third gate metal layer in the array substrate depicted in FIG. 5A. FIG. 5J is a diagram illustrating vias extending through a passivation layer in the array substrate depicted in FIG. 5A. FIG. 5K is a diagram illustrating the structure of a first signal line layer in the array substrate depicted in FIG. 5A. FIG. 5L is a diagram illustrating vias extending through a first planarization layer in the array substrate depicted in FIG. 5A. FIG. 5M is a diagram illustrating the structure of a second signal line layer in the array substrate depicted in FIG. 5A. FIG. 5N is a diagram illustrating vias extending through a second planarization layer in the array substrate depicted in FIG. 5A. FIG. 5O is a diagram illustrating the structure of an anode layer in the array substrate depicted in FIG. 5A. FIG. 6A is a cross-sectional view along an A-A' line in FIG. 5A. FIG. 6B is a cross-sectional view along a B-B' line in FIG. 5A. FIG. 6C is a cross-sectional view along a C-C' line in FIG. 5A. FIG. 6D is a cross-sectional view along a D-D' line in FIG. 5A.

Referring to FIG. 5A to FIG. 5O, and FIG. 6A to FIG. 6D, the array substrate in some embodiments includes a base substrate BS, a buffer layer BUF on the base substrate BS, a first semiconductor material layer SML1 on a side of the buffer layer BUF away from the base substrate BS, a gate insulating layer G1 on a side of the first semiconductor material layer SML1 away from the base substrate BS, a first gate metal layer Gate1 on a side of the gate insulating layer G1 away from the first semiconductor material layer SML1, an insulating layer IN on a side of the first gate metal layer Gate1 away from the gate insulating layer G1, a second gate metal layer Gate2 on a side of the insulating layer IN away from the first gate metal layer Gate1, a first inter-layer dielectric layer ILD1 on a side of the second gate metal layer Gate2 away from the insulating layer IN, a second semiconductor material layer SML2 on a side of the first inter-layer dielectric layer ILD1 away from the second gate metal layer Gate2, a second inter-layer dielectric layer ILD2 on a side of the second semiconductor material layer SML2 away from the first inter-layer dielectric layer ILD1, a third gate metal layer Gate3 on a side of the second inter-layer dielectric layer ILD2 away from the second semiconductor material layer SML2, a passivation layer PVX on a side of the third gate metal layer Gate3 away from the second inter-layer dielectric layer ILD2, a first signal line layer SD1 on a side of the passivation layer PVX away from the third gate metal layer Gate3, a first planarization layer PLN1 on a side of the first signal line layer SD1 away from the passivation layer PVX, a second signal line layer SD2 on a side of the first planarization layer PLN1 away from the first signal line layer SD1, a second planarization layer PLN2 on a side of the second signal line layer SD2 away from the first planarization layer PLN1, and an anode layer ADL on a side of the second planarization layer PLN2 away from the second signal line layer SD2.

Referring to FIG. 2B, FIG. 5A, FIG. 5C, FIG. 6A to FIG. 6D, the first semiconductor material layer SML1 in some embodiments includes at least active layers of multiple transistors of the pixel driving circuit, including the driving transistor T3, the light emitting control transistor T5, the second reset transistor T7, and the control transistor TH. Optionally, the first semiconductor material layer SML1 further includes at least respective portions of first electrodes of multiple transistors of the pixel driving circuit, including the driving transistor T3, the light emitting control transistor T5, the second reset transistor T7, and the control transistor T8. Optionally, the first semiconductor material layer SML1 further includes at least respective portions of second electrodes of multiple transistors of the pixel driving circuit, including the driving transistor T3, the light emitting control transistor T5, the second reset transistor T7, and the control transistor T8. Optionally, the first semiconductor material layer SML1 includes active layers, first electrodes, and second electrodes of multiple transistors of the pixel driving circuit, including the driving transistor T3, the light emitting control transistor T5, the second reset transistor T7, and the control transistor T8. Various appropriate semiconductor materials may be used for making the first semiconductor material layer SML1. Examples of the semiconductor materials for making the first semiconductor material layer SML1 include silicon-based semiconductor materials such as polycrystalline silicon, single-crystal silicon, and amorphous silicon.

In FIG. 5C, a pixel driving circuit corresponding to PDC2 in FIG. 5B is annotated with labels indicating components of each of multiple transistors (T3, T5, T7, and T8) in the pixel driving circuit. For example, the driving transistor T3 includes an active layer ACT3, a first electrode S3, and a second electrode D3. The light emitting control transistor T5 includes an active layer ACT5, a first electrode S5, and a second electrode D5. The second reset transistor T7 includes an active layer ACT7, a first electrode S7, and a second electrode D7. The control transistor T8 includes an active layer ACT8, a first electrode S8, and a second electrode D8.

Optionally, the active layers (ACT3, ACT5, ACT7, and ACT8), the first electrodes (S3, S5, S7, and S8), and the second electrodes (D3, D5, D7, and D8) of the respective transistors (T3, T5, T7, and T8) are in a same layer.

In some embodiments, the active layers (ACT3, ACT7, and ACT8), at least portions of the first electrodes (S3, S7, and S8), and at least portions of the second electrodes (D3, D7, and D8) of multiple transistors (T3, T7, and T8) in the pixel driving circuit are parts of a unitary structure. Optionally, a part of the light emitting control transistor T5 (ACT5, S5, D5) in the first semiconductor material layer is spaced apart from the unitary structure (T3, T7, and T8) in a same pixel driving circuit.

In some embodiments, active layers and at least portions of first electrodes of two adjacent light emitting control transistors in two adjacent pixel driving circuits (e.g., two adjacent pixel driving circuits in a same row) are parts of a unitary structure. Optionally, active layers, at least portions of first electrodes, and at least portions of second electrodes of two adjacent light emitting control transistors in two adjacent pixel driving circuits (e.g., two adjacent pixel driving circuits in a same row) are parts of a unitary structure. Optionally, the first electrodes of the two adjacent light emitting control transistors in the two adjacent pixel driving circuits in the same row are directly connected to each other.

Referring to FIG. 2B, FIG. 5A, FIG. 5D, and FIG. 6A to FIG. 6D, the first gate metal layer Gate1 in some embodiments includes a plurality of light emitting control signal lines em, a plurality of second control signal lines SL2, at least portions of a plurality of third control signal lines (e.g., a respective third control signal line first branch SL3-1), a second capacitor electrode Ce2 of the first capacitor C1, and a third capacitor electrode Ce3 of the second capacitor C2 in the pixel driving circuit.

Various appropriate electrode materials and various appropriate fabricating methods may be used to make the first gate metal layer Gate1. For example, a conductive material may be deposited on the substrate by a plasma-enhanced chemical vapor deposition (PECVD) process and patterned. Examples of appropriate conductive materials for making the first gate metal layer Gate1 include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. Optionally, the plurality of light emitting control signal lines em, the plurality of second control signal lines SL2, the at least portions of the plurality of third control signal lines (e.g., the respective third control signal line first branch SL3-1), the second capacitor electrode Ce2 of the first capacitor C1, and the third capacitor electrode Ce3 of the second capacitor C2 in the pixel driving circuit are in a same layer.

As used herein, the term "same layer" refers to the relationship between the layers simultaneously formed in the same step. In one example, the plurality of light emitting control signal lines em and the second capacitor electrode Ce2 are in a same layer when they are formed as a result of one or more steps of a same patterning process performed in a same layer of material. In another example, the plurality of light emitting control signal lines em and the second capacitor electrode Ce2 can be formed in a same layer by simultaneously performing the step of forming the plurality of light emitting control signal lines em, and the step of forming the second capacitor electrode Ce2. The term "same layer" does not always mean that the thickness of the layer or the height of the layer in a cross-sectional view is the same.

Referring to FIG. 5D, a plurality of second capacitor electrodes in a plurality of pixel driving circuits are connected to each other, and are parts of a unitary structure. By having second capacitor electrodes connected to each other, a resistance of the plurality voltage supply lines Vdd can be reduced because the second capacitor electrodes are electrically connected to the plurality of voltage supply line Vdd. The inventors of the present disclosure discover that this structure improves display uniformity in the array substrate.

Referring to FIG. 2B, FIG. 5A, FIG. 5E, and FIG. 6A to FIG. 6D, the second gate metal layer Gate2 in some embodiments includes at least portions of a plurality of gate lines (e.g., a respective gate line first branch GL-1), at least portions of a plurality of first control signal lines (e.g., a respective first control signal line first branch SL1-1), at least portions of a plurality of third control signal lines (e.g., a respective third control signal line second branch SL3-2), a first capacitor electrode Ce1 of the first capacitor C1, and a fourth capacitor electrode Ce4 of the second capacitor C2 in the pixel driving circuit. Various appropriate electrode materials and various appropriate fabricating methods may be used to make the second gate metal layer Gate2. For example, a conductive material may be deposited on the substrate by a plasma-enhanced chemical vapor deposition (PECVD) process and patterned. Examples of appropriate conductive materials for making the second gate metal layer Gate2 include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. Optionally, the at least portions of the plurality of gate lines (e.g., the respective gate line first branch GL-1), the at least portions of the plurality of first control signal lines (e.g., the respective first control signal line first branch SL1-1), the at least portions of the plurality of third control signal lines (e.g., the respective third control signal line second branch SL3-2), the first capacitor electrode Ce1 of the first capacitor C1, and the fourth capacitor electrode Ce4 of the second capacitor C2 in the pixel driving circuit are in a same layer.

Optionally, the first capacitor electrode Ce1 of the first capacitor C1 and the fourth capacitor electrode Ce4 of the second capacitor C2 in the pixel driving circuit are parts of a unitary structure.

Vias extending through the first inter-layer dielectric layer ILD1 are depicted in FIG. 5F.

Referring to FIG. 28, FIG. 5A, FIG. 5G, and FIG. 6A to FIG. 6D, the second semiconductor material layer SML2 in some embodiments includes at least an active layer ACT1 of the first reset transistor T1, an active layer ACT2 of the compensating transistor T2, an active layer ACT4 of the data write transistor T4, and an active layer ACT6 of the third reset transistor T6 in the pixel driving circuit. Optionally, the second semiconductor material layer SML2 further includes at least a portion of a first electrode S1 of the first reset transistor T1, at least a portion of a first electrode S2 of the compensating transistor T2, at least a portion of a first electrode S4 of the data write transistor T4, and at least a portion of a first electrode S6 of the third reset transistor T6 in the pixel driving circuit. Optionally, the second semiconductor material layer SML2 further includes at least a portion of a second electrode D1 of the first reset transistor T1, at least a portion of a second electrode D2 of the compensating transistor T2, at least a portion of a second electrode D4 of the data write transistor T4, and at least a portion of a second electrode D6 of the third reset transistor T6 in the pixel driving circuit. Optionally, the second semiconductor material layer SML2 includes the active layer ACT1, the first electrode S1, and the second electrode D1 of the first reset transistor T1; the active layer ACT2, the first electrode S2, and the second electrode D2 of the compensating transistor T2; the active layer ACT4, the first electrode S4, and the second electrode D4 of the data write transistor T4; and the active layer ACT6, the first electrode S6, and the second electrode D6 of the third reset transistor T6 in the pixel driving circuit. In the present array substrate, at least the active layer ACT1 of the first reset transistor T1, the active layer ACT2 of the compensating transistor T2, the active layer ACT4 of the data write transistor T4, and the active layer ACT6 of the third reset transistor T6 are in a layer different from at least the active layers of other transistors of the pixel driving circuit. Various appropriate semiconductor materials may be used for making the second semiconductor material layer SML2. Examples of the semiconductor materials for making the second semiconductor material layer SML2 include metal oxide-based semiconductor material such as indium gallium zinc oxide and metal oxynitride-based semiconductor materials such as zinc oxynitride.

In FIG. 5G, a pixel driving circuit corresponding to PDC2 in FIG. 5B is annotated with labels indicating components of each of multiple transistors (T1, T2, T4, and T6) in the pixel driving circuit. For example, the first reset transistor T1 includes an active layer ACT1, a first electrode S1, and the second electrode D1. The compensating transistor T2 includes an active layer ACT2, a first electrode S2, and a second electrode D2. The data write transistor T4 includes an active layer ACT4, a first electrode S4, and a second electrode D4. The third reset transistor T6 includes an active layer ACT6, a first electrode S6, and a second electrode D6.

In some embodiments, the active layers (ACT2, ACT4, and ACT6), at least portions of the first electrodes (S2, S4, and S6), and at least portions of the second electrodes (D2, D4, and D6) of multiple transistors (T2, T4, and T6) in the pixel driving circuit are parts of a unitary structure. Optionally, at least a part of the first reset transistor T1 (ACT1, S1, D1) in the second semiconductor material layer is spaced apart from the unitary structure (T2, T4, and T6) in a same pixel driving circuit.

In some embodiments, active layers and at least portions of first electrodes of two adjacent third reset transistors in two adjacent pixel driving circuits (e.g., two adjacent pixel driving circuits in a same row) are parts of a unitary structure. Optionally, active layers, at least portions of first electrodes, and at least portions of second electrodes of two adjacent third reset transistors in two adjacent pixel driving circuits (e.g., two adjacent pixel driving circuits in a same row) are parts of a unitary structure. Optionally, in the unitary structure, the first electrodes of the two adjacent third reset transistors in the two adjacent pixel driving circuits in the same row are directly connected to each other.

In some embodiments, active layers, at least portions of first electrodes, and at least portions of second electrodes of two adjacent third reset transistors in two adjacent pixel driving circuits (e.g., two adjacent pixel driving circuits in a same row); active layers, at least portions of first electrodes, and at least portions of second electrodes of two adjacent compensating transistors in two adjacent pixel driving circuits (e.g., two adjacent pixel driving circuits in a same row); and active layers, at least portions of first electrodes, and at least portions of second electrodes of two adjacent data write transistors in two adjacent pixel driving circuits (e.g., two adjacent pixel driving circuits in a same row) are parts of a unitary structure. Optionally, in the unitary structure, the first electrodes of the two adjacent third reset transistors in the two adjacent pixel driving circuits in the same row are directly connected to each other.

Vias extending through the second inter-layer dielectric layer ILD2 are depicted in FIG. 5H.

Referring to FIG. 2B, FIG. 5A, FIG. 5I, FIG. 6A to FIG. 6D, the third gate metal layer Gate3 in some embodiments includes at least portions of a plurality of gate lines (e.g., a respective gate line second branch GL-2), at least portions of a plurality of first control signal lines (e.g., a respective first control signal second branch SL1-2), at least portions of a plurality of third control signal lines (e.g., a respective third control signal line third branch SL3-3), a plurality of second reset signal lines Vint2, and a plurality of third reset signal lines Vint3. Various appropriate electrode materials and various appropriate fabricating methods may be used to make the third gate metal layer Gate3. For example, a conductive material may be deposited on the substrate by a plasma-enhanced chemical vapor deposition (PECVD) process and patterned. Examples of appropriate conductive materials for making the third gate metal layer Gate3 include, but are not limited to, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like.

Vias extending through the passivation layer PVX are depicted in FIG. 5J.

Referring to FIG. 2B, FIG. 5A, FIG. 5K, FIG. 6A to FIG. 6D, the first signal line layer SD1 in some embodiments includes a plurality of first reset signal lines Vint1; a first node connecting line Cln1, a second node connecting line Cln2, a third node connecting line Cln3, a data connecting line Cld, a voltage supply connecting line Clv, a reset signal connecting line Cli, and a relay electrode RE.

Various appropriate conductive materials and various appropriate fabricating methods may be used to make the first signal line layer. For example, a conductive material may be deposited on the substrate by a plasma-enhanced chemical vapor deposition (PECVD) process and patterned. Examples of appropriate conductive materials for making the first signal line layer include, but are not limited to, titanium, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. In some embodiments, the first signal line layer includes a plurality of sub-layers stacked together. In one example, the first signal line layer includes a stacked titanium/aluminum/titanium multi-layer structure. In another example, the first signal line layer includes a stacked molybdenum/aluminum/molybdenum multi-layer structure.

Optionally, the plurality of first reset signal lines Vint1, the first node connecting line Cln1, the second node connecting line Cln2, the third node connecting line Cln3, the data connecting line Cld, the voltage supply connecting line Clv, the reset signal connecting line Cli, and the relay electrode RE are in a same layer.

In some embodiments, the first node connecting line Cln1 connects multiple components of the pixel driving circuit to the node N1. Referring to FIG. 6A, in the pixel driving circuit, the first node connecting line Cln1 is connected to the third capacitor electrode Ce3 of the second capacitor C2 through a first via v1, and connected to the first reset transistor T1 (e.g., to the second electrode D1 of the first reset transistor T1) through a second via v2. Optionally, the first node connecting line Cln1 corresponds to the node N1 depicted in FIG. 2B. In one example, the first via v1 extends through the passivation layer PVX, the second inter-layer dielectric layer ILD2, the first inter-layer dielectric layer ILD1, and the insulating layer IN. In another example, the second via v2 extends through the passivation layer PVX and the second inter-layer dielectric layer ILD2.

In some embodiments, the second node connecting line Cln2 connects multiple components of the pixel driving circuit to the node N2. Referring to FIG. 6B, in the pixel driving circuit, the second node connecting line Cln2 is connected to the second electrode D5 of the light emitting control transistor T5 through a third via v3, the first electrode S3 of the driving transistor T3 through a fourth via v4, and the second electrode D6 of the third reset transistor T6 through a fifth via v5. Optionally, the second node connecting line Cln2 corresponds to the node N2 depicted in FIG. 2B. In one example, the third via v3 extends through the passivation layer PVX, the second inter-layer dielectric layer ILD2, the first inter-layer dielectric layer ILD1, the insulating layer IN, and the gate insulating layer G1. In another example, the fourth via v4 extends through the passivation layer PVX, the second inter-layer dielectric layer ILD2, the first inter-layer dielectric layer ILD1, the insulating layer IN, and the gate insulating layer G1. In another example, the fifth via v5 extends through the passivation layer PVX and the second inter-layer dielectric layer ILD2.

In some embodiments, the third node connecting line Cln3 connects multiple components of the pixel driving circuit to the node N3. Referring to FIG. 6C, in the pixel driving circuit, the third node connecting line Cln3 is connected to second electrodes of the compensating transistor T2 and the data write transistor T4 through a sixth via v6, and is connected to the first capacitor electrode Ce1 of the first capacitor C1 and/or the fourth capacitor electrode Ce4 of the second capacitor C2 through a seventh via v7. Optionally, the third node connecting line Cln3 corresponds to the node N3 depicted in FIG. 2B. In one example, the sixth via v6 extends through the passivation layer PVX and the second inter-layer dielectric layer ILD2. In another example, the seventh via v7 extends through the passivation layer PVX, the second inter-layer dielectric layer ILD2, and the first inter-layer dielectric layer ILD1.

In some embodiments, the voltage supply connecting line Clv connects multiple components of the pixel driving circuit to a respective voltage supply line of the plurality of voltage supply lines Vdd. Referring to FIG. 6D, in the pixel driving circuit, the respective voltage supply line of the plurality of voltage supply lines Vdd is connected to the voltage supply connecting line Clv through an eighth via v8. The voltage supply connecting line Clv is connected to a second electrode S5 of the light emitting control transistor T5 through a ninth via v9, and is connected to the second capacitor electrode Ce2 of the first capacitor C1 through a tenth via v10. In one example, the eighth via v8 extends through the first planarization layer PLN1. In another example, the ninth via v9 extends through the passivation layer PVX, the second inter-layer dielectric layer ILD2, the first inter-layer dielectric layer ILD1, the insulating layer IN, and the gate insulating layer G1. In another example, the tenth via v10 extends through the passivation layer PVX, the second inter-layer dielectric layer ILD2, the first inter-layer dielectric layer ILD1, and the insulating layer IN.

In some embodiments, referring to FIG. 6A, a respective first reset signal line of the plurality of first reset signal lines Vint1 is connected to a first electrode S1 of the first reset transistor T1 through an eleventh via v11. In one example, the eleventh via v11 extends through the passivation layer PVX and the second inter-layer dielectric layer ILD2.

Figure 7A:
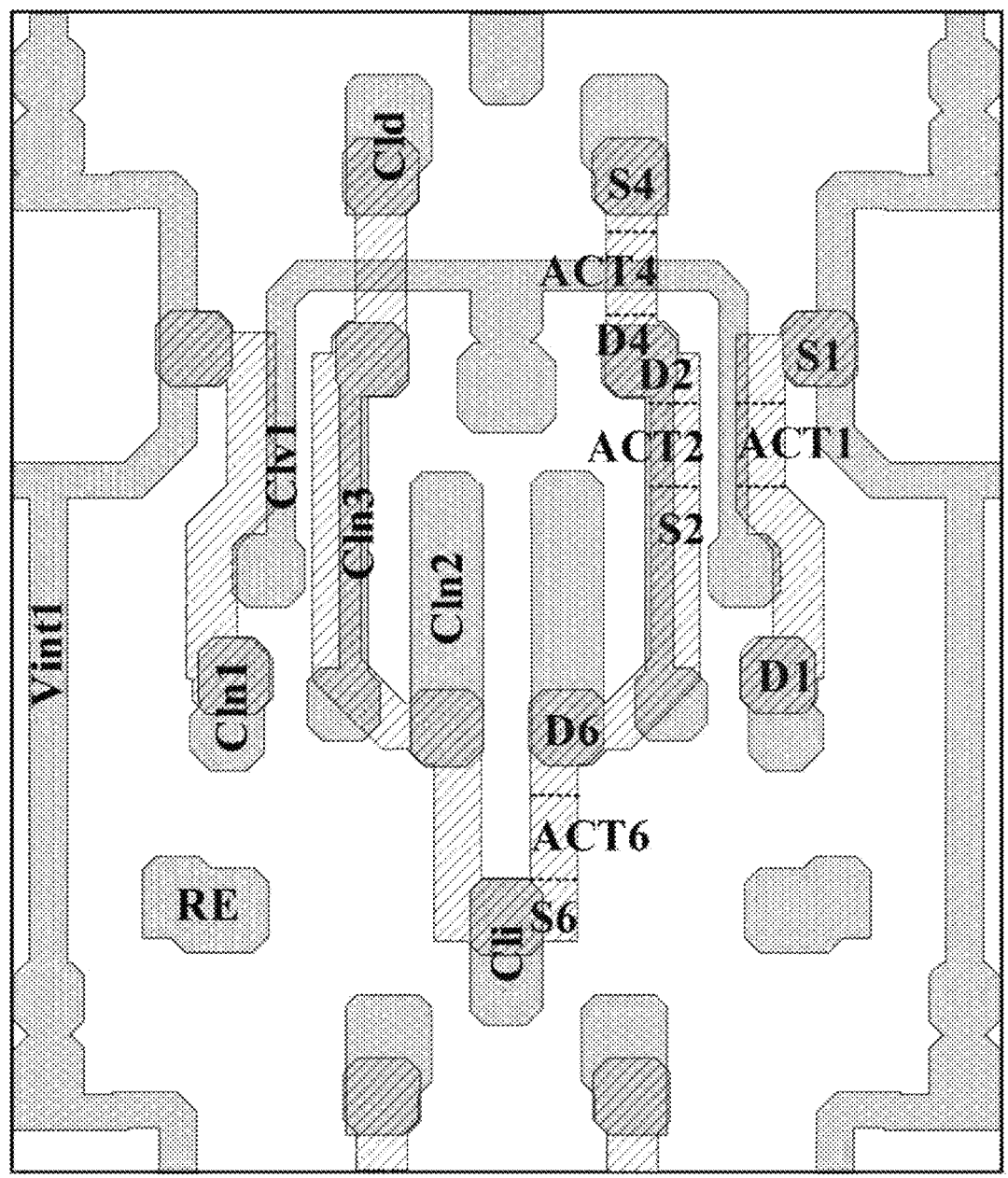
FIG. 7A is a diagram illustrating the structure of a second semiconductor material layer and a first signal line layer in the array substrate depicted in FIG. 5A.

FIG. 7A is a diagram illustrating the structure of a second semiconductor material layer and a first signal line layer in the array substrate depicted in FIG. 5A. In some embodiments, referring to FIG. 7A, an orthographic projection of the third node connecting line Cln3 on a base substrate BS at least partially (e.g., at least 5%, at least 10%, at least 15%, at least 20%, at least 25%, at least 30%, at least 35%, at least 40%, at least 45%, at least 50%, at least 55%, at least 60% at least 65%, at least 70%, at least 75%, at least 80%, at least 85%, at least 90%, at least 95%, at least 98%, or at least 99%) overlaps with an orthographic projection of the active layer ACT2 of the compensating transistor T2 on the base substrate. Optionally, the third node connecting line Cln3 extends along a direction substantially parallel to a direction along which the active layer ACT2 of the compensating transistor T2 extends. Optionally, the orthographic projection of the third node connecting line Cln3 on a base substrate BS at least partially overlaps with an orthographic projection of the first electrode S2 of the compensating transistor T2 on the base substrate. Optionally, the orthographic projection of the third node connecting line Cln3 on a base substrate BS at least partially overlaps with an orthographic projection of the second electrode D2 of the compensating transistor T2 on the base substrate.

Referring to FIG. 5K, and FIG. 6O, in some embodiments, the voltage supply connecting line Clv connects multiple components of two adjacent pixel driving circuits in a same row to a respective voltage supply line of the plurality of voltage supply lines Vdd. In some embodiments, the respective voltage supply line of the plurality of voltage supply lines Vdd is connected to the voltage supply connecting line Clv, e.g., through the eighth via v8. The voltage supply connecting line Clv is connected to first electrodes of two adjacent light emitting control transistors of two adjacent pixel driving circuits in the same row through the ninth via v9. The first electrodes of two adjacent light emitting control transistors of two adjacent pixel driving circuits in the same row are parts of a unitary structure. The voltage supply connecting line Clv is connected to second capacitor electrodes of first capacitors of two adjacent pixel driving circuits in the same row, respectively through different vias.

Figure 7B:
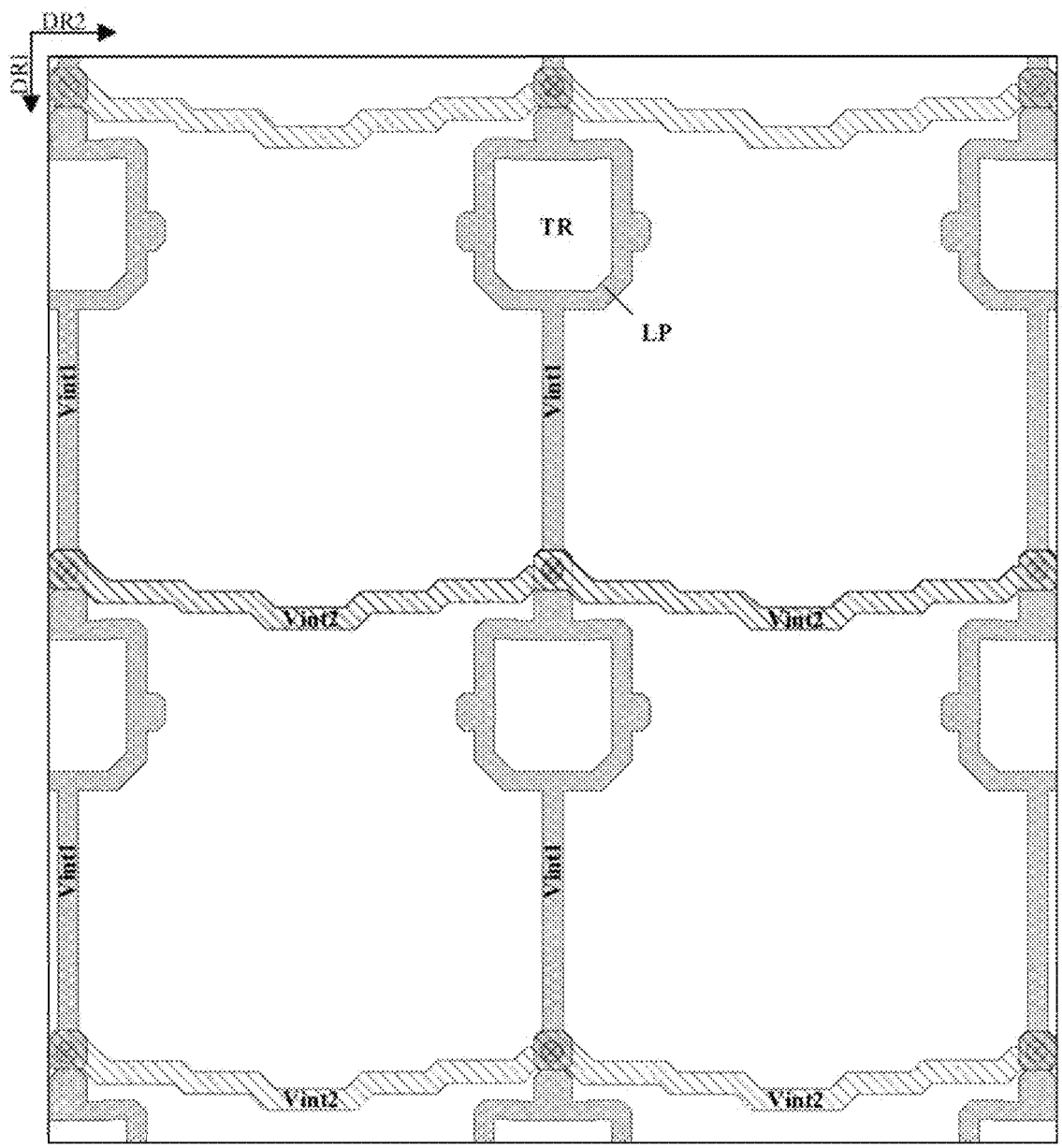
FIG. 7B is a diagram illustrating the structure of a reset signal line network in some embodiments according to the present disclosure.

FIG. 7B is a diagram illustrating the structure of a reset signal line network in some embodiments according to the present disclosure. Referring to FIG. 7B, the array substrate in some embodiments includes an interconnected reset signal line network. In some embodiments, the interconnected reset signal line network includes a plurality of first reset signal lines Vint1 and a plurality of second reset signal lines Vint2 interconnected together. Optionally, the plurality of first reset signal lines Vint1 extend along a direction substantially parallel to the first direction DR1. Optionally, the plurality of second reset signal lines Vint2 extend along a direction substantially parallel to the second direction DR2. Optionally, the plurality of first reset signal lines Vint1 and the plurality of second reset signal lines Vint2 are in different layers. In one example, the plurality of first reset signal lines Vint1 are in the first signal line layer, and the plurality of second reset signal lines Vint2 are in the third gate metal layer. In some embodiments, a respective first reset signal line of the plurality of first reset signal lines Vint1 is connected to one or more second reset signal lines of the plurality of second reset signal lines Vint2. In some embodiments, a respective second reset signal line of the plurality of second reset signal lines Vint2 is connected to one or more first reset signal lines of the plurality of first reset signal lines Vint1, thereby forming the interconnected reset signal line network.

Referring to FIG. 7B, in some embodiments, a respective first reset signal line of the plurality of first reset signal lines Vint1 includes a plurality of loops LP arranged along a direction substantially parallel to the first direction DR1. A respective loop of the plurality of loops LP is connected to first electrodes of two adjacent first reset transistors of two adjacent pixel driving circuits in a same row.

Referring to FIG. 5A, FIG. 5G, FIG. 5I, and FIG. 5K, in some embodiments, the reset signal connecting line Cli in the first signal line layer is connected to a respective third reset signal line of the plurality of third reset signal lines Vint3 in the third gate metal layer, and is connected to a first electrode S6 of the third reset transistor T6 in the second semiconductor material layer. Optionally, the reset signal connecting line Cli is connected to first electrodes of two adjacent third reset transistors of two adjacent pixel driving circuits in a same row.

Vias extending through the first planarization layer PLN1 are depicted in FIG. 5L.

Referring to FIG. 2B, FIG. 5A, FIG. 5M, and FIG. 6A to FIG. 6D, the second signal line layer SD2 in some embodiments includes a plurality of voltage supply lines Vdd, a plurality of data lines DL, and an anode connecting pad ACP. Various appropriate conductive materials and various appropriate fabricating methods may be used to make the second signal line layer. For example, a conductive material may be deposited on the substrate by a plasma-enhanced chemical vapor deposition (PECVD) process and patterned. Examples of appropriate conductive materials for making the second signal line layer include, but are not limited to, titanium, aluminum, copper, molybdenum, chromium, aluminum copper alloy, copper molybdenum alloy, molybdenum aluminum alloy, aluminum chromium alloy, copper chromium alloy, molybdenum chromium alloy, copper molybdenum aluminum alloy, and the like. In some embodiments, the second signal line layer includes a plurality of sub-layers stacked together. In one example, the second signal line layer includes a stacked titanium/aluminum/titanium multi-layer structure. In another example, the second signal line layer includes a stacked molybdenum/aluminum/molybdenum multi-layer structure. Optionally, the plurality of voltage supply lines Vdd, the plurality of data lines DL, and the anode connecting pad ACP are in a same layer.

Referring to FIG. 5A, FIG. 5G, FIG. 5K, and FIG. 5M, in some embodiments, a respective data line of the plurality of data lines DL in the second signal line layer is connected to the data connecting line Cld in the first signal line layer, and the data connecting line Cld is connected to the first electrode S4 of the data write transistor T4 in the second semiconductor material layer.

In some embodiments, the respective data line of the plurality of data lines DL includes a plurality of branches BL arranged along a direction substantially parallel to the first direction DR1. A respective branch of the plurality of branches BL extends away from a main body MB of the respective data line. In some embodiments, the respective branch of the plurality of branches BL is connected to the data connecting line Cld in the first signal line layer. In some embodiments, the main body MB of the respective data line extends along a direction substantially parallel to the first direction DR1, and the respective branch extends along a direction substantially parallel to a second direction DR2. The second direction DR2 is different from the first direction DR1. The second direction DR2 intersects with the first direction DR1.

Referring to FIG. 5A, FIG. 5C, FIG. 5K, and FIG. 5M, in some embodiments, the anode connecting pad ACP in the second signal line layer is connected to the relay electrode RE in the first signal line layer, and the relay electrode RE is connected to the second electrodes of the second reset transistor T7 and the control transistor T8. The anode connecting pad ACP is connected to a respective anode of a plurality of anodes.

Vias extending through the second planarization layer PLN2 are depicted in FIG. 5N.

Referring to FIG. 5A, FIG. 5O, and FIG. 6A to FIG. 6D, the anode layer ADL in some embodiments includes a plurality of anodes AD.

Figure 7C:
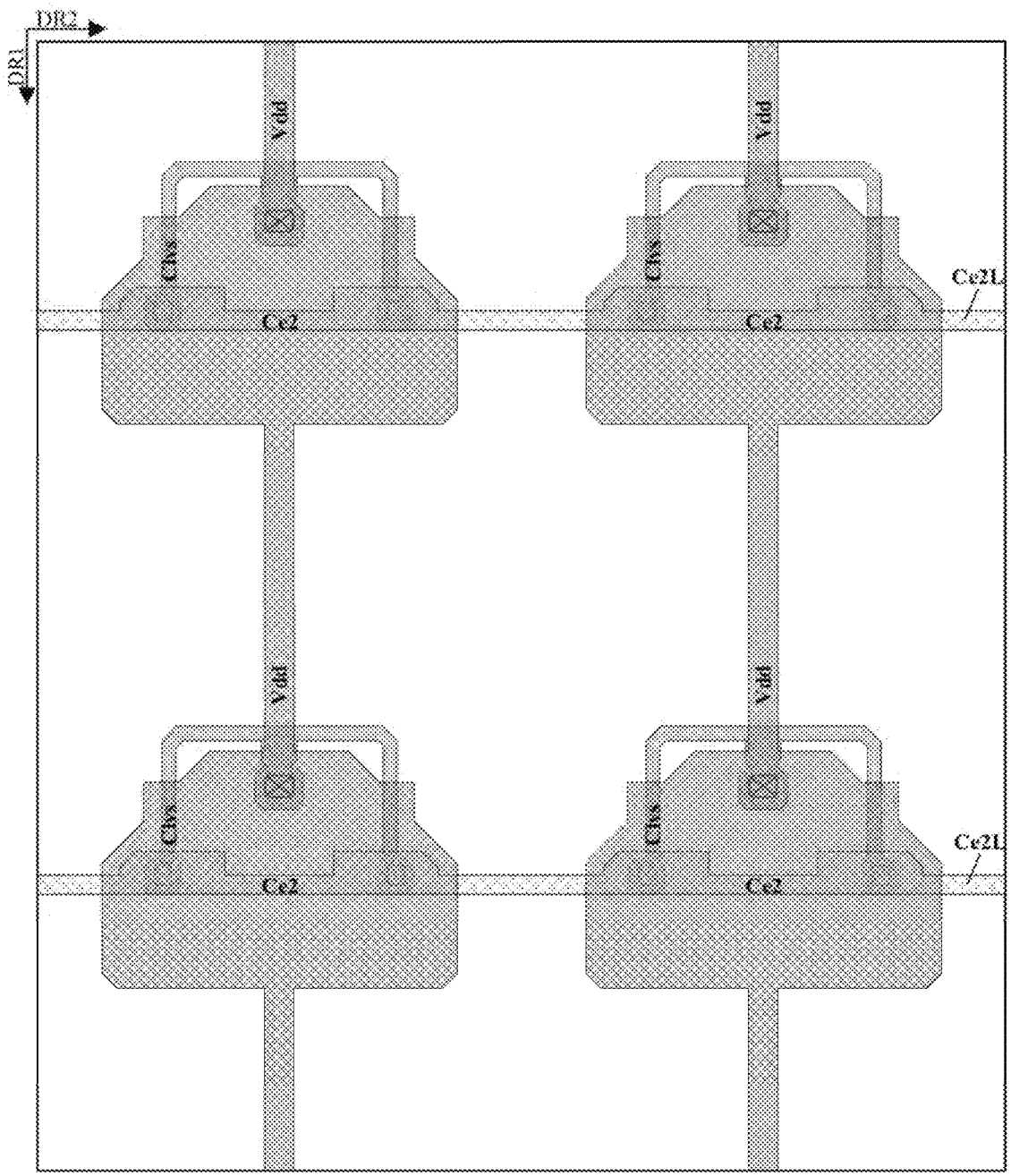
FIG. 7C is a diagram illustrating the structure of a voltage supply network in some embodiments according to the present disclosure.

FIG. 7C is a diagram illustrating the structure of a voltage supply network in some embodiments according to the present disclosure. Referring to FIG. 7C, the array substrate in some embodiments includes an interconnected voltage supply network. In some embodiments, the interconnected voltage supply network includes a plurality of voltage supply lines Vdd, a plurality of second capacitor electrode lines Ce2L, and a plurality of voltage supply connecting lines Clvs. Optionally, the plurality of voltage supply lines Vdd extend along a direction substantially parallel to the first direction DR1. Optionally, the plurality of second capacitor electrode lines Ce2L extend along a direction substantially parallel to the second direction DR2. A respective second capacitor electrode line of the plurality of second capacitor electrode lines Ce2L includes second capacitor electrodes of pixel driving circuits in a same row. A respective voltage supply connecting line of the plurality of voltage supply connecting lines Clvs connects a respective voltage supply line of the plurality of voltage supply lines Vdd with a respective second capacitor electrode line of the plurality of second capacitor electrode lines Ce2L. Optionally, the plurality of voltage supply lines Vdd, the plurality of second capacitor electrode lines Ce2L, and the plurality of voltage supply connecting lines Clvs are in different layers. In one example, the plurality of second capacitor electrode lines Ce2L are in the first gate metal layer, the plurality of voltage supply connecting lines Clvs are in the first signal line layer, and the plurality of voltage supply lines Vdd are in the second signal line layer. In some embodiments, a respective voltage supply line of the plurality of voltage supply lines Vdd is connected to one or more second capacitor electrode lines of the plurality of second capacitor electrode lines Ce2L, through one or more voltage supply connecting lines of the plurality of voltage supply connecting lines Clvs, respectively. In some embodiments, a respective second capacitor electrode line of the plurality of second capacitor electrode lines Ce2L is connected to one or more voltage supply lines of the plurality of voltage supply lines Vdd, through one or more voltage supply connecting lines of the plurality of voltage supply connecting lines Clvs, respectively.

Referring to FIG. 5A, in some embodiments, the array substrate includes a transmissive region TR in which conductive components of the pixel driving circuit are absent. Referring to FIG. 7B, a respective loop of the plurality of loops of the respective first reset signal line surrounds the transmissive region TR. An accessory may be installed in the transmissive region TR. Examples of accessories include a photosensor.

Figure 7D:
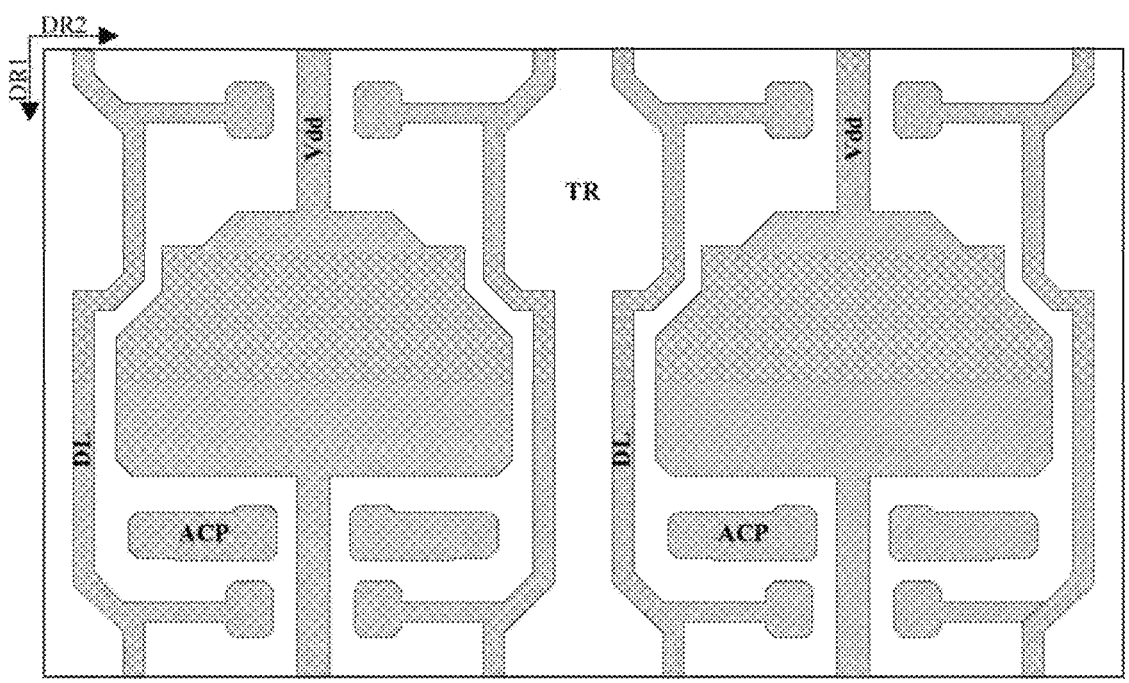
FIG. 7D is a diagram illustrating the structure of a second signal line layer in four adjacent pixel driving circuits in a same row in an array substrate in some embodiments according to the present disclosure.

Referring to FIG. 5M, a respective data line of the plurality of data lines DL includes a main body MB, and a plurality of branches BL extending away from the main body MB. The main body MB includes a plurality of first segment SG1 and a plurality of second segments SG2 alternately connected together. FIG. 7D is a diagram illustrating the structure of a second signal line layer in four adjacent pixel driving circuits in a same row in an array substrate in some embodiments according to the present disclosure. Referring to FIG. 5M and FIG. 7O, in some embodiments, second segments of two adjacent data lines configured to provide data signals to two adjacent pixel driving circuits in a same row substantially surround the transmissive region TR. In some embodiments, the first segment SG1 is substantially straight, and the second segment SG2 is a curved segment curving around the transmissive region TR. In some embodiments, a virtual extension of the first segment SG1 extends through the transmissive region TR.

Figure 8A:
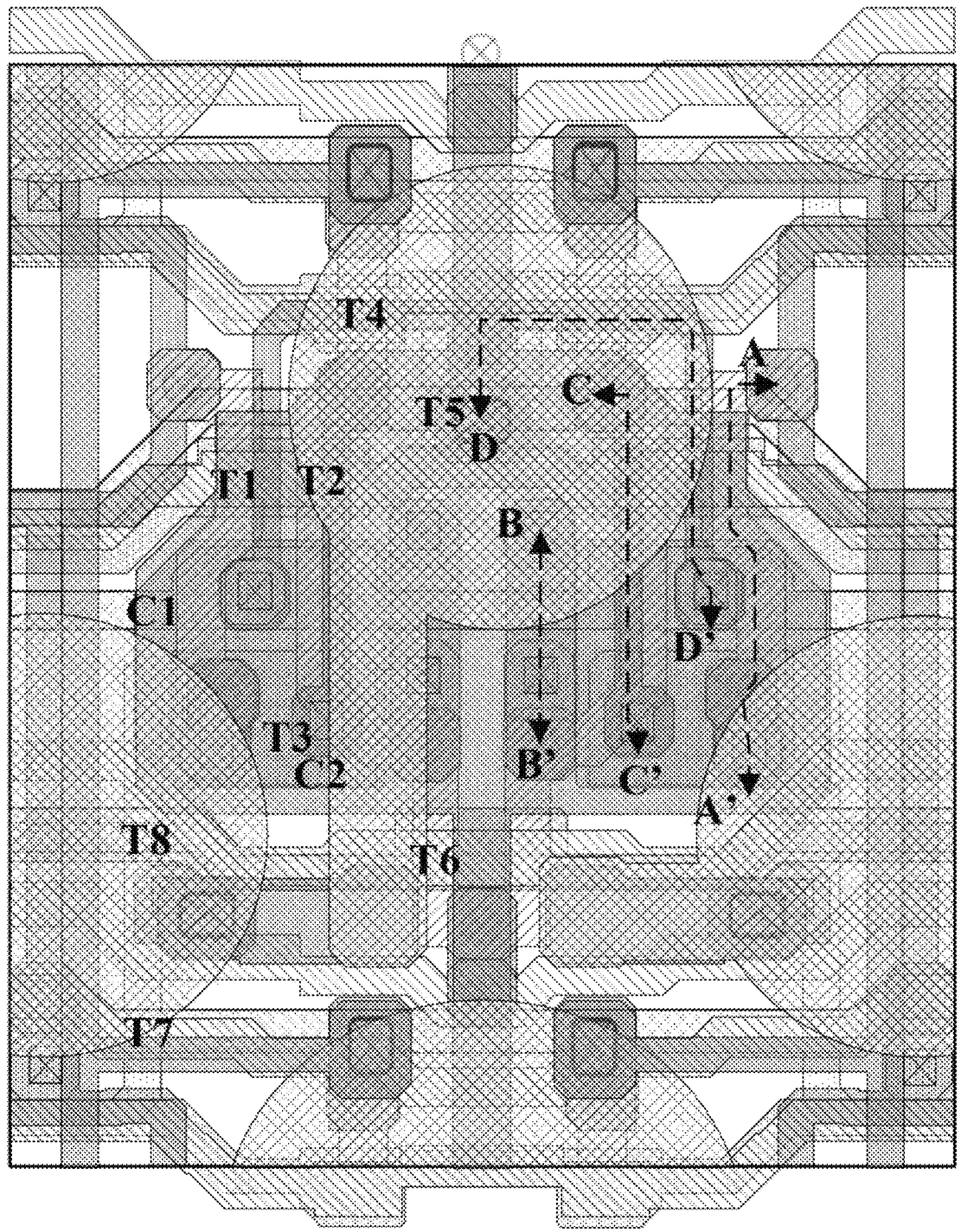
FIG. 8A is a diagram illustrating the structure of pixel driving circuits in an array substrate in some embodiments according to the present disclosure.
Figure 8B:
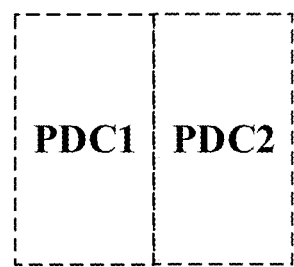
FIG. 8B is a schematic diagram illustrating an arrangement of pixel driving circuits in the array substrate depicted in FIG. 8A.
Figure 8C:
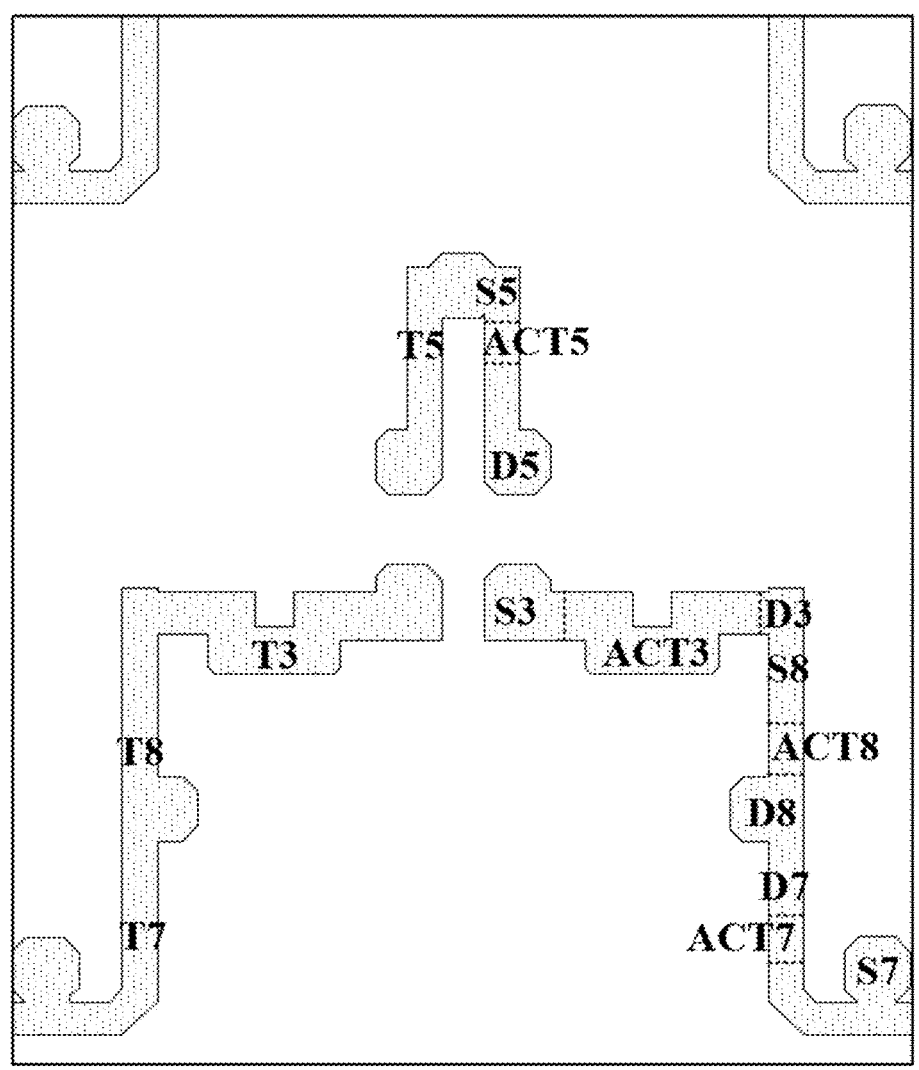
FIG. 8C is a diagram illustrating the structure of a first semiconductor material layer in the array substrate depicted in FIG. 8A.
Figure 8D:
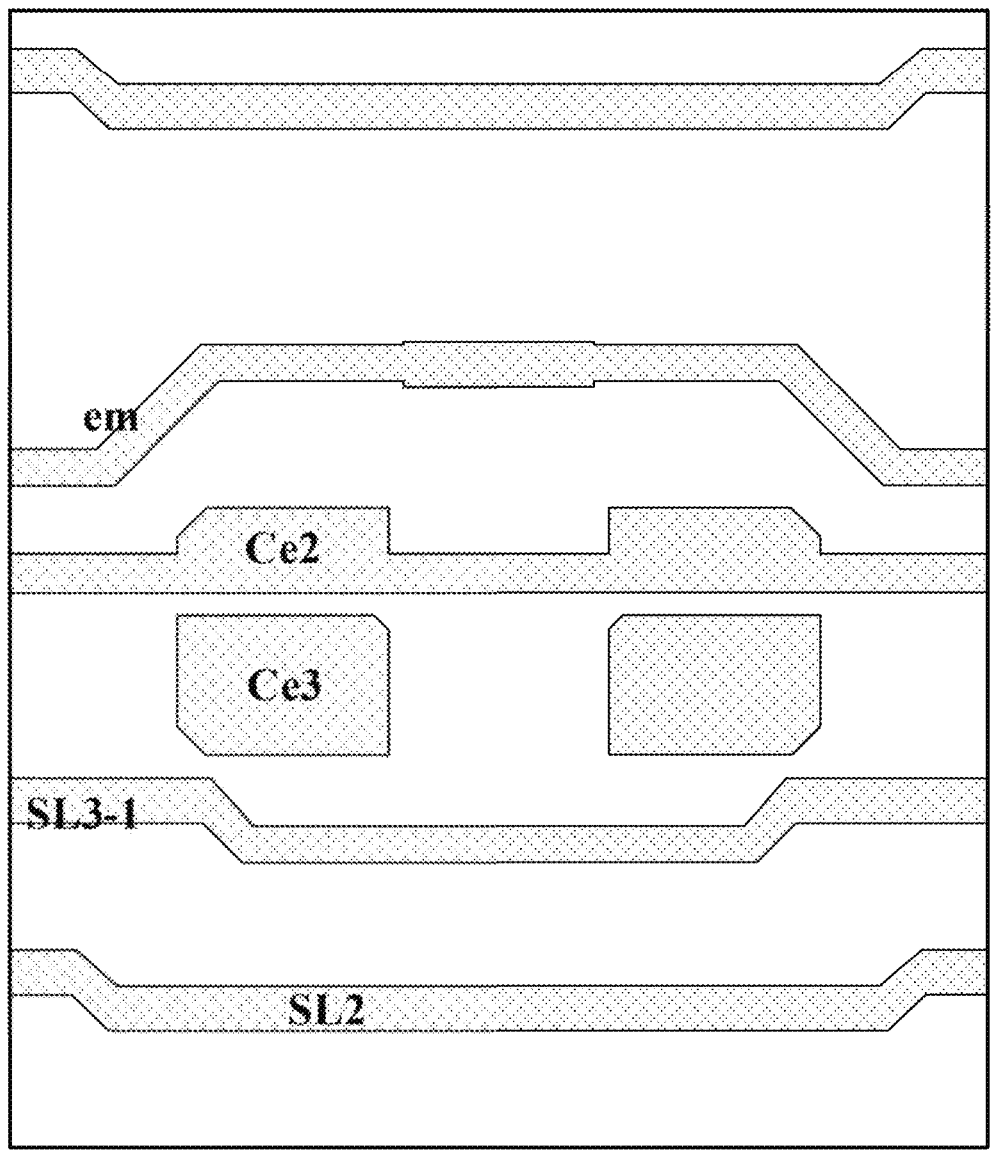
FIG. 8D is a diagram illustrating the structure of a first gate metal layer in the array substrate depicted in FIG. 8A.
Figure 8E:
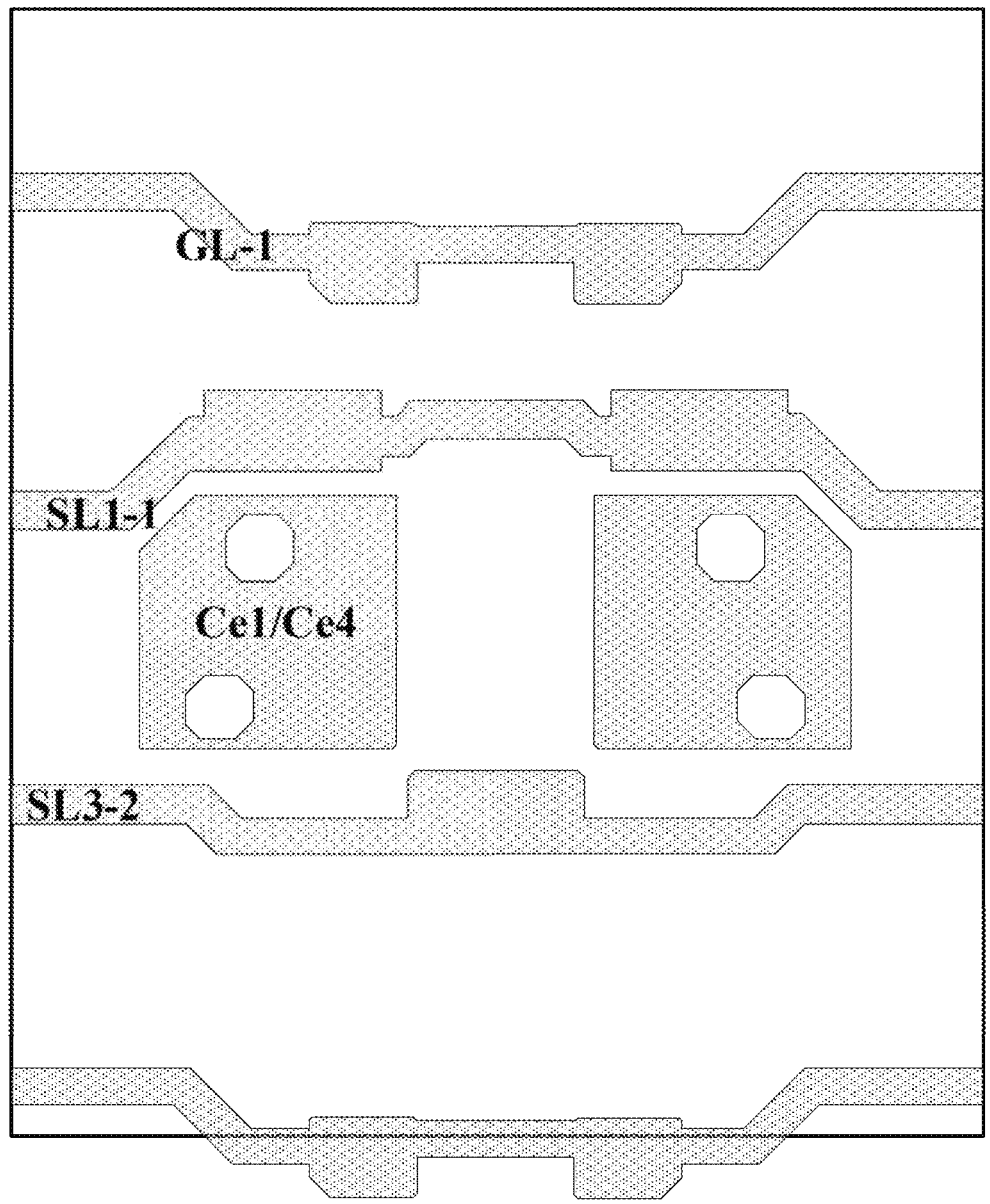
FIG. 8E is a diagram illustrating the structure of a second gate metal layer in the array substrate depicted in FIG. 8A.
Figure 8F:
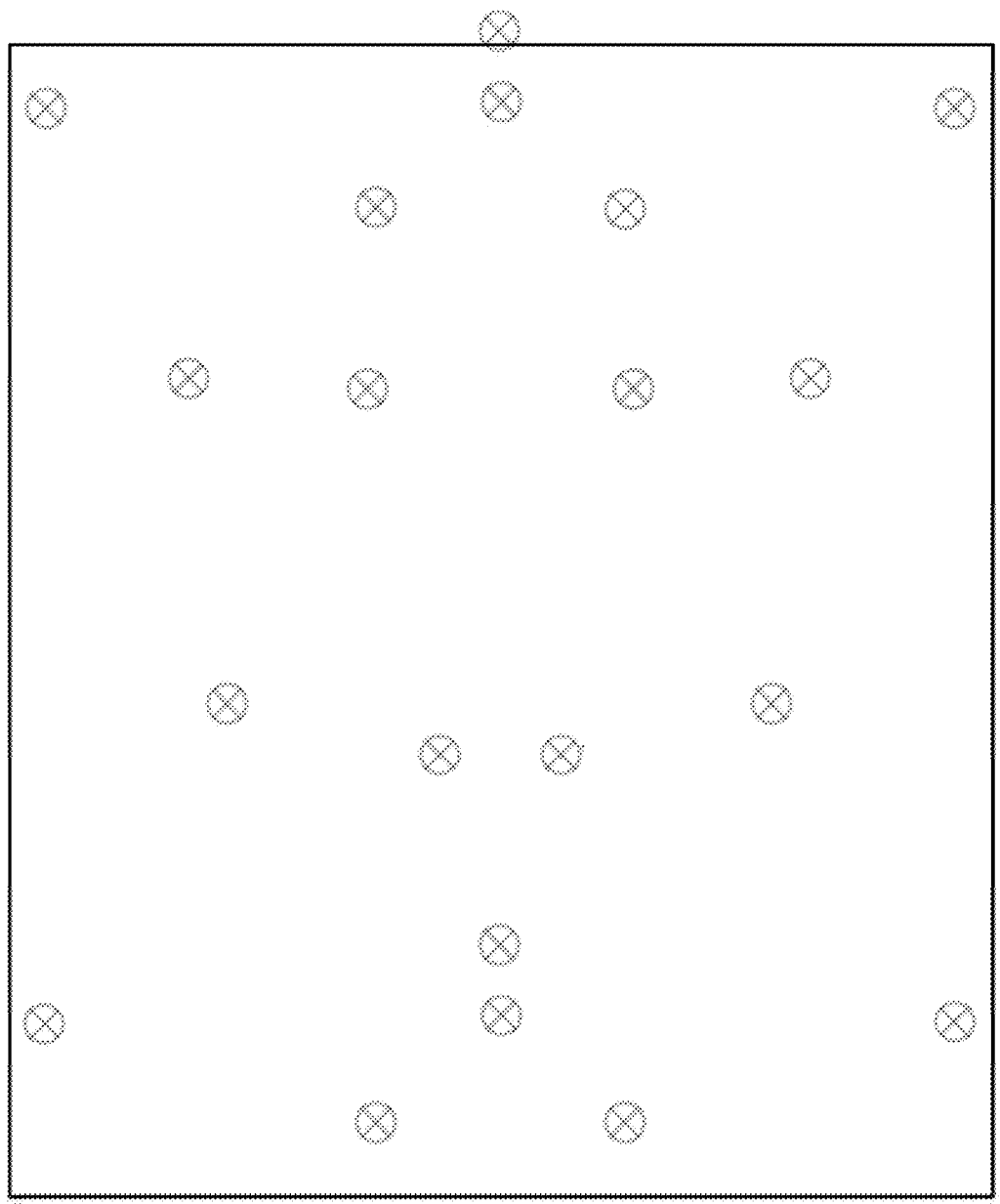
FIG. 8F is a diagram illustrating vias extending through a first inter-layer dielectric layer in the array substrate depicted in FIG. 5A.
Figure 8G:
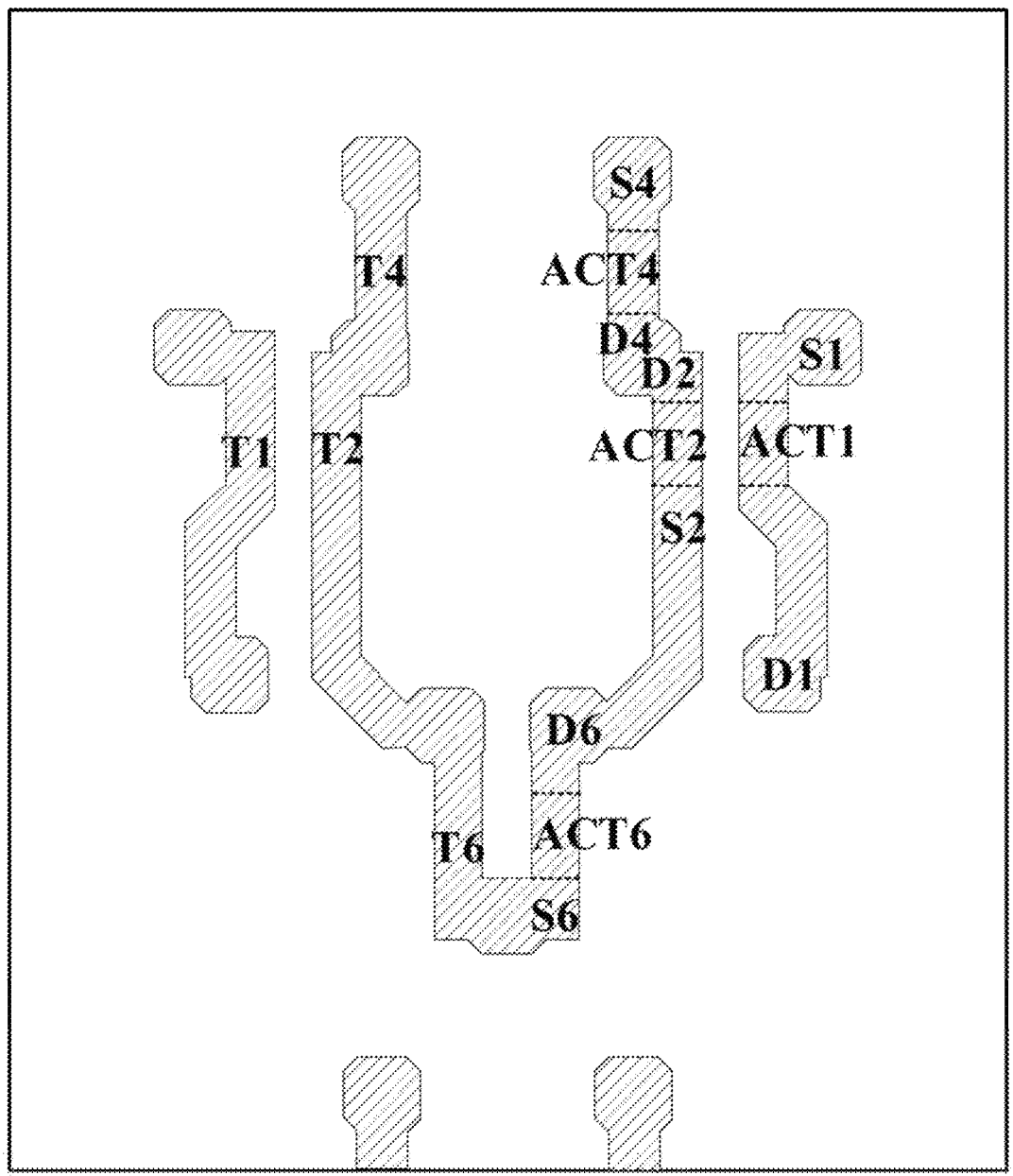
FIG. 8G is a diagram illustrating the structure of a second semiconductor material layer in the array substrate depicted in FIG. 8A.
Figure 8H:
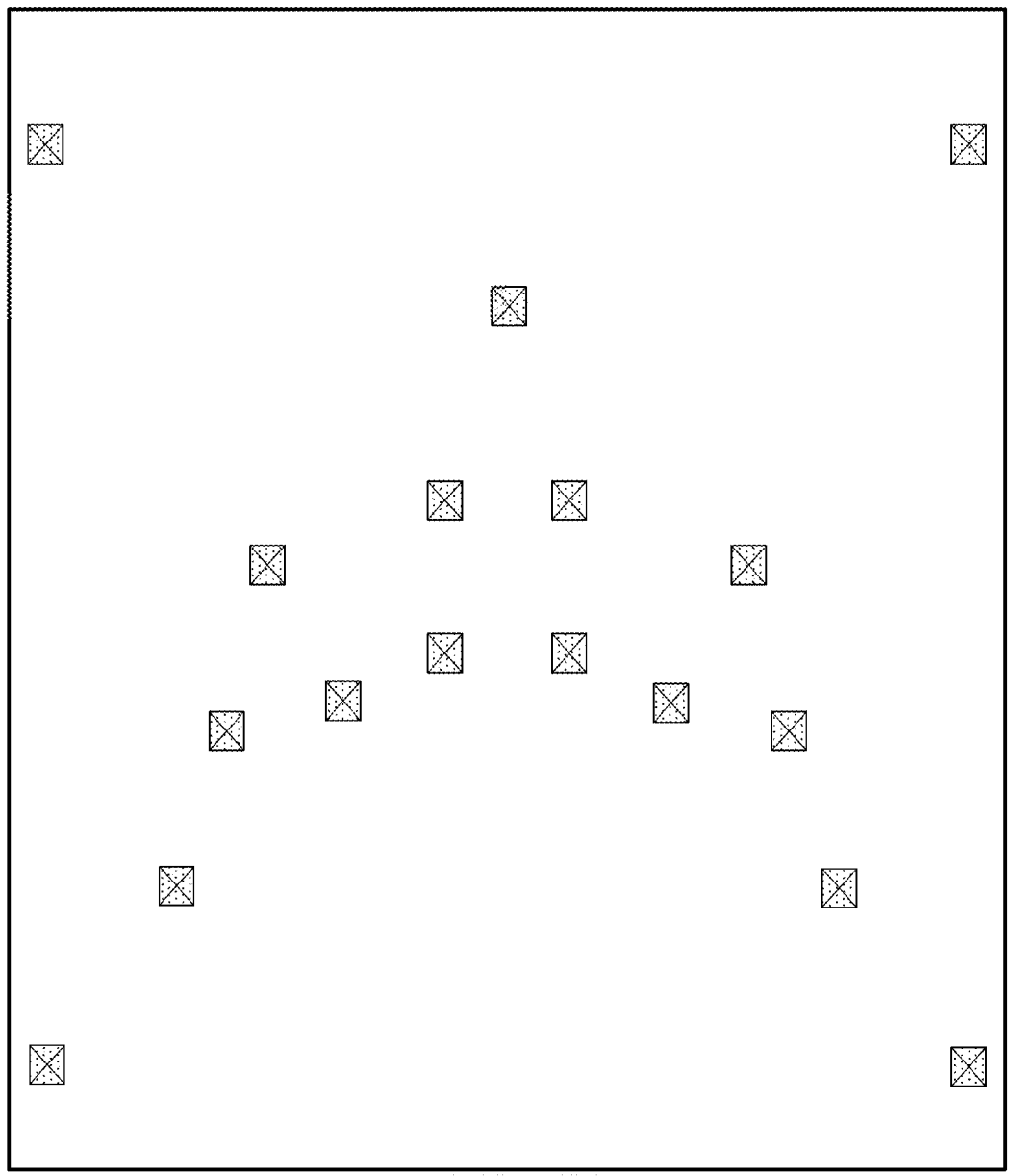
FIG. 8H is a diagram illustrating vias extending through a second inter-layer dielectric layer in the array substrate depicted in FIG. 8A.
Figure 8I:
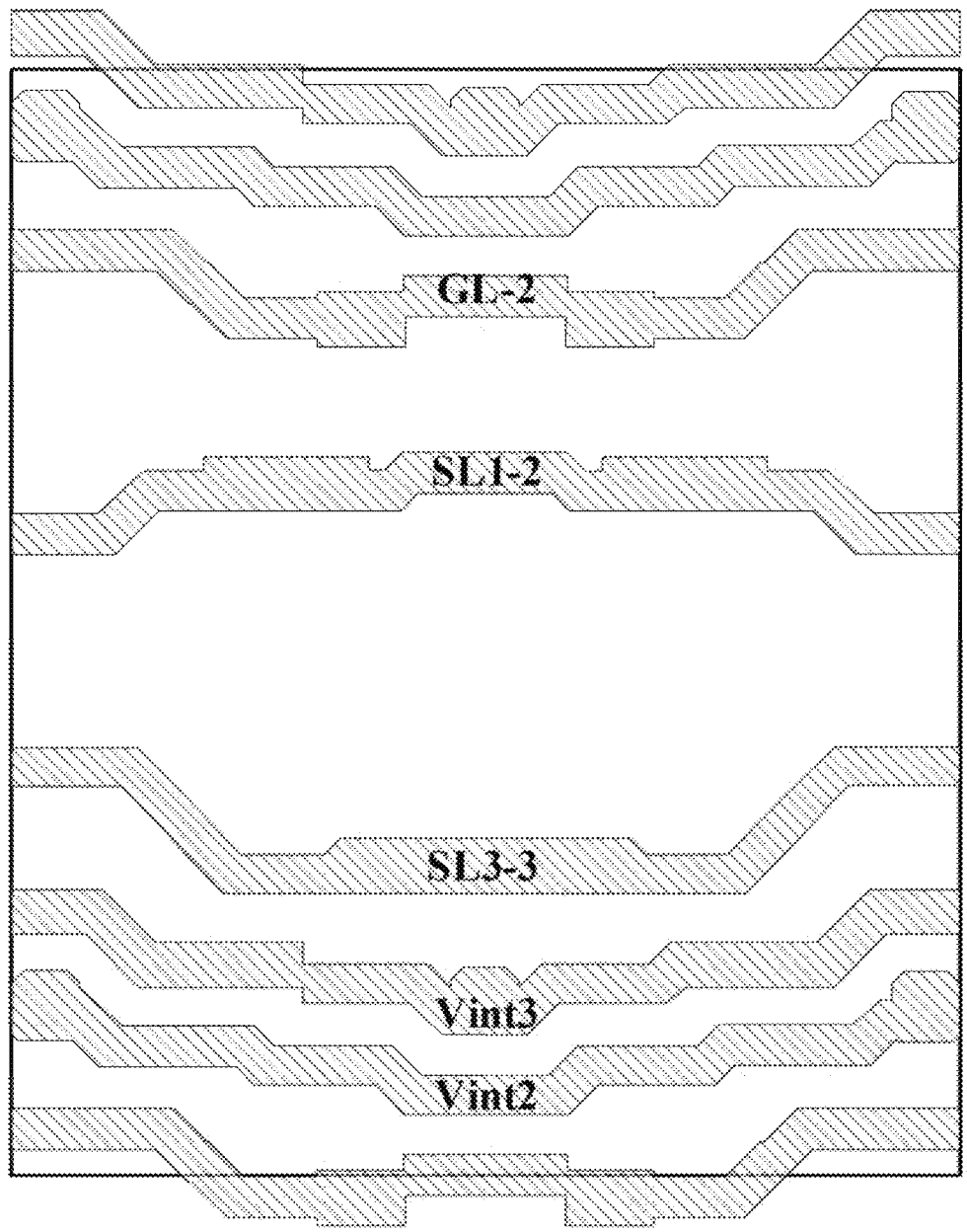
FIG. 8I is a diagram illustrating the structure of a third gate metal layer in the array substrate depicted in FIG. 8A.
Figure 8J:
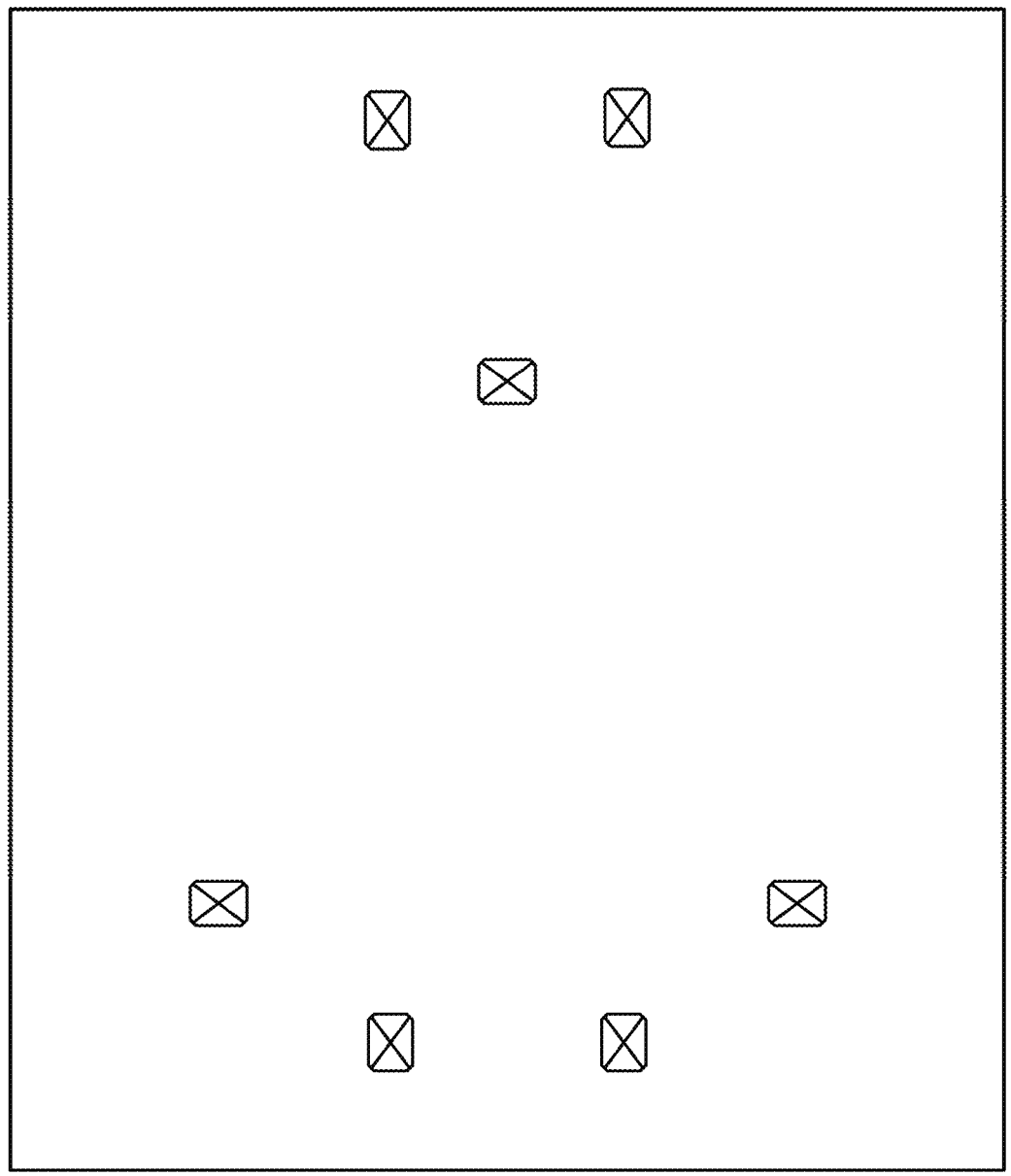
FIG. 8J is a diagram illustrating vias extending through a passivation layer in the army substrate depicted in FIG. 8A.
Figure 8K:
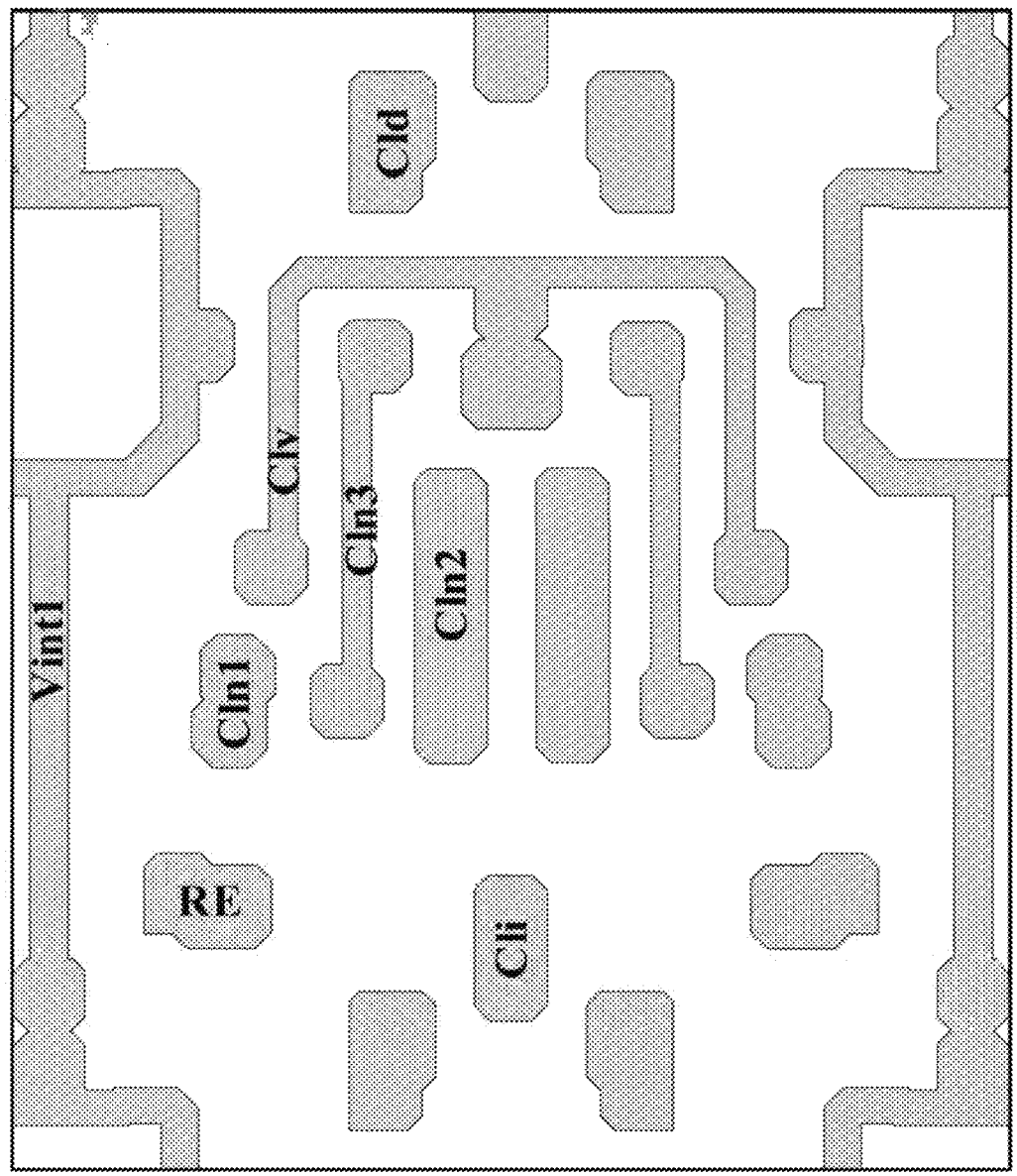
FIG. 8K is a diagram illustrating the structure of a first signal line layer in the array substrate depicted in FIG. 8A.
Figure 8L:
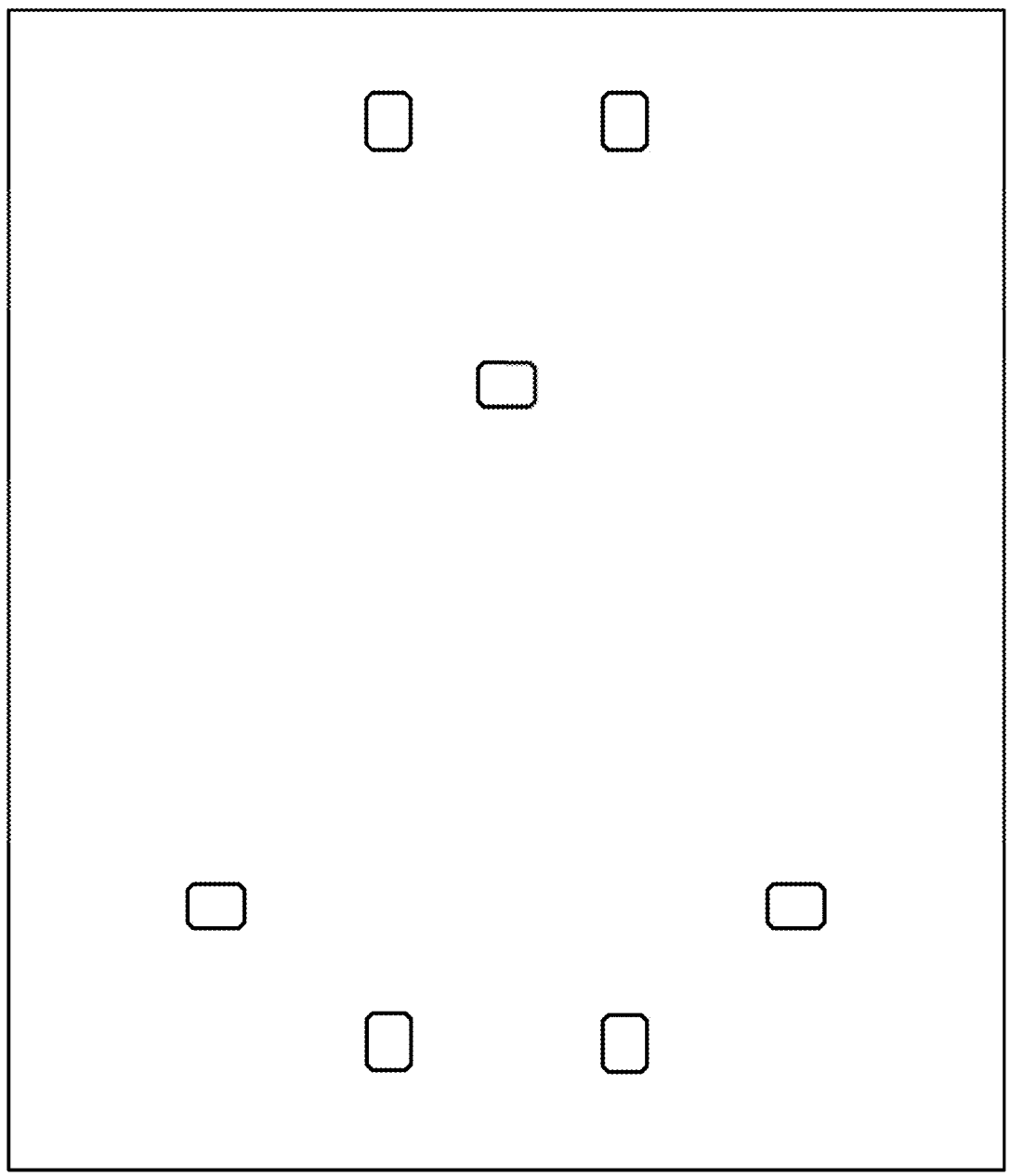
FIG. 8L is a diagram illustrating vias extending through a first planarization layer in the array substrate depicted in FIG. 8A.
Figure 8M:
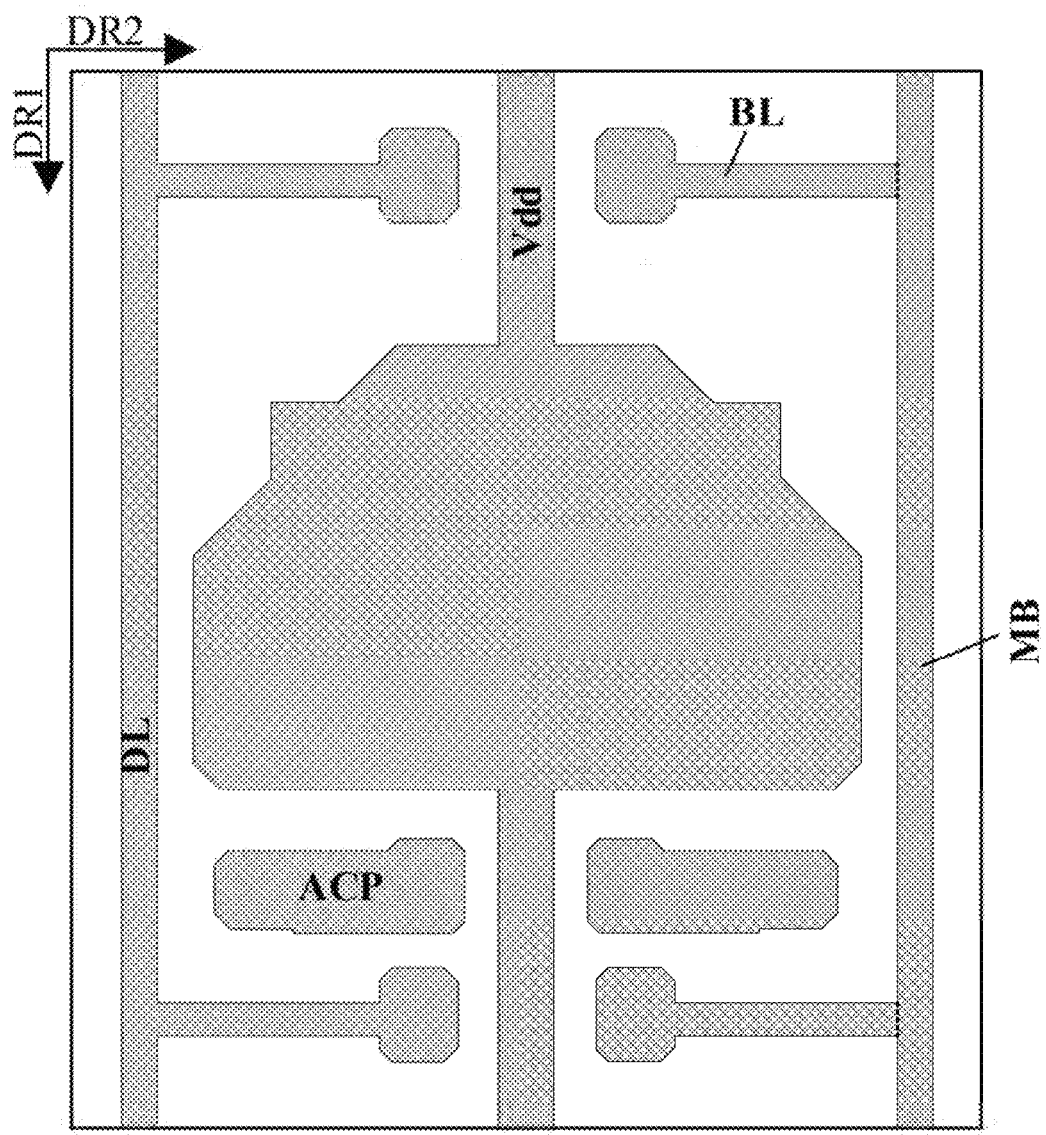
FIG. 8M is a diagram illustrating the structure of a second signal line layer in the array substrate depicted in FIG. 8A.
Figure 8N:
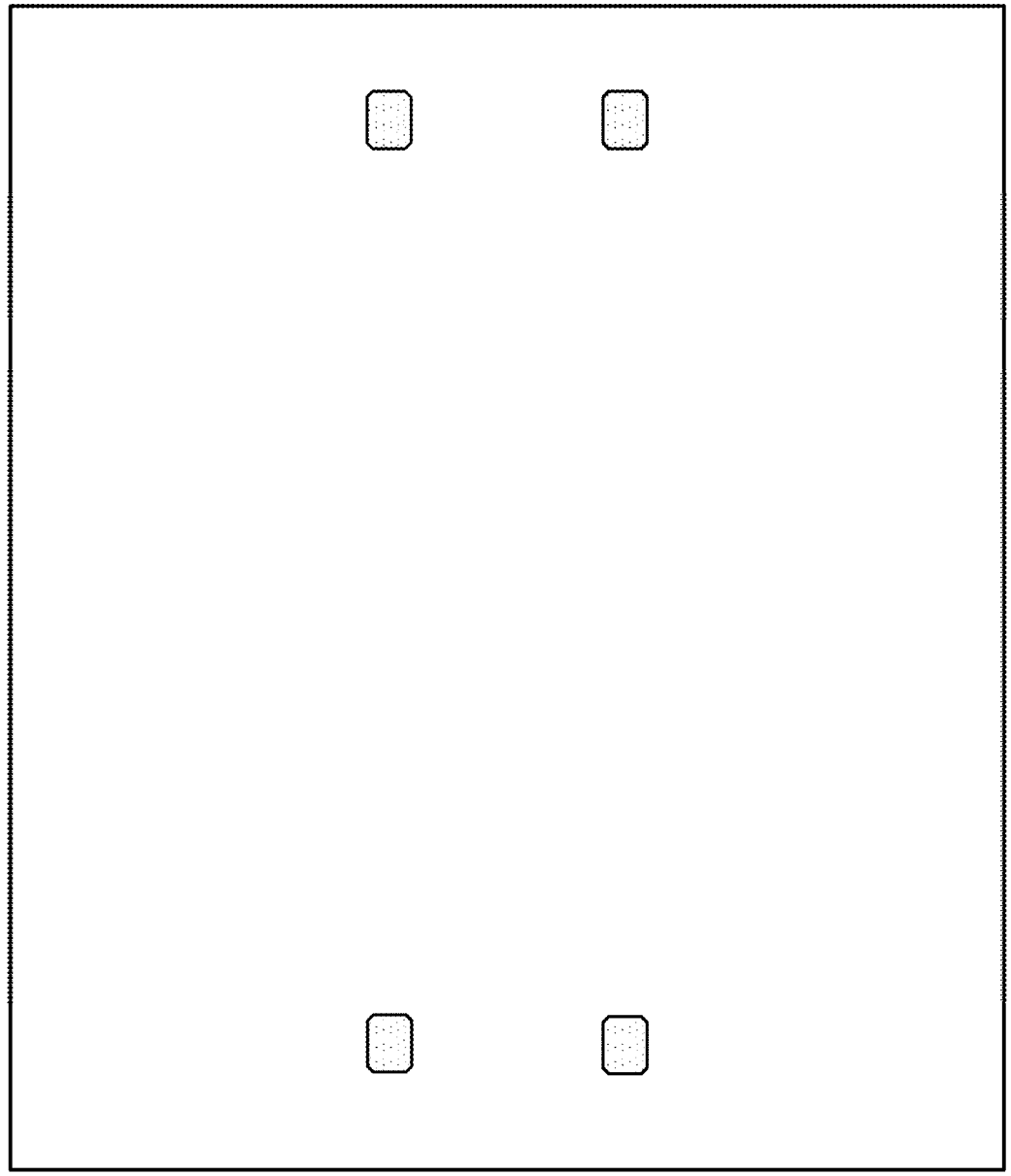
FIG. 8N is a diagram illustrating vias extending through a second planarization layer in the array substrate depicted in FIG. 8A.
Figure 8O:
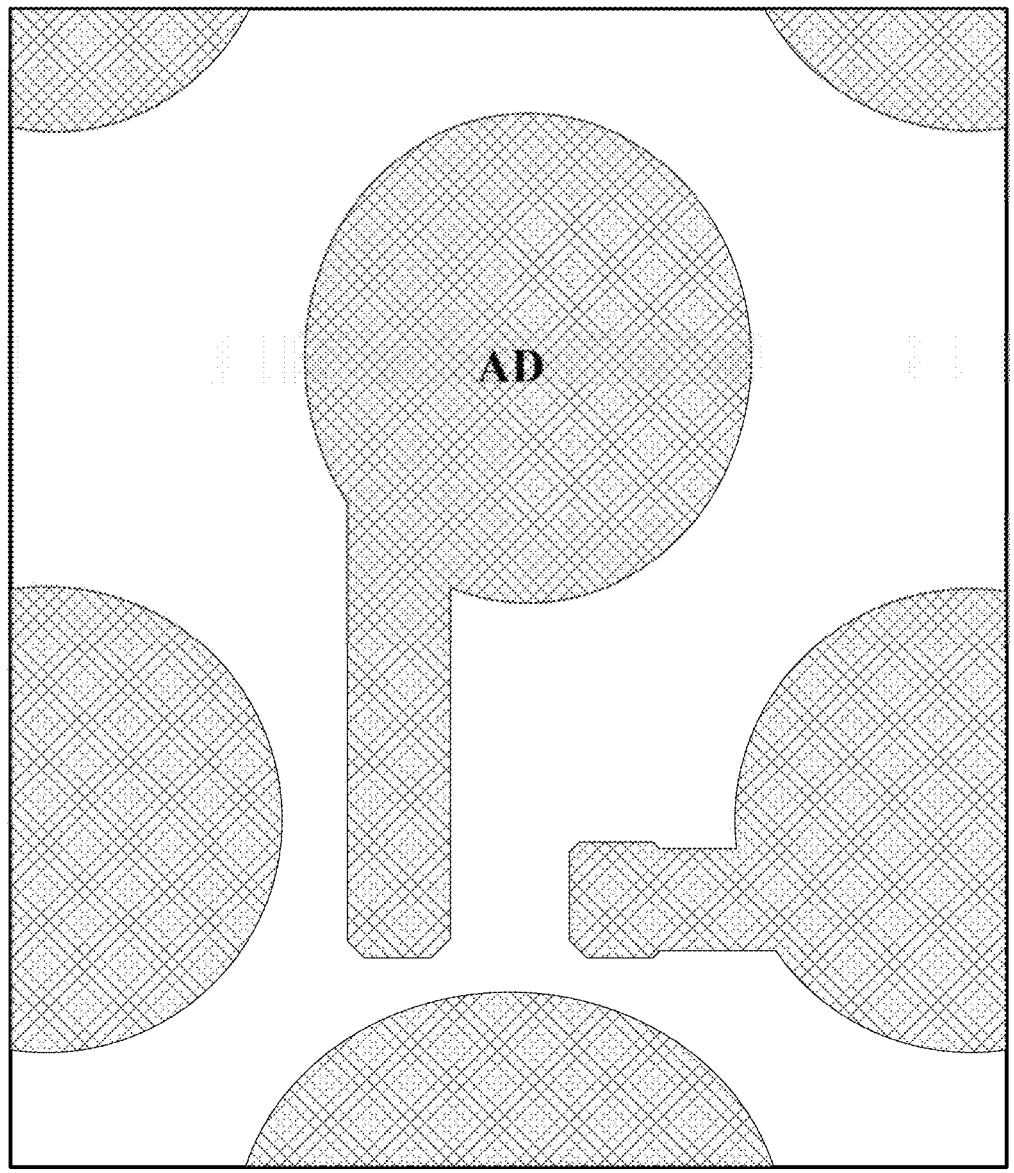
FIG. 8O is a diagram illustrating the structure of an anode layer in the array substrate depicted in FIG. 8A.

FIG. 8A is a diagram illustrating the structure of pixel driving circuits in an array substrate in some embodiments according to the present disclosure. FIG. 8B is a schematic diagram illustrating an arrangement of pixel driving circuits in the array substrate depicted in FIG. 8A. FIG. 8C is a diagram illustrating the structure of a first semiconductor material layer in the array substrate depicted in FIG. 8A. FIG. 8D is a diagram illustrating the structure of a first gate metal layer in the array substrate depicted in FIG. 8A. FIG. 8E is a diagram illustrating the structure of a second gate metal layer in the array substrate depicted in FIG. 8A. FIG. 8F is a diagram illustrating vias extending through a first inter-layer dielectric layer in the array substrate depicted in FIG. 8A. FIG. 8G is a diagram illustrating the structure of a second semiconductor material layer in the array substrate depicted in FIG. 8A. FIG. 5H is a diagram illustrating vias extending through a second inter-layer dielectric layer in the array substrate depicted in FIG. 8A. FIG. 8I is a diagram illustrating the structure of a third gate metal layer in the array substrate depicted in FIG. 8A. FIG. 8J is a diagram illustrating vias extending through a passivation layer in the array substrate depicted in FIG. 8A. FIG. 8K is a diagram illustrating the structure of a first signal line layer in the array substrate depicted in FIG. 8A. FIG. 8L is a diagram illustrating vias extending through a first planarization layer in the array substrate depicted in FIG. 8A. FIG. 8M is a diagram illustrating the structure of a second signal line layer in the array substrate depicted in FIG. 8A. FIG. 8N is a diagram illustrating vias extending through a second planarization layer in the array substrate depicted in FIG. 8A. FIG. 8O is a diagram illustrating the structure of an anode layer in the array substrate depicted in FIG. 8A.

The array substrate depicted in FIG. 8A to FIG. 8O differs from the array substrate depicted in FIG. 5A to FIG. 5O in that the main body MB of the respective data line in the array substrate depicted in FIG. 8A to FIG. 8O is substantially straight extending along a direction substantially parallel to the first direction DR1. Optionally, the array substrate depicted in FIG. 8A to FIG. 8O does not include a transmissive region TR.

The inventors of the present disclosure discover that, due to the presence of resistance and parasitic capacitance in signal lines, resistance-capacitance delay occurs in in related array substrates. The resistance-capacitance delay is particularly prominent when the signal transmitting distance in the signal lines becomes longer. The inventors of the present disclosure discover that control signals (e.g., gate scanning signals) output from a scan circuit to rows of subpixels distal to an integrated circuit have longer delays as compared to control signals output to rows of subpixels closer to the integrated circuit. The inventors of the present disclosure discover that this is at least partially due to the resistance-capacitance delay in signal lines transmitting signals (e.g., clock signals) from the integrated circuit to stages of the scan circuit.

The inventors of the present disclosure discover that, in related army substrates, falling edge durations of signals changes along the signal transmitting distance in the signal lines. The falling edge duration variation becomes particularly prominent when the signal transmitting distance in the signal lines becomes longer. The inventors of the present disclosure discover that gate scanning signals output from a scan circuit to subpixels distal to the scan circuit have longer falling edge durations as compared to control signals output to subpixels closer to the scan circuit. When the scan circuit outputs turning-off gate scanning signals, due to the variation of the falling edge durations, the voltages at nodes N1 in pixel driving circuits distal to the scan circuit are pulled down to a lesser extent as compared to the voltages at nodes N1 in pixel driving circuits closer to the scan circuit, resulting in poor display uniformity between subpixels distal to the scan circuit and subpixels closer to the scan circuit.

Figure 9:
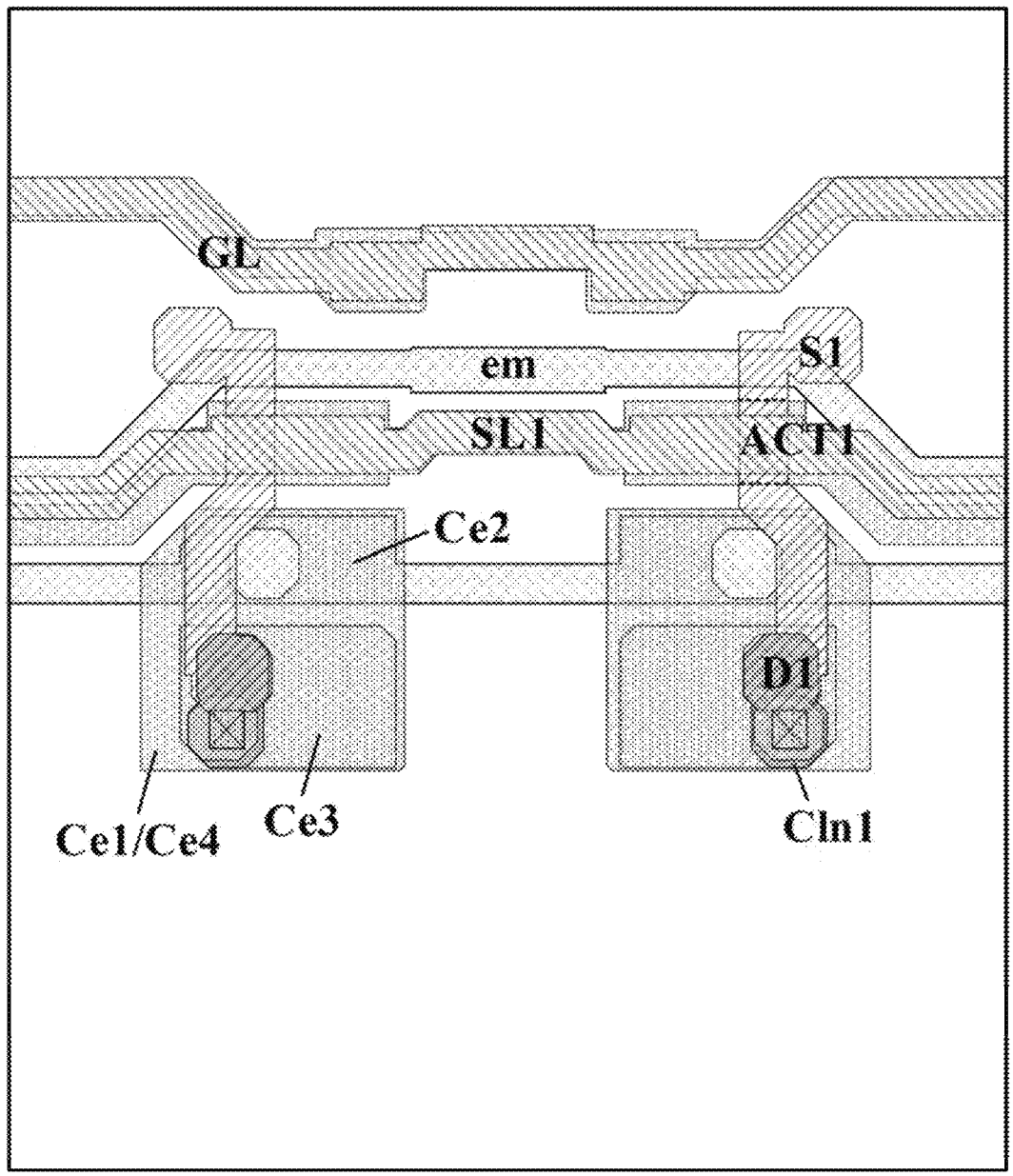
FIG. 9 is a diagram illustrating a layout of a respective gate line with respect to a first node connecting line in the array substrate depicted in FIG. 5A or FIG. 8A.

The inventors of the present disclosure discover that, surprisingly and unexpectedly, the array substrate according to the present disclosure alleviates the issue of display non-uniformity. The inventors of the present disclosure discover that a reduction in parasitic capacitance between the respective gate line and the N1 node can successfully obviate the issue of display non-uniformity. FIG. 9 is a diagram illustrating a layout of a respective gate line with respect to a first node connecting line in the array substrate depicted in FIG. A or FIG. 8A. Referring to FIG. 9, the inventors of the present disclosure discover that a reduction in parasitic capacitance between the respective gate line of the plurality of gate lines GL and the first node connecting line Cln1 can successfully obviate the issue of display non-uniformity.

Referring to FIG. 9, in some embodiments, an orthographic projection of the respective gate line on a base substrate is substantially non-overlapping (e.g., at least 80% non-overlapping, at least 90% non-overlapping, at least 95% non-overlapping, at least 99% non-overlapping, or completely non-overlapping) with an orthographic projection of the first node connecting line Cln1 on the base substrate. The parasitic capacitance between the respective gate line of the plurality of gate lines GL and the first node connecting line Cln1 can be minimized. The first node connecting line Cln1 at least partially corresponds to the node N1.

In some embodiments, the orthographic projection of the respective gate line on the base substrate and the orthographic projection of the first node connecting line Cln1 on the base substrate are spaced apart by an orthographic projection of the second capacitor electrode Ce2 of the first capacitor C1 on the base substrate. Optionally, the orthographic projection of the second capacitor electrode Ce2 of the first capacitor C1 on the base substrate is substantially non-overlapping (e.g., at least 80% non-overlapping, at least 90% non-overlapping, at least 95% non-overlapping, at least 99% non-overlapping, or completely non-overlapping) with the orthographic projection of the respective gate line on the base substrate, and is substantially non-overlapping (e.g., at least 80% non-overlapping, at least 90% non-overlapping, at least 95% non-overlapping, at least 99% non-overlapping, or completely non-overlapping) with the orthographic projection of the first node connecting line Cln1 on the base substrate. By having the orthographic projection of the second capacitor electrode Ce2 of the first capacitor C1 on the base substrate spacing apart the orthographic projection of the respective gate line on the base substrate and the orthographic projection of the first node connecting line Cln1 on the base substrate, parasitic capacitance (e.g., lateral parasitic capacitance) between the respective gate line of the plurality of gate lines GL and the node N1 can be further minimized.

In some embodiments, the orthographic projection of the respective gate line on the base substrate and the orthographic projection of the third capacitor electrode Ce3 of the second capacitor C2 on the base substrate are spaced apart by an orthographic projection of the second capacitor electrode Ce2 of the first capacitor C1 on the base substrate. Optionally, the orthographic projection of the second capacitor electrode Ce2 of the first capacitor C1 on the base substrate is substantially non-overlapping (e.g., at least 80% non-overlapping, at least 90% non-overlapping, at least 95% non-overlapping, at least 99% non-overlapping, or completely non-overlapping) with the orthographic projection of the respective gate line on the base substrate, and is substantially non-overlapping (e.g., at least 80% non-overlapping, at least 90% non-overlapping, at least 95% non-overlapping, at least 99% non-overlapping, or completely non-overlapping) with the orthographic projection of the third capacitor electrode Ce3 of the second capacitor C2 on the base substrate.

Comparing the array substrate according to the present disclosure with a related array substrate in which the orthographic projection of the third capacitor electrode Ce3 on the base substrate spaces apart the orthographic projection of the second capacitor electrode Ce2 of the first capacitor C1 on the base substrate and the orthographic projection of the respective gate line on the base substrate (so that the node N1 is closer to the respective gate line), the parasitic capacitance between the respective gate line and the node N1 is 1.33 f in the array substrate according to the present disclosure, and is 2.72 f in the related array substrate. Voltage difference between first nodes respectively in a pixel driving circuit distal to the scan circuit and in a pixel driving circuit closer to the scan circuit is 0.08 V in the array substrate according to the present disclosure, and is 0.16 V in the related array substrate. The display non-uniformity is significantly improved in the array substrate according to the present disclosure.

In some embodiments, the first node connecting line Cln1 is connected to a second electrode D1 of the first reset transistor T1 through a second via v2. Because the first reset transistor T1 is connected to the first node connecting line Cln1, the inventors of the present disclosure discover that minimizing the parasitic capacitance between the first reset transistor T1 and the respective gate line further improves the issue of display non-uniformity.

In some embodiments, an orthographic projection of the respective gate line on a base substrate is substantially non-overlapping (e.g., at least 80% non-overlapping, at least 90% non-overlapping, at least 95% non-overlapping, at least 99% non-overlapping, or completely non-overlapping) with an orthographic projection of the second electrode D1 of the first reset transistor T1 on the base substrate. Optionally, the orthographic projection of the respective gate line on a base substrate is substantially non-overlapping (e.g., at least 80% non-overlapping, at least 90% non-overlapping, at least 95% non-overlapping, at least 99% non-overlapping, or completely non-overlapping) with an orthographic projection of the active layer ACT1 and the second electrode D1 of the first reset transistor T1 on the base substrate. Optionally, the orthographic projection of the respective gate line on a base substrate is substantially non-overlapping (e.g., at least 80% non-overlapping, at least 90% non-overlapping, at least 95% non-overlapping, at least 99% non-overlapping, or completely non-overlapping) with an orthographic projection of the first electrode S1, the active layer ACT1, and the second electrode D1 of the first reset transistor T1 on the base substrate.

In some embodiments, the second electrode D1 of the first reset transistor T1 crosses over the second capacitor electrode Ce2. Optionally, the orthographic projection of the second electrode D1 of the first reset transistor T1 on the base substrate partially overlaps with the orthographic projection of the second capacitor electrode Ce2 of the first capacitor C1 on the base substrate.

In some embodiments, the orthographic projection of the respective gate line on the base substrate and the orthographic projection of the second capacitor electrode Ce2 of the first capacitor C1 on the base substrate are spaced apart by an orthographic projection of a respective light emitting control signal line of the plurality of light emitting control signal lines em on the base substrate. Optionally, the orthographic projection of the respective light emitting control signal line of the plurality of light emitting control signal lines em on the base substrate is substantially non-overlapping (e.g., at least 80% non-overlapping, at least 90% non-overlapping, at least 95% non-overlapping, at least 99% non-overlapping, or completely non-overlapping) with the orthographic projection of the respective gate line on the base substrate, and is substantially non-overlapping (e.g., at least 80% non-overlapping, at least 90% non-overlapping, at least 95% non-overlapping, at least 99% non-overlapping, or completely non-overlapping) with the orthographic projection of the second capacitor electrode Ce2 of the first capacitor C1 on the base substrate.

In some embodiments, the orthographic projection of the respective gate line on the base substrate and the orthographic projection of the second capacitor electrode Ce2 of the first capacitor C1 on the base substrate are spaced apart by an orthographic projection of a respective first control signal line of the plurality of first control signal lines SL1 on the base substrate. Optionally, the orthographic projection of the respective first control signal line of the plurality of first control signal lines SL1 on the base substrate is substantially non-overlapping (e.g., at least 80% non-overlapping, at least 90% non-overlapping, at least 95% non-overlapping, at least 99% non-overlapping, or completely non-overlapping) with the orthographic projection of the respective gate line on the base substrate, and is substantially non-overlapping (e.g., at least 80% non-overlapping, at least 90% non-overlapping, at least 95% non-overlapping, at least 99% non-overlapping, or completely non-overlapping) with the orthographic projection of the second capacitor electrode Ce2 of the first capacitor C1 on the base substrate.

As discussed previously in connection with FIG. 7C, the array substrate in some embodiments includes a plurality of second capacitor electrode lines Ce2L as parts of an interconnected voltage supply network. The plurality of second capacitor electrode lines Ce2L extend along a direction substantially parallel to the second direction DR2. A respective second capacitor electrode line of the plurality of second capacitor electrode lines Ce2L includes second capacitor electrodes of pixel driving circuits in a same row connected together.

Figure 10:
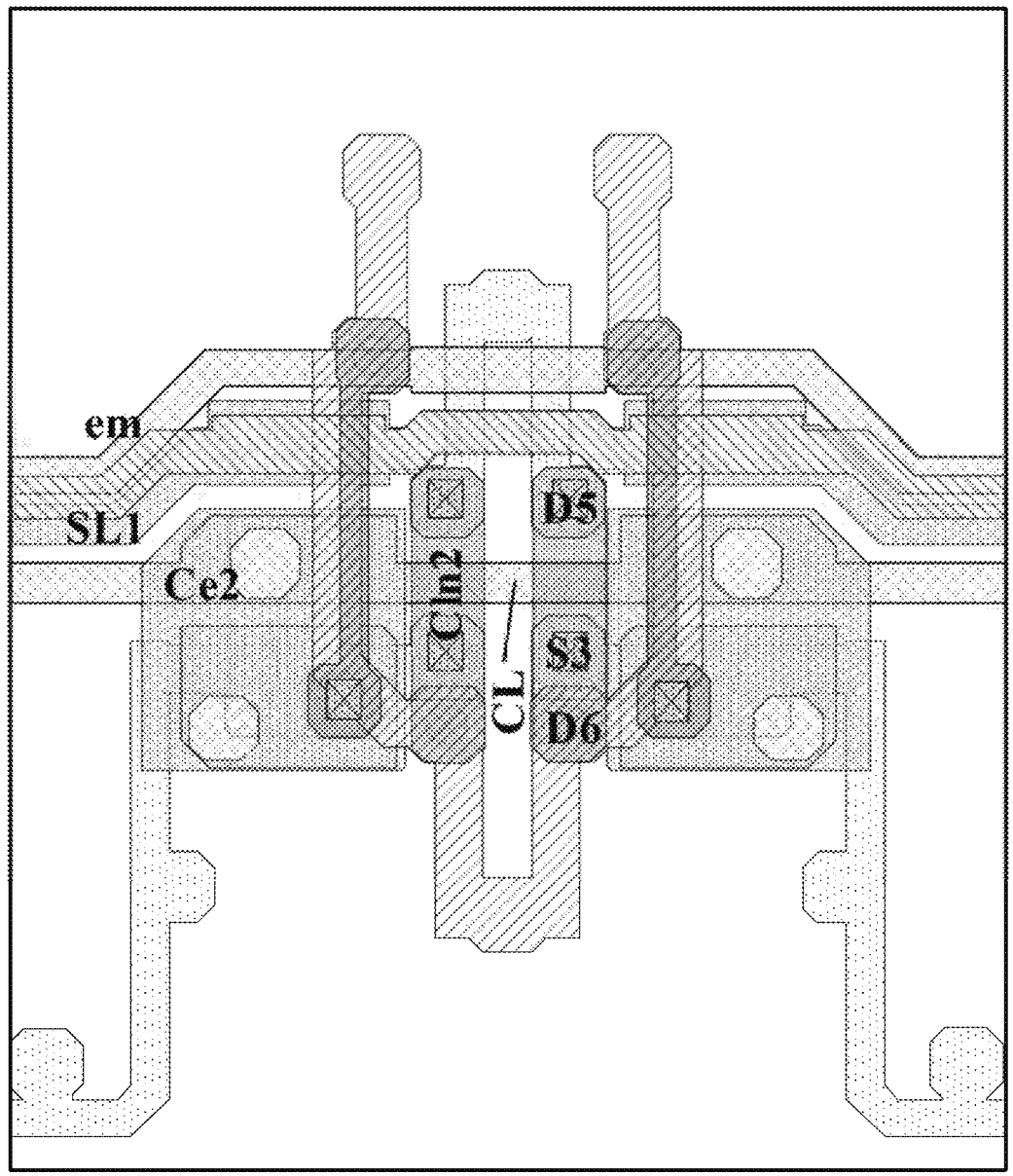
FIG. 10 is a diagram illustrating a layout of a respective second capacitor electrode line with respect to a second node connecting line in the array substrate depicted in FIG. 5A or FIG. 8A.
Figure 11:
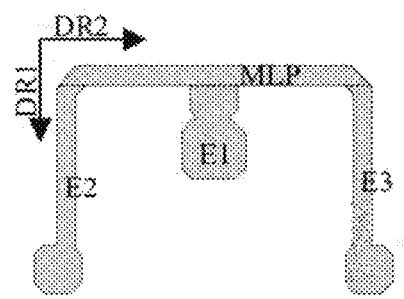
FIG. 11 is a diagram illustrating the structure of a voltage supply connecting line in some embodiments according to the present disclosure.

FIG. 10 is a diagram illustrating a layout of a respective second capacitor electrode line with respect to a second node connecting line in the array substrate depicted in FIG. 5A or FIG. 5A. Referring to FIG. 10 and FIG. 6B, a connecting line CL connecting two adjacent second capacitor electrodes of two adjacent pixel driving circuits in the same row spaces apart the second electrode D5 of the light emitting control transistor T5 from the second electrode D6 of the third reset transistor T6, and spaces apart the second electrode D5 of the light emitting control transistor T5 from the first electrode S3 of the driving transistor T3. Because the respective second capacitor electrode line is in the first gate metal layer, the second node connecting line Cln2 cannot be disposed in the first gate metal layer.

In some embodiments, the respective second capacitor electrode line is in the first gate metal layer, the second electrode D5 of the light emitting control transistor T5 and the first electrode S3 of the driving transistor T3 are in the first semiconductor material layer, and the second electrode D6 of the third reset transistor T6 is in the second semiconductor material layer. In some embodiments, in the pixel driving circuit, the second node connecting line Cln2 is connected to the second electrode D5 of the light emitting control transistor T5 through a third via v3, the first electrode S3 of the driving transistor T3 through a fourth via v4, and the second electrode D6 of the third reset transistor T6 through a fifth via v5. In one example, the third via v3 extends through the passivation layer PVX, the second inter-layer dielectric layer ILD2, the first inter-layer dielectric layer ILD1, the insulating layer IN, and the gate insulating layer G1. In another example, the fourth via v4 extends through the passivation layer PVX, the second inter-layer dielectric layer ILD2, the first inter-layer dielectric layer ILD1, the insulating layer IN, and the gate insulating layer G1. In another example, the fifth via v5 extends through the passivation layer PVX and the second inter-layer dielectric layer ILD2.

In some embodiments, the second node connecting line Cln2 crosses over the respective second capacitor electrode line. Optionally, an orthographic projection of the second node connecting line Cln2 on a base substrate partially overlaps with an orthographic projection of the respective second capacitor electrode line on the base substrate.

Referring to FIG. 5A to FIG. 5O, FIG. 6A to FIG. 6D, and FIG. 8A to FIG. 8O, in some embodiments, corresponding layers of a first pixel driving circuit (e.g., PDC1 in FIG. 5B) and corresponding layers of a second pixel driving circuit (e.g., PDC2 in FIG. 5B) directly adjacent to each other and in a same row have a substantially mirror symmetry with respect to each other, e.g., about a plane perpendicular to a main surface of the array substrate and substantially parallel to the plurality of data lines.

As used herein, the term "corresponding layers of a first pixel driving circuit and corresponding layers of a second pixel driving circuit" is not intended to include layers that are not parts of the pixel driving circuits. For example, the "corresponding layers of a first pixel driving circuit and corresponding layers of a second pixel driving circuit" do not include an anode layer or a pixel definition layer. In some embodiments, the "corresponding layers of a first pixel driving circuit and corresponding layers of a second pixel driving circuit" do not include a light shielding layer or a first signal line layer. In one example, the "corresponding layers of a first pixel driving circuit and corresponding layers of a second pixel driving circuit" refer to at least one conductive layer of the first pixel driving circuit and conductive layers of a second pixel driving circuit. In one specific example, "corresponding layers" includes at least one of a first semiconductor material layer, a first gate metal layer, a second gate metal layer, a second semiconductor material layer, a third gate metal layer, a first signal line layer, or a second signal line layer. In another specific example, "corresponding layers" further includes at least one of a gate insulating layer, an insulating layer, a first inter-layer dielectric layer, a second inter-layer dielectric layer, a passivation layer, a first planarization layer, or a second planarization layer. In another specific example, "corresponding layers" includes a first semiconductor material layer, a first gate metal layer, a second gate metal layer, a second semiconductor material layer, a third gate metal layer, a first signal line layer, and a second signal line layer. In another specific example, "corresponding layers" further includes a gate insulating layer, an insulating layer, a first inter-layer dielectric layer, a second inter-layer dielectric layer, a passivation layer, a first planarization layer, and a second planarization layer.

Referring to FIG. 5A to FIG. 5O, FIG. 6A to FIG. 6D, and FIG. 8A to FIG. 8O, in some embodiments, the voltage supply connecting line Clv connects multiple components of two adjacent pixel driving circuits in a same row to a respective voltage supply line of the plurality of voltage supply lines Vdd. In some embodiments, the respective voltage supply line of the plurality of voltage supply lines Vdd is connected to the voltage supply connecting line Clv, e.g., through the eighth via v8. The voltage supply connecting line Clv is connected to first electrodes of two adjacent light emitting control transistors of two adjacent pixel driving circuits in the same row through the ninth via v9. The first electrodes of two adjacent light emitting control transistors of two adjacent pixel driving circuits in the same row are parts of a unitary structure. The voltage supply connecting line Clv is connected to second capacitor electrodes of first capacitors of two adjacent pixel driving circuits in the same row, respectively through different vias.

FIG. 1I is a diagram illustrating the structure of a voltage supply connecting line in some embodiments according to the present disclosure. Referring to FIG. 1I, the voltage supply connecting line in some embodiments includes a main line portion MLP extending along a direction substantially parallel to the second direction DR2; a first extension E1, a second extension E2, and a third extension E3 extending away from the main line portion MLP. The first extension E1, the second extension E2, and the third extension E3 extend along a direction substantially parallel to the first direction DR1, respectively. In some embodiments, the respective voltage supply line of the plurality of voltage supply lines Vdd is connected to the first extension E1, e.g., through the eighth via v8. The first extension E1 is connected to first electrodes of two adjacent light emitting control transistors of two adjacent pixel driving circuits in the same row through the ninth via v9. The second extension E2 is connected to a second capacitor electrode of a first capacitor of a first adjacent pixel driving circuit, and the third extension E3 is connected to a second capacitor electrode of a first capacitor of a second adjacent pixel driving circuit.

In some embodiments, the voltage supply connecting line Clv has a substantially mirror symmetry with respect to a plane substantially parallel to a first direction DR1 and substantially perpendicular to a light emitting surface of the array substrate. Optionally, the plane intersects the first extension. Optionally, the plane intersects the eighth via v8 and the ninth via v9.

Figure 12:
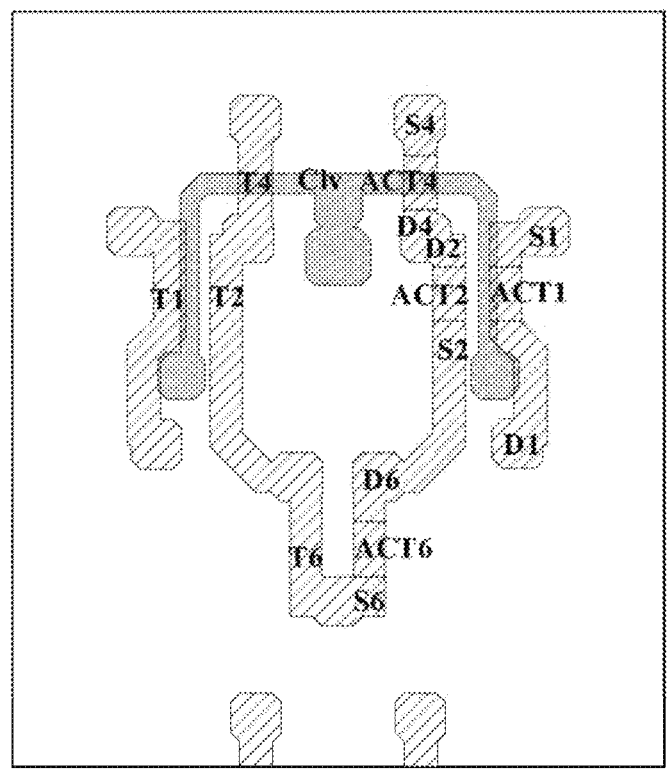
FIG. 12 is a diagram illustrating a layout of a voltage supply connecting line with respect to the second semiconductor material layer in the array substrate depicted in FIG. 5A or FIG. 8A.

FIG. 12 is a diagram illustrating a layout of a voltage supply connecting line with respect to the second semiconductor material layer in the array substrate depicted in FIG. 5A or FIG. 8A. Referring to FIG. 1I and FIG. 12, in some embodiments, an orthographic projection of the voltage supply connecting line Clv on a base substrate at least partially surrounds an orthographic projection of two adjacent compensating transistors of two adjacent pixel driving circuits in the same row on the base substrate. The main line portion MLP of the voltage supply connecting line Clv crosses over active layers of two adjacent data write transistors of two adjacent pixel driving circuits in the same row. Optionally, the orthographic projection of the voltage supply connecting line Clv on the base substrate partially overlaps with an orthographic projection of the active layers of two adjacent data write transistors of two adjacent pixel driving circuits in the same row on the base substrate.

In some embodiments, an orthographic projection of the first extension E1 on abase substrate spaces apart an orthographic projection of a second electrode of a compensating transistor in a first adjacent pixel driving circuit on the base substrate and an orthographic projection of a second electrode of a compensating transistor in a second adjacent pixel driving circuit on the base substrate.

In some embodiments, at least a part of an orthographic projection of the second extension E2 on a base substrate spaces apart an orthographic projection of at least an active layer of a first reset transistor in a first adjacent pixel driving circuit on the base substrate and an orthographic projection of at least an active layer of a compensating transistor in the first adjacent pixel driving circuit on the base substrate. Because the voltage supply connecting line Clv is provided with a constant voltage, this layout is effective in preventing interference between signals in the first reset transistor and the compensating transistor.

In some embodiments, at least a part of an orthographic projection of the third extension E3 on a base substrate spaces apart an orthographic projection of at least an active layer of a first reset transistor in a second adjacent pixel driving circuit on the base substrate and an orthographic projection of at least an active layer of a compensating transistor in the second adjacent pixel driving circuit on the base substrate. Because the voltage supply connecting line Clv is provided with a constant voltage, this layout is effective in preventing interference between signals in the first reset transistor and the compensating transistor.

Figure 13:
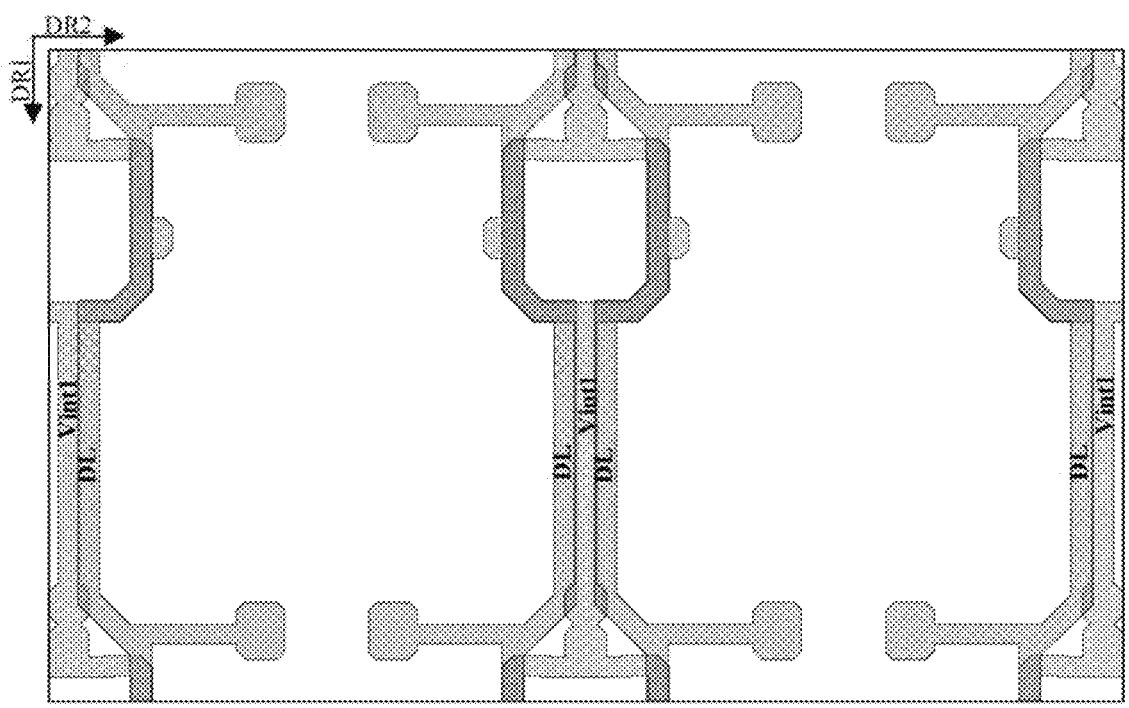
FIG. 13 is a diagram illustrating a layout of a plurality of first reset signal lines with respect to a plurality of data lines in four adjacent pixel driving circuits in a same row in an array substrate in some embodiments according to the present disclosure.

FIG. 13 is a diagram illustrating a layout of a plurality of first reset signal lines with respect to a plurality of data lines in four adjacent pixel driving circuits in a same row in an array substrate in some embodiments according to the present disclosure. Referring to FIG. 13, FIG. 5K, and FIG. 5M, in some embodiments, at least a part of an orthographic projection of a respective first reset signal line of the plurality of first reset signal lines Vint1 on a base substrate spaces apart an orthographic projection of at least a part of a first respective data line of the plurality of data lines DL configured to provide data signals to a first adjacent pixel driving circuit on the base substrate and an orthographic projection of at least a part of a second respective data line of the plurality of data lines DL configured to provide data signals to a second adjacent pixel driving circuit on the base substrate. Optionally, the at least a part of an orthographic projection of a respective first reset signal line of the plurality of first reset signal lines Vint1 on the base substrate spaces apart an orthographic projection of a second segment of a first respective data line of the plurality of data lines DL configured to provide data signals to a first adjacent pixel driving circuit on the base substrate and an orthographic projection of a second segment of a second respective data line of the plurality of data lines DL configured to provide data signals to a second adjacent pixel driving circuit on the base substrate. Because the respective first reset signal line is provided with a constant voltage, this layout is effective in preventing interference between data signals in two adjacent data lines of the plurality of data lines DL configured to provide data signals to two adjacent pixel driving circuits.

In some embodiments, a respective gate line of the plurality of gate lines includes a plurality of branches. Referring to FIG. 5A to FIG. 5O, and FIG. 8A to FIG. 8O, the respective gate line in some embodiments includes a respective gate line first branch GL-1 and a respective gate line second branch GL-2. Optionally, an orthographic projection of the respective gate line first branch GL-1 on a base substrate at least partially overlaps with an orthographic projection of the respective gate line second branch GL-2 on the base substrate. In one example, the respective gate line first branch GL-1 is in the second gate metal layer. In another example, the respective gate line second branch GL-2 is in the third gate metal layer.

In some embodiments, a respective first control signal line of the plurality of first control signal lines SL1 includes a plurality of branches. Referring to FIG. 5A to FIG. 5O, and FIG. 8A to FIG. 8O, the respective first control signal line includes a respective first control signal line first branch SL1-1 and a respective first control signal line second branch SL1-2. Optionally, an orthographic projection of the respective first control signal line first branch SL1-1 on a base substrate at least partially overlaps with an orthographic projection of the respective first control signal line second branch SL1-2 on the base substrate. In one example, the respective first control signal line first branch SL1-1 is in the second gate metal layer. In another example, the respective first control signal line second branch SL1-2 is in the third gate metal layer.

In some embodiments, a respective third control signal line of the plurality of third control signal lines includes a plurality of branches. Referring to FIG. 5A to FIG. 5O, and FIG. 8A to FIG. 8O, the respective third control signal line includes a respective third control signal line first branch SL3-1, a respective third control signal line second branch SL3-2, and a respective third control signal line third branch SL3-3. Optionally, an orthographic projection of the respective third control signal line first branch SL3-1 on a base substrate at least partially overlaps with an orthographic projection of the respective third control signal line second branch SL3-2 on the base substrate, and at least partially overlaps with an orthographic projection of the respective third control signal line third branch SL3-3 on the base substrate. Optionally, the orthographic projection of the respective third control signal line second branch SL3-2 on the base substrate at least partially overlaps with an orthographic projection of the respective third control signal line third branch SL3-3 on the base substrate. In one example, the respective third control signal line first branch SL3-1 is in the first gate metal layer. In another example, the respective third control signal line second branch SL3-2 is in the second gate metal layer. In another example, the respective third control signal line third branch SL3-3 is in the third gate metal layer.

In another aspect, the present invention provides a display apparatus, including the array substrate described herein or fabricated by a method described herein, and one or more integrated circuits connected to the array substrate. Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus.

In another aspect, the present disclosure provides a method of fabricating an array substrate. In some embodiments, the method includes forming a plurality of pixel driving circuits and forming a plurality of gate lines. Optionally, forming a respective pixel driving circuit of the plurality of pixel driving circuits comprises forming a driving transistor, forming a data write transistor, forming a first reset transistor, forming a first capacitor having a first capacitor electrode and a second capacitor electrode, forming a second capacitor having a third capacitor electrode and a fourth capacitor electrode, and forming a first node connecting line. Optionally, a respective gate line of the plurality of gate lines is configured to provide gate scanning signal to the data write transistor in the respective pixel driving circuit. Optionally, a gate electrode of the driving transistor is connected to the third capacitor electrode. Optionally, the first node connecting line connects a second electrode of the first reset transistor with the third capacitor electrode. Optionally, an orthographic projection of the respective gate line on a base substrate is substantially non-overlapping with an orthographic projection of the first node connecting line on the base substrate.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An array substrate, comprising a plurality of pixel driving circuits and a plurality of gate lines;
   wherein a respective pixel driving circuit of the plurality of pixel driving circuits comprises a driving transistor, a data write transistor, a first reset transistor, a first capacitor having a first capacitor electrode and a second capacitor electrode, a second capacitor having a third capacitor electrode and a fourth capacitor electrode, and a first node connecting line;
   a respective gate line of the plurality of gate lines is configured to provide gate scanning signal to the data write transistor in the respective pixel driving circuit;
   a gate electrode of the driving transistor is connected to the third capacitor electrode;
   the first node connecting line connects a second electrode of the first reset transistor with the third capacitor electrode; and an orthographic projection of the respective gate line on a base substrate is substantially non-overlapping with an orthographic projection of the first node connecting line on the base substrate.

2. The array substrate of claim 1, wherein the orthographic projection of the respective gate line on the base substrate and the orthographic projection of the first node connecting line on the base substrate are spaced apart by an orthographic projection of the second capacitor electrode of the first capacitor on the base substrate.

3. The array substrate of claim 2, wherein the orthographic projection of the second capacitor electrode of the first capacitor on the base substrate is substantially non-overlapping with the orthographic projection of the respective gate line on the base substrate, and is substantially non-overlapping with the orthographic projection of the first node connecting line on the base substrate.

4. The array substrate of claim 3, wherein the orthographic projection of the respective gate line on the base substrate and an orthographic projection of the third capacitor electrode of the second capacitor on the base substrate are spaced apart by the orthographic projection of the second capacitor electrode of the first capacitor on the base substrate.

5. The array substrate of claim 4, wherein the orthographic projection of the second capacitor electrode of the first capacitor on the base substrate is substantially non-overlapping with the orthographic projection of the respective gate line on the base substrate, and is substantially non-overlapping with the orthographic projection of the third capacitor electrode of the second capacitor on the base substrate.

6. The array substrate of claim 1, wherein an orthographic projection of the respective gate line on a base substrate is substantially non-overlapping with an orthographic projection of an active layer and the second electrode of the first reset transistor on the base substrate.

7. The array substrate of claim 1, wherein the second electrode of the first reset transistor crosses over the second capacitor electrode.

8. The array substrate of claim 1, comprising a plurality of second capacitor electrode lines extending along a direction substantially parallel to a second direction;
wherein a respective second capacitor electrode line of the plurality of second capacitor electrode lines comprises second capacitor electrodes of pixel driving circuits in a same row connected together;
wherein the respective pixel driving circuit further comprises a light emitting control transistor and a third reset transistor;
wherein a connecting line in the respective second capacitor electrode line connecting two adjacent second capacitor electrodes of two adjacent pixel driving circuits in the same row spaces apart a second electrode of the light emitting control transistor from a second electrode of the third reset transistor, and spaces apart the second electrode of the light emitting control transistor from a first electrode of the driving transistor.

9. The array substrate of claim 8, wherein the respective pixel driving circuit further comprises a second node connecting line connected to the second electrode of the light emitting control transistor through a third via, the first electrode of the driving transistor through a fourth via, and the second electrode of the third reset transistor through a fifth via;
the second electrode of the light emitting control transistor and the first electrode of the driving transistor are in a first semiconductor material layer;
the respective second capacitor electrode line is in a first gate metal layer on a side of the first semiconductor material layer away from the base substrate;
the second electrode of the third reset transistor is in a second semiconductor material layer on a side of the first gate metal layer away from the base substrate; and
the second node connecting line is in a first signal line layer on a side of the second semiconductor material layer away from the base substrate.

10. The array substrate of claim 8, wherein the second node connecting line crosses over the respective second capacitor electrode line.

11. The array substrate of claim 1, further comprising a plurality of voltage supply lines;
wherein the respective pixel driving circuit further comprises a light emitting control transistor and a voltage supply connecting line;
a respective voltage supply line of the plurality of voltage supply lines is connected to the voltage supply connecting line through an eighth via;
the voltage supply connecting line is connected to first electrodes of two adjacent light emitting control transistors of two adjacent pixel driving circuits in the same row through a ninth via;
the first electrodes of two adjacent light emitting control transistors of two adjacent pixel driving circuits in the same row are parts of a unitary structure; and
the voltage supply connecting line is connected to second capacitor electrodes of first capacitors of two adjacent pixel driving circuits in the same row, respectively through different vias.

12. The array substrate of claim 11, wherein the voltage supply connecting line comprises a main line portion extending along a direction substantially parallel to a second direction; a first extension, a second extension, and a third extension extending away from the main line portion;
the first extension, the second extension, the third extension extend along a direction substantially parallel to a first direction, respectively;
the respective voltage supply line of the plurality of voltage supply lines is connected to the first extension through the eighth via;
the first extension is connected to the first electrodes of the two adjacent light emitting control transistors of the two adjacent pixel driving circuits in the same row through the ninth via;
the second extension is connected to a second capacitor electrode of a first capacitor of a first adjacent pixel driving circuit; and
the third extension is connected to a second capacitor electrode of a first capacitor of a second adjacent pixel driving circuit.

13. The array substrate of claim 12, wherein the voltage supply connecting line has a substantially mirror symmetry with respect to a plane substantially parallel to the first direction and substantially perpendicular to a light emitting surface of the array substrate.

14. The array substrate of claim 12, wherein the respective pixel driving circuit further comprises a compensating transistor;
wherein an orthographic projection of the voltage supply connecting line on the base substrate at least partially surrounds an orthographic projection of two adjacent compensating transistors of two adjacent pixel driving circuits in the same row on the base substrate; and the main line portion crosses over active layers of two adjacent data write transistors of two adjacent pixel driving circuits in the same row.

15. The array substrate of claim 12, wherein the respective pixel driving circuit further comprises a compensating transistor;

wherein at least a part of an orthographic projection of the second extension on the base substrate spaces apart an orthographic projection of at least an active layer of a first reset transistor in a first adjacent pixel driving circuit on the base substrate and an orthographic projection of at least an active layer of a compensating transistor in the first adjacent pixel driving circuit on the base substrate; and at least a part of an orthographic projection of the third extension on the base substrate spaces apart an orthographic projection of at least an active layer of a first reset transistor in a second adjacent pixel driving circuit on the base substrate and an orthographic projection of at least an active layer of a compensating transistor in the second adjacent pixel driving circuit on the base substrate.

16. The array substrate of claim 1, further comprising a plurality of first reset signal lines and a plurality of data lines;

wherein at least a part of an orthographic projection of a respective first reset signal line of the plurality of first reset signal lines on the base substrate spaces apart an orthographic projection of at least a part of a first respective data line of the plurality of data lines configured to provide data signals to a first adjacent pixel driving circuit on the base substrate and an orthographic projection of at least a part of a second respective data line of the plurality of data lines configured to provide data signals to a second adjacent pixel driving circuit on the base substrate.

17. The array substrate of claim 1, further comprising a plurality of first reset signal lines;

wherein a respective first reset signal line of the plurality of first reset signal lines comprises a plurality of loops arranged along a direction substantially parallel to first direction; and a respective loop of the plurality of loops is connected to first electrodes of two adjacent first reset transistors of two adjacent pixel driving circuits in a same row.

18. The array substrate of claim 1, further comprising an interconnected voltage supply network;

wherein the interconnected voltage supply network comprises a plurality of voltage supply lines, a plurality of second capacitor electrode lines, and a plurality of voltage supply connecting lines;

the plurality of voltage supply lines extend along a direction substantially parallel to a first direction;

the plurality of second capacitor electrode lines extend along a direction substantially parallel to a second direction;

a respective second capacitor electrode line of the plurality of second capacitor electrode lines comprises second capacitor electrodes of pixel driving circuits in a same row; and a respective voltage supply connecting line of the plurality of voltage supply connecting lines connects a respective voltage supply line of the plurality of voltage supply lines with a respective second capacitor electrode line of the plurality of second capacitor electrode lines.

19. The array substrate of claim 1, wherein the respective pixel driving circuit further comprises a compensating transistor and a third node connecting line;

wherein the third node connecting line is connected to second electrodes of the compensating transistor and the data write transistor through a sixth via, and is connected to the first capacitor electrode of the first capacitor and the fourth capacitor electrode of the second capacitor through a seventh via;

an orthographic projection of the third node connecting line on the base substrate at least partially overlaps with an orthographic projection of an active layer of the compensating transistor on the base substrate; and the third node connecting line extends along a direction substantially parallel to a direction along which the active layer of the compensating transistor extends.

20. A display apparatus, comprising the array substrate of claim 1, and one or more integrated circuits connected to the array substrate.

* * * * *